United States Patent
Joines et al.

(10) Patent No.: US 11,602,231 B2
(45) Date of Patent: Mar. 14, 2023

(54) BREAST MOTION SIMULATOR

(71) Applicant: North Carolina State University, Raleigh, NC (US)

(72) Inventors: Sharon Melissa Bennett Joines, Raleigh, NC (US); Henry Paul Goodell, Raleigh, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 249 days.

(21) Appl. No.: 17/088,356

(22) Filed: Nov. 3, 2020

(65) Prior Publication Data
US 2021/0127859 A1   May 6, 2021

Related U.S. Application Data

(60) Provisional application No. 62/930,302, filed on Nov. 4, 2019.

(51) Int. Cl.
| | | |
|---|---|---|
| *G01L 1/02* | (2006.01) | |
| *A47F 8/00* | (2006.01) | |
| *G09B 25/00* | (2006.01) | |

(52) U.S. Cl.
CPC .................. *A47F 8/00* (2013.01); *G01L 1/02* (2013.01); *G09B 25/00* (2013.01)

(58) Field of Classification Search
CPC .............. A47F 8/00; G01L 1/02; G09B 25/00
See application file for complete search history.

(56) References Cited

U.S. PATENT DOCUMENTS

| | | | |
|---|---|---|---|
| 3,362,593 A | 1/1968 | York | |
| 3,472,435 A | 10/1969 | Maze | |
| 3,818,756 A * | 6/1974 | Barron | ..................... A41H 1/00 73/159 |
| 3,865,284 A | 2/1975 | Kazama | |
| 4,088,315 A | 5/1978 | Schemmel | |
| 4,409,835 A | 10/1983 | Daniel et al. | |

(Continued)

FOREIGN PATENT DOCUMENTS

| | | |
|---|---|---|
| CN | 201798363 | 4/2011 |
| CN | 106393125 | 10/2018 |

(Continued)

OTHER PUBLICATIONS

PCT International Search Report and Written Opinion in International Appln. No. PCT/US2020/058751, dated Mar. 3, 2021, 14 pages.

(Continued)

*Primary Examiner* — Max H Noori
(74) *Attorney, Agent, or Firm* — Fish & Richardson P.C.

(57) ABSTRACT

A sensor apparatus includes a mannequin to emulate a human body part. The mannequin includes a core that emulates flexibility of a substantially inflexible skeletal portion of the body part, and a pliant covering. The pliant covering includes a pliant three-dimensional surface that emulates contours of an epidermis of the body part, and at least one pliant three-dimensional interior portion to emulate resiliency of a pliant portion of the body part. At least one pressure sensor is arranged between the three-dimensional surface and the core to sense pressure applied against the pliant three-dimensional surface.

12 Claims, 43 Drawing Sheets

(56) References Cited

U.S. PATENT DOCUMENTS

| | | | |
|---|---|---|---|
| 4,439,162 A | 3/1984 | Blaine | |
| 4,451,416 A | 5/1984 | Burtscher | |
| 4,773,865 A | 9/1988 | Baldwin | |
| 5,628,230 A | 5/1997 | Flam | |
| 5,782,389 A | 7/1998 | Maharg et al. | |
| 5,993,590 A | 11/1999 | Krotseng | |
| 6,435,386 B2 | 8/2002 | Scott | |
| 6,494,763 B1 | 12/2002 | Hastey | |
| 6,640,202 B1 | 10/2003 | Dietz et al. | |
| 6,769,286 B2 | 8/2004 | Biermann et al. | |
| 6,957,164 B2 | 10/2005 | Dietz et al. | |
| 7,162,441 B2 | 1/2007 | Nabarro | |
| 7,186,212 B1 | 3/2007 | McMullen | |
| 7,419,376 B2 | 9/2008 | Sarvazyan et al. | |
| 7,530,480 B2 | 5/2009 | Nan | |
| 7,549,866 B2 | 6/2009 | Cohen et al. | |
| 8,608,483 B2 | 12/2013 | Trotta et al. | |
| 8,678,831 B2 | 3/2014 | Trotta et al. | |
| 9,021,857 B1 | 5/2015 | Squire et al. | |
| 9,243,966 B2 | 1/2016 | Beillas et al. | |
| 9,275,557 B2 | 3/2016 | Trotta et al. | |
| 9,538,867 B2 | 1/2017 | Peters et al. | |
| 9,554,096 B1 | 1/2017 | Eakins | |
| 9,601,032 B2 | 3/2017 | Trotta et al. | |
| 9,696,130 B1 | 7/2017 | Eakins | |
| 9,713,564 B2 | 7/2017 | Hernandez | |
| 10,078,973 B2 | 9/2018 | Barsness et al. | |
| 10,283,016 B2 | 5/2019 | Watanabe et al. | |
| 10,319,259 B2 | 6/2019 | Kerins et al. | |
| 2004/0122287 A1 | 6/2004 | Minigh | |
| 2005/0079475 A1 | 4/2005 | Haque | |
| 2009/0011394 A1* | 1/2009 | Meglan | G09B 23/28 434/268 |
| 2010/0268138 A1 | 10/2010 | Summit | |
| 2011/0239731 A1 | 10/2011 | Lisseman et al. | |
| 2012/0264097 A1 | 10/2012 | Newcott et al. | |
| 2012/0284148 A1 | 11/2012 | Volchek | |
| 2013/0238285 A1 | 9/2013 | Volchek | |
| 2017/0162077 A1 | 6/2017 | Vara | |
| 2017/0266052 A1* | 9/2017 | Levine | A61F 13/00051 |
| 2017/0301264 A1 | 10/2017 | Vara | |
| 2017/0330488 A1 | 11/2017 | Kinsella | |
| 2018/0055643 A1 | 3/2018 | Castro et al. | |
| 2018/0075777 A1 | 3/2018 | Iverson et al. | |
| 2018/0225994 A1 | 8/2018 | Kerins | |
| 2018/0282545 A1 | 10/2018 | Chanda et al. | |
| 2018/0350266 A1 | 12/2018 | Garcai | |
| 2018/0350267 A1 | 12/2018 | Barsness et al. | |
| 2019/0057624 A1 | 2/2019 | Chanda et al. | |
| 2019/0082762 A1 | 3/2019 | Chan et al. | |
| 2019/0118682 A1 | 4/2019 | Faruque | |
| 2020/0008503 A1* | 1/2020 | Nielson | A41H 5/02 |
| 2020/0143709 A1 | 5/2020 | Wang | |
| 2021/0127772 A1* | 5/2021 | Joines | A41H 5/00 |
| 2022/0117342 A1 | 4/2022 | Joines | |
| 2022/0249024 A1* | 8/2022 | Hulings | A61B 5/6843 |
| 2022/0266045 A1* | 8/2022 | Swenglish | A61N 1/046 |
| 2022/0270516 A1* | 8/2022 | Mehta | G09B 5/08 |

FOREIGN PATENT DOCUMENTS

| | | |
|---|---|---|
| EP | 3127511 | 2/2017 |
| RU | 2074367 C1 | 2/1997 |
| WO | WO2006038102 | 4/2006 |
| WO | WO2011141646 | 11/2011 |
| WO | WO2013028021 | 2/2013 |
| WO | WO2016137425 | 9/2016 |

OTHER PUBLICATIONS

International Preliminary Report on Patentability in International Appln. No. PCT/US2020/058748, dated May 19, 2022, 8 pages.

International Preliminary Report on Patentability in International Appln. No. PCT/US2020/058751, dated May 19, 2022, 8 pages.

PCT International Search Report and Written Opinion in International Appln. No. PCT/US2020/058748, dated Mar. 9, 2021, 14 pages.

* cited by examiner

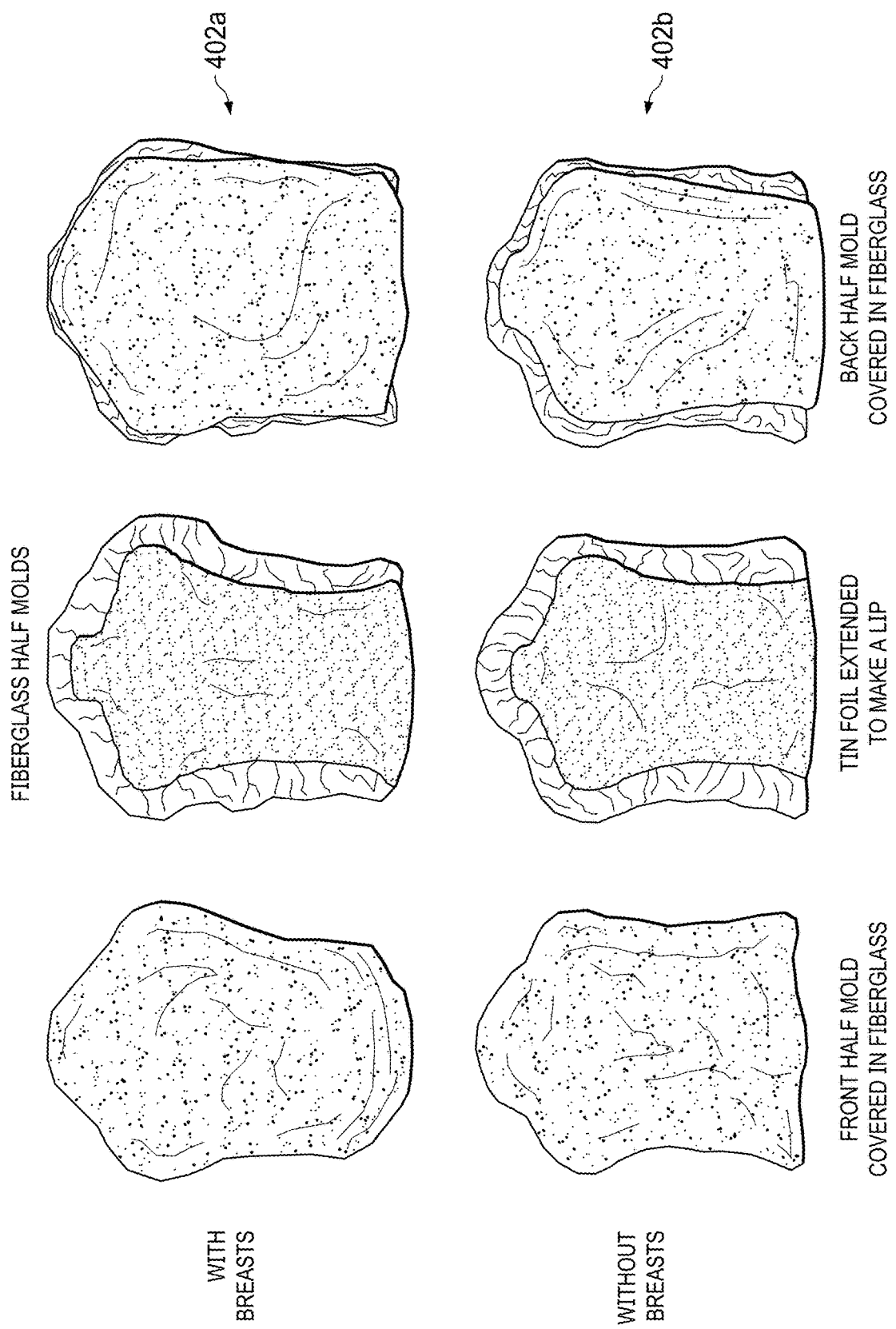

FORMULATIONS (ONE THROUGH FOUR)

| | FORMULATION ONE | | FORMULATION TWO | |
|---|---|---|---|---|
| | SKIN | BREAST TISSUE | SKIN | BREAST TISSUE |
| MATERIAL | EcoFlex 00-10 | Qgel 317 | EcoFlex 00-10 | Qgel 317 |
| RATIO | A:B=1:1 | A:B=1:1 | A:B=1:1 | A:B=1.05:1 |
| LAYERS | 3 LAYERS | - | 3 LAYERS | - |
| | FORMULATION THREE | | FORMULATION FOUR | |
| | SKIN | BREAST TISSUE | SKIN | BREAST TISSUE |
| MATERIAL | EcoFlex 00-10 | Qgel 317 | EcoFlex 00-10 | Qgel 317 |
| RATIO | A:B=1:1 | A:B=1.1:1 | A:B=1:1 | A:B=1.2:1 |
| LAYERS | 3 LAYERS | - | 3 LAYERS | - |

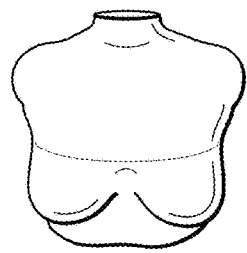 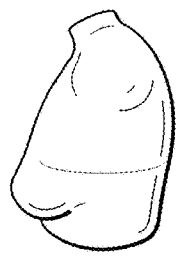  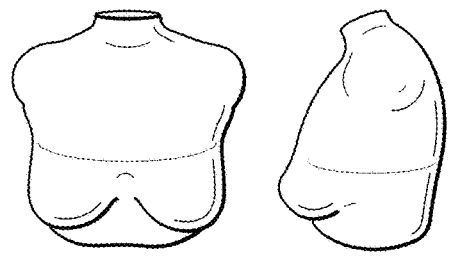

FORMULATION ONE (A:B=1:1)     FORMULATION TWO (A:B=1.05:1)

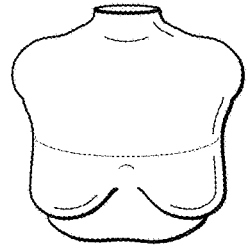 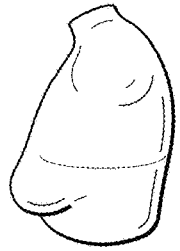  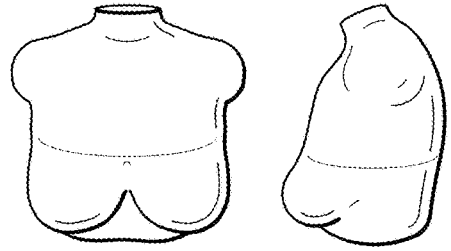

FORMULATION THREE (A:B=1.1:1)     FORMULATION FOUR (A:B=1.2:1)

FIG. 10

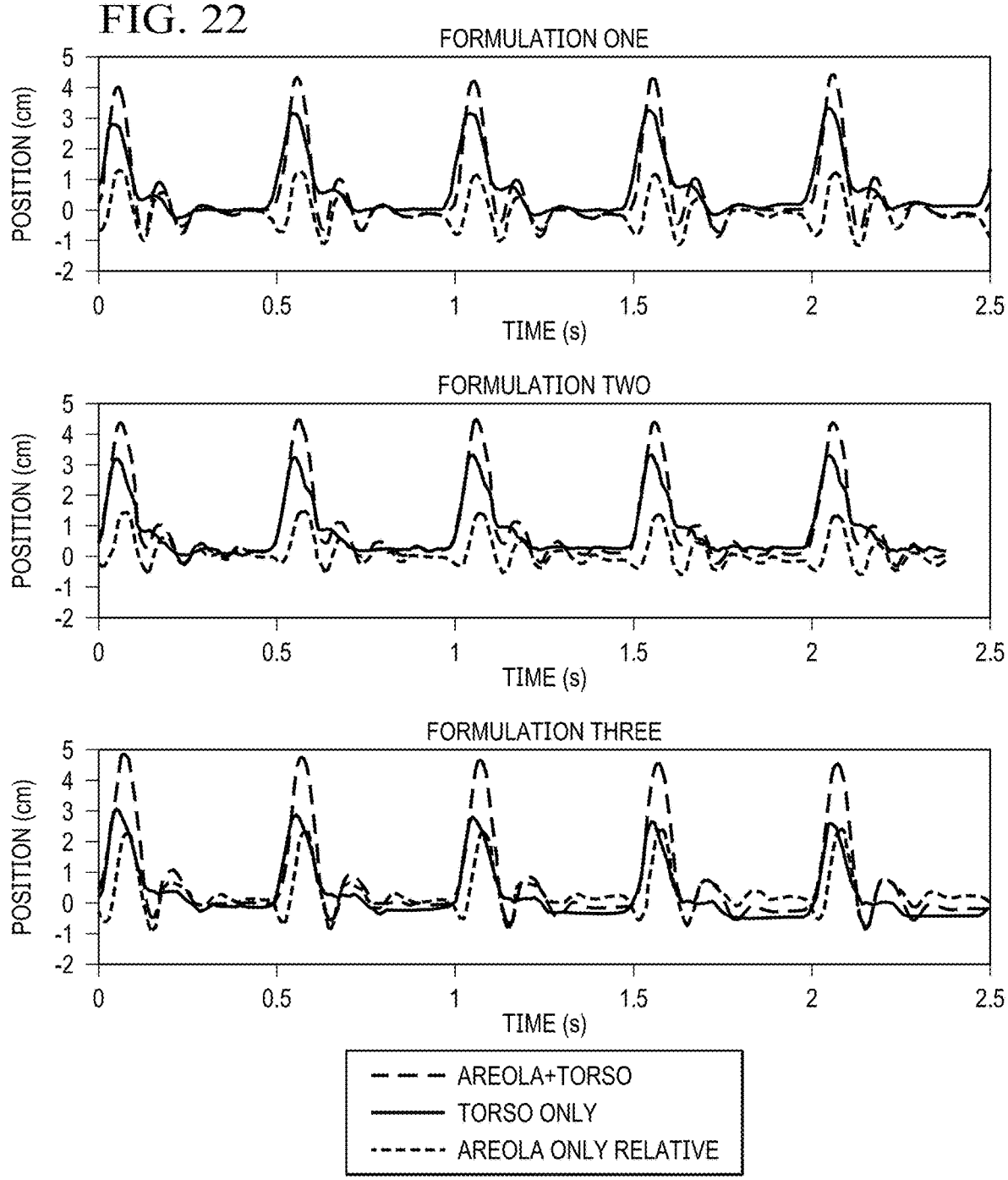

FIG. 23
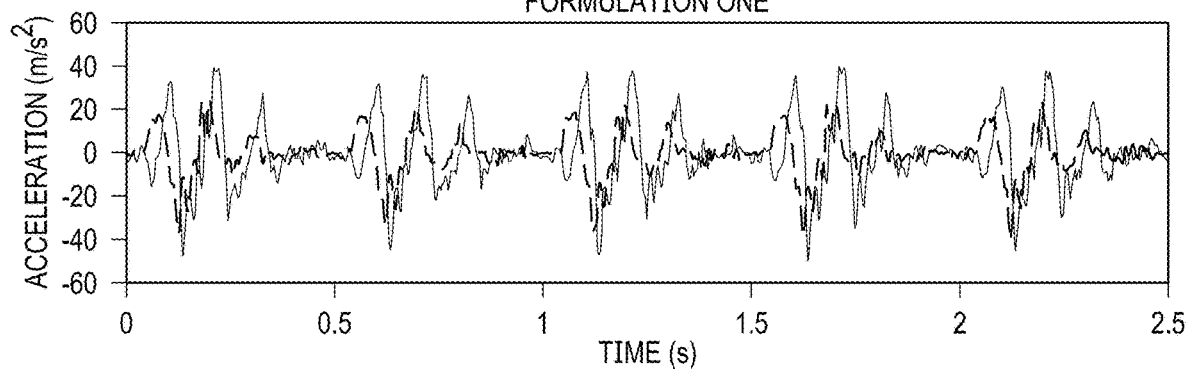
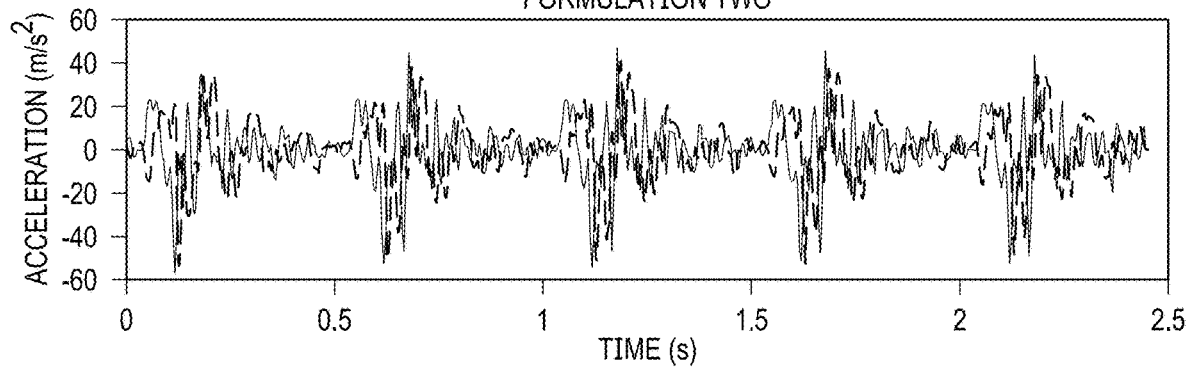
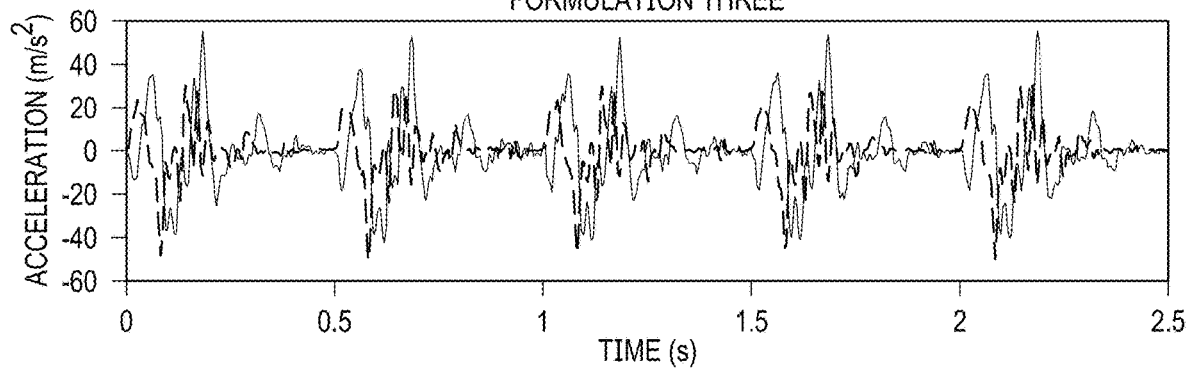

BREAST MOTION SIMULATOR

CROSS-REFERENCE TO RELATED APPLICATIONS

This application claims the benefit of Provisional Application No. 62/930,302, filed on Nov. 4, 2019, which is hereby incorporated by reference in its entirety.

TECHNICAL FIELD

This disclosure relates to torso simulation systems.

BACKGROUND

In apparel design, the human form is the basis for fit in the form of a rigid mannequin or in fitting sessions on human models. Apparel is typically designed in static positions specific to bra fit. Current industry standard bra-fit analysis involves human fit models that try on bras, and fit is determined by observation and wearer qualification of fit, which is prone to human error.

SUMMARY

This disclosure describes torso simulation systems.

In some aspects, a prosthetic torso assembly includes a support structure at least partially in a shape of a human torso, the support structure formed by a lattice network of rigid material, and a synthetic skin disposed over the support structure and connected to the support structure, the synthetic skin having a thickness, comprising silicone or ballistic gel, and configured to imitate a human torso.

This, and other aspects, can include one or more of the following features. The prosthetic torso assembly can further include synthetic breasts connected to the synthetic skin, where the synthetic breasts include silicone and are configured to imitate female human breasts. The synthetic breasts can be formed integrally with the synthetic skin. The synthetic breasts can be coupled to the synthetic skin. The synthetic breasts can include a silicone skin surrounding a volume of silicone gel. The silicone skin of the synthetic breasts can include a thickness of greater than or equal to one millimeter. The thickness of the synthetic skin can be between 5 mm and 7 mm. The thickness of the synthetic skin can be about 6 mm. The synthetic skin can be molded to the support structure. The support structure can be a hollow lattice structure defining a torso chamber within the hollow lattice structure. The support structure can be formed from one or more of nylon or polyamide. The prosthetic torso assembly can include a support base, the support structure being selectively mounted to the support base. The support base can be coupled to an actuator assembly, the actuator assembly configured to move the support base and the support structure to mimic human movement. The prosthetic torso assembly can further include a network of silicone tubing between the support structure and the synthetic skin, the network of silicone tubing configured to provide force or pressure sensing in the synthetic skin. The network of silicone tubing can be at least partially embedded in the synthetic skin and adjacent the support structure.

Certain aspects of the disclosure encompass a method for forming a prosthetic torso assembly. The method includes forming a support structure at least partially in a shape of a human torso with a lattice network of rigid material, and disposing a synthetic skin over the support structure and connecting the synthetic skin to the support structure, the synthetic skin including silicone or ballistic gel and configured to imitate a human torso.

This, and other aspects, can include one or more of the following features. Forming a support structure at least partially in the shape of a human torso with a lattice network of rigid material can include printing, with a 3D printer, the support structure. Disposing the synthetic skin over the support structure and connecting the synthetic skin to the support structure can include molding the synthetic skin over the support structure. Forming a support structure with a lattice network of rigid material can include arranging the lattice network of rigid material in a direct mesh pattern to form the support structure. The method can further include forming synthetic breasts connected to the synthetic skin, the synthetic breasts including silicone and configured to imitate female human breasts. Forming synthetic breasts can include forming the synthetic breasts integrally with the synthetic skin. The method can further include positioning a network of silicone tubing between the support structure and the synthetic skin, the network of silicone tubing configured to provide force or pressure sensing in the synthetic skin. Positioning a network of silicone tubing can include at least partially embedding the network of silicone tubing in the synthetic skin and adjacent the support structure.

Some aspects of the disclosure describe a prosthetic female torso assembly including a support structure at least partially in a shape of a human torso, the support structure formed by a lattice network of rigid material, a synthetic skin disposed over the support structure and connected to the support structure, the synthetic skin including silicone or ballistic gel and configured to imitate a human torso, and synthetic breasts connected to the synthetic skin, where the synthetic breasts include silicone or ballistic gel and are configured to imitate female breasts.

This, and other aspects, can include one or more of the following features. The synthetic skin can be made at least partially from a first composition including a 00-10 durometer Ecoflex™ silicone. The synthetic skin can include three layers of the first composition. The synthetic breasts can be made at least partially from a second composition including Qgel 317 silicone. The synthetic breasts can be made from a pliable silicone layer surrounding a volume of silicone gel. The synthetic breasts can be formed integrally with the synthetic skin. The synthetic breasts can be coupled to the synthetic skin.

Some aspects of the disclosure encompass a sensor system including a vessel configured to hold a fluid having a predetermined density and at least partly immerse at least one three-dimensional object having a predetermined buoyancy, and a sensor apparatus configured to sense a three-dimensional form of the three-dimensional object while at least partly immersed in the fluid and provide a data model representative of the sensed three-dimensional form at least partly immersed in the fluid.

This, and other aspects, can include one or more of the following features. The predetermined density of the fluid can render the three-dimensional object substantially buoyancy-neutral. The fluid can include at least one of water and a buoyancy-modifying agent dissolvable in water. The three-dimensional object can include at least a human body part. The human body part can be a female breast. The sensor apparatus can include at least one housing to resist infiltration by the fluid when submerged in the fluid. The sensor apparatus can include a stereo pair of image sensors. The sensor apparatus can include a structured light projector and an image sensor to detect reflected structured light. The sensor apparatus can include at least one of a laser or ultrasonic range finding device. The sensor apparatus can include a three-dimensional ultrasound imaging device. The sensor apparatus can measure at least one of a shape, a density, or an elasticity of at least an internal portion of the three-dimensional object. The sensor system can further include at least one fiducial marker to be affixed to the three-dimensional object, where the sensor apparatus can sense a location of the fiducial marker. The sensor system can further include an actuator to move at least a portion of the sensor apparatus though the fluid relative to the three-dimensional object. The sensor system can further include an apparatus to positionally retain at least a portion of the three-dimensional object substantially stationary in the fluid. The sensor system can further include a computer system to receive sensor data from the sensor apparatus, process the sensor data into the data model, and provide the data model to a user.

Certain aspects of the disclosure encompass a method for three-dimensional sensing including at least partly immersing a three-dimensional object having a predetermined buoyancy in a fluid having a predetermined density, substantially neutralizing, by the fluid, the predetermined buoyancy of the three-dimensional object, at least partly immersing a sensor apparatus in the fluid, sensing, by the sensor apparatus, a three-dimensional form of the buoyancy-neutralized three-dimensional object, and providing a data model, based on the sensing, representative of the three-dimensional, buoyancy-neutralized form of the at least partly immersed, three-dimensional object.

This, and other aspects, can include one or more of the following features. Sensing the three-dimensional form can further include capturing a plurality of stereo pairs of image sensor data. Sensing the three-dimensional form can further include projecting structured light onto the three-dimensional object, and detecting, by an image sensor, the structured light reflected off the three-dimensional object. Sensing the three-dimensional form can further include measuring a range distance between the sensor apparatus and the three-dimensional object. Sensing the three-dimensional form can further include determining least one of a shape, density, or elasticity of at least an internal portion of the three-dimensional object. The three-dimensional object can be a human body part, and the human body part can be a human female breast. The method can further include moving at least a portion of the sensor apparatus through the fluid relative to the three-dimensional object. The method can further include positionally retaining a portion of the three-dimensional object such that the portion of the three-dimensional object is retained substantially stationary in the fluid. The method can further include affixing at least one fiducial marker to the three-dimensional object, where the sensor apparatus can sense a location of the fiducial marker.

In some aspects of the disclosure, a computer-implemented method for three-dimensional sensing includes sensing, by a sensor apparatus at least partly immersed in a fluid having a predetermined density, a three-dimensional form of a three-dimensional object having a predetermined buoyancy, where the three-dimensional object is substantially buoyancy-neutralized by the fluid, and providing a data model, based on the sensing, representative of the three-dimensional, buoyancy-neutralized form of the at least partly immersed, three-dimensional object.

This, and other aspects, can include one or more of the following features. Sensing the three-dimensional form can further include capturing a plurality of stereo pairs of image sensor data. Sensing the three-dimensional form can further include projecting structured light onto the three-dimensional object, and detecting, by an image sensor, the structured light reflected off the three-dimensional object. Sensing the three-dimensional form can further include measuring a range distance between the sensor apparatus and the three-dimensional object. Sensing the three-dimensional form can further include determining least one of a shape, density, or elasticity of at least an internal portion of the three-dimensional object. The three-dimensional object can be a human body part, and the human body part can be a human female breast. The method can further include commanding movement of an actuator configured to move at least a portion of the sensor apparatus through the fluid relative to the three-dimensional object. The method can further include sensing a location of at least one fiducial marker affixed to the three-dimensional object.

In certain aspects of the disclosure, a system includes an apparatus configured to substantially neutralize effects of gravity on a three-dimensional object, and a sensor apparatus configured to sense a three-dimensional form of the three-dimensional object while the three-dimensional object is substantially gravity-neutralized.

Some aspects of the disclosure encompass a method including substantially neutralizing the effects of gravity on a three-dimensional object, sensing a three-dimensional form of the object while the three-dimensional object is substantially gravity-neutralized, and providing a data model based on the sensed three-dimensional form.

Certain aspects of the disclosure encompass a method for analyzing a prosthetic torso with synthetic skin and breast tissue. The method includes monitoring a movement of a prosthetic torso with a sensor, and determining, based on data from the sensor, a viscoelastic characteristic of the prosthetic torso.

This, and other aspects, can include one or more of the following features. The movement can include at least one of a jumping motion, a walking motion, or a running motion. The method can include controlling the movement of the prosthetic torso with an actuator assembly. The prosthetic torso can include a support structure in a shape of a human torso and a synthetic skin disposed over a support structure and connected to the support structure, the synthetic skin including synthetic breasts including silicone and configured to imitate female breasts. Monitoring the movement of the prosthetic torso can include obtaining a motion profile of the prosthetic torso. The motion profile can include an oscillation profile of breasts of the prosthetic torso relative to a remainder of the prosthetic torso. The method can further include generating an acceleration profile and a jerk profile from the motion profile, and determining a viscoelastic characteristic of the prosthetic torso can include determining, at least partially based on the jerk profile, the viscoelastic characteristic of the prosthetic torso. Determining a viscoelastic characteristic of the prosthetic torso can include determining one of an elasticity or a viscosity of the synthetic breasts. The method can include determining whether the at least one of the determined elasticity or the determined viscosity of the synthetic breasts is greater than a threshold elasticity or a threshold viscosity. Monitoring a movement of a prosthetic torso with a sensor can include monitoring, with an optical sensor, the movement of the prosthetic torso. Monitoring a movement of a prosthetic torso with a sensor can include obtaining pressure data from one or more pressure sensors connected to the prosthetic torso during the movement of the prosthetic torso. The method can include obtaining stress/strain profiles of the prosthetic torso based at least partially on the pressure data from the pressure sensors.

Some aspects of the disclosure describe a sensor apparatus including a mannequin configured to emulate a human body part, where the mannequin includes a core configured to emulate flexibility of a substantially inflexible skeletal portion of the body part, and a pliant covering. The pliant covering includes a pliant three-dimensional surface configured to emulate contours of an epidermis of the body part, and at least one pliant three-dimensional interior portion configured to emulate resiliency of a pliant portion of the body part. The sensor apparatus includes at least one pressure sensor arranged between the three-dimensional surface and the core, and is configured to sense pressure applied against the pliant three-dimensional surface.

This, and other aspects, can include one or more of the following features. The pressure sensor can include at least one flexible lumen at least partly filled with a fluid, and a fluid pressure sensor to provide a pressure signal that is representative of a fluid pressure of the fluid. A majority of the flexible lumen is arranged horizontally relative to an upright posture of the mannequin, in a position that is emulative of one of spinal nerves C8-T12. The fluid pressure sensor can be located away from the pliant covering, and the flexible lumen can extend from the fluid pressure sensor to the pliant covering through holes defined along a spinal region of the core. The human body part can be a human torso, the pliant covering can emulate the contours of a human torso, and the pliant three-dimensional interior portion cab be emulative of at least one subdermal torso tissue. The human body part can be a female human torso, the pliant three-dimensional interior portion can be emulative of at least an interior portion of human female breast tissue, and the pliant covering can emulate the contours of at least one human female breast. The pliant three-dimensional interior portion can be configured to emulate movement or recovery of the pliant portion when the body part is subjected to movement or acceleration. The mannequin can be configured be donned with a garment, and the pressure sensor can be configured to sense pressure applied to the mannequin by the garment.

Certain aspects of the disclosure encompass a method of sensing pressure applied by a covering on a body part, the method including providing a pressure sensor apparatus, at least partly covering the pressure sensor apparatus with a covering, applying, by the covering, pressure against the pressure sensor apparatus, sensing the applied pressure, and providing at least one measurement value based on sensed pressure.

This, and other aspects, can include one or more of the following features. The method can further include moving or accelerating the pressure sensor apparatus and the covering, distorting, by the moving or accelerating, at least one pliant portion of the at least one pressure sensor, applying, by the distorting, pressure of the pressure sensor apparatus applied against the covering, sensing the applied pressure, and providing a pressure measurement value of the sensed applied pressure. The distorting can be a time-varying distortion of the pliant portion, the applied pressure can be a time-varying applied pressure, the sensed pressure can be a time-varying pressure, and the pressure measurement value can be a time-varying pressure measurement value. The pressure sensor apparatus can include a core to emulate a substantially inflexible skeletal portion of the body part, and a flexible covering. The flexible covering can include a flexible three-dimensional surface configured to emulate contours of an epidermis of the body part, and at least one flexible three-dimensional interior portion configured to emulate a flexible portion of the body part, and at least one pressure sensor arranged between the three-dimensional surface and the core and configured to sense pressure applied against the flexible three-dimensional surface. The covering can include a garment configured to be worn on the body part. The body part can be a human female torso. Providing a pressure sensor apparatus can include receiving a three-dimensional model of a body part including a core portion model representative of a substantially inflexible skeletal portion of the body part, a surface model representative of three-dimensional contours of an epidermis of the body part, and at least one interior portion model representative of a flexible portion of the body part, and constructing a mannequin based on the three-dimensional model. The constructing can include constructing a core, based on the core portion model, configured to emulate the substantially inflexible skeletal portion of the body part, constructing a flexible covering including a flexible three-dimensional surface, based on the surface model, configured to emulate contours of the epidermis of the body part, and at least one flexible three-dimensional interior portion, based on the interior portion model, configured to emulate a flexible portion of the body part, and arranging at least one pressure sensor between the three-dimensional surface and the core, configured to sense pressure applied against the flexible three-dimensional surface. The human body part can be a female human torso, the pliant three-dimensional interior portion can emulate movement or recovery of the pliant portion when the body part is subjected to movement or acceleration of at least an interior portion of human female breast tissue when the breast tissue is subjected to movement or acceleration, the pliant covering can emulate the contours of at least one human female breast, and the covering can be a garment configured to be worn over at least one human female breast.

In certain aspects of the disclosure, a computer-implemented method for sensing pressure applied by a covering on a body part includes sensing, by a pressure sensor apparatus, a pressure applied by a covering partly covering the sensor apparatus, and providing at least one measurement value based on sensed pressure.

This, and other aspects, can include one or more of the following features. The method can further include moving or accelerating the pressure sensor apparatus and the covering, distorting, by the moving or accelerating, at least one pliant portion of the pressure sensor, applying, by the distorting, pressure of the pressure sensor apparatus applied against the covering, sensing the applied pressure, and providing a pressure measurement value of the sensed applied pressure. The distorting can be a time-varying distortion of the pliant portion, the applied pressure can be a time-varying applied pressure, the sensed pressure can be a time-varying pressure, and the pressure measurement value can be a time-varying pressure measurement value. The pressure sensor apparatus can include a core configured to emulate a substantially inflexible skeletal portion of the body part, and a flexible covering. The flexible covering can include a flexible three-dimensional surface configured to emulate contours of an epidermis of the body part; at least one flexible three-dimensional interior portion configured to emulate a flexible portion of the body part, and at least one pressure sensor arranged between the three-dimensional surface and the core and configured to sense pressure applied against the flexible three-dimensional surface. The covering can include a garment configured to be worn on the body part. The body part can be a human female torso. The method can further include receiving a three-dimensional model of a body part including a core portion model representative of a substantially inflexible skeletal portion of the body part, a surface model representative of three-dimensional contours of an epidermis of the body part, and at least one interior portion model representative of a flexible portion of the body part, and constructing a mannequin based on the three-dimensional model. The constructing can include constructing a core, based on the core portion model, configured to emulate the substantially inflexible skeletal portion of the body part, constructing a flexible covering including a flexible three-dimensional surface, based on the surface model, configured to emulate contours of the epidermis of the body part, and at least one flexible three-dimensional interior portion, based on the interior portion model, configured to emulate a flexible portion of the body part, and arranging at least one pressure sensor between the three-dimensional surface and the core, configured to sense pressure applied against the flexible three-dimensional surface. The human body can be a female human torso, the pliant three-dimensional interior portion can emulate movement or recovery of the pliant portion when the body part is subjected to movement or acceleration of at least an interior portion of human female breast tissue when the breast tissue is subjected to movement or acceleration, the pliant covering can emulate the contours of at least one human female breast, and the covering can be a garment configured to be worn over at least one human female breast.

Some aspects of the disclosure encompass an apparatus including a mannequin configured to emulate the form of at least a portion of a human body, and at least one pressure sensor arranged within the mannequin.

Certain aspects of the disclosure encompass a method including sensing pressure applied to the surface of a mannequin, and providing a measurement based on the pressure.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 4a-4c are a variety of views of example 3D prints and molds of a first model with breasts and a variety of views of example 3D prints and molds of a second model without breasts.

FIG. 10 includes front and side views of and a table of four example formulations for a synthetic skin.

FIGS. 22-25 are plots showing example motion profiles, example acceleration profiles, and example jerk profiles for a torso and areola of example synthetic skin formulations on a prosthetic torso.

Like reference numbers and designations in the various drawings indicate like elements.

DETAILED DESCRIPTION

Figure 1A:
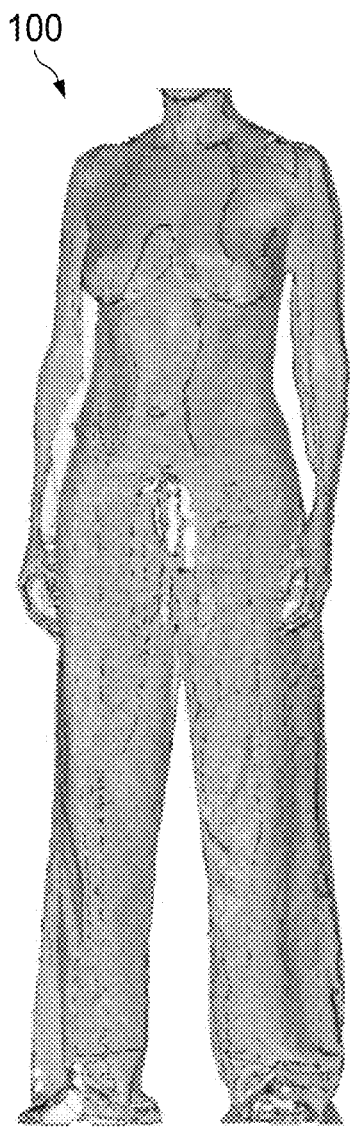
FIGS. 1a-1e are various views of example 3D digital models of a human form generated from a 3D scan of a human subject.

This disclosure describes a human torso simulator system, including an anthropometric mannequin torso, scanning and capturing techniques, and testing and analysis techniques. The human torso simulator system can be used, for example, in fitting torso garments, providing pressure and wear feedback, and providing dynamic motion feedback of support provided by the torso garments.

The human torso simulator system includes a mannequin torso capable of anthropometrically representing a female torso, both in static (e.g., unmoving) and dynamic (e.g., moving, such as a walking or running motion) configurations, for example, to support the evaluation of garment designs, such as brassiere (bra) designs. The human torso simulator system includes multiple components, including scanning and/or modeling techniques, motion system and control software, development of the mannequin torso with synthetic breast tissue and sensors, validation of the system fidelity, and wear testing. The human torso simulator system can provide a better understanding of the tissue structure and its elastic/viscous properties while static, or during movement of the human torso (specifically, breasts of a human torso) during different levels of activities. In some examples, this system can help bra manufacturing companies test and improve the design of bras and develop bras with better support.

Human torso motion, especially human breast tissue motion, results from a complex time-course of force involving multiple joints and muscle groups contributing to an overall kinematics involving predominantly vertical motion with some rotational and angular components. To better evaluate torso garment designs, such as bra designs and their effects on breast dynamics, the present disclosure regards a controlled, non-human, robotic test platform that minimizes variation inherent in human test platforms while also providing a high fidelity, yet practical, human motion path. The disclosure describes a human torso simulator system, such as a breast motion simulator, that provides vertical and rotational motion to a mannequin torso. The disclosure can also provide future implementation of higher degree of freedom of motion beyond two degrees of freedom (i.e., rotational and vertical motion), for example, as a response to criticisms that 2D (rotation/vertical) motion may not accurately mimic human biomechanics, such as during running. The human torso simulator system can also provide motion feedback, such as through encoder and visual methods, as well as provide force and/or pressure feedback of garment fit on the mannequin torso. The characteristics of the mannequin torso (specifically, the synthetic breasts of the mannequin torso) can be compared to the characteristics of a human subject to verify accuracy regarding motion, density, firmness, elastic/viscous properties, and other characteristics.

The mannequin torso includes synthetic skin, synthetic breast tissue, or both, that is optimized to simulate the physical characteristics of human skin, breast tissue, or both. Tissue simulant formulations, described in more detail later, can also allow for mimicking younger versus aging breasts, as well as other conditions affecting breast tissue firmness (e.g., previous pregnancy, and/or other factors). The torso simulator system (e.g., breast motion simulator) of the present disclosure provides a quantifiable and simplified tool, for example, for everyday use by technicians and designers to test the fit and function of torso garment designs, such as brassieres, with quantifiable and reportable results. The simulator system can be used in an industrial setting, within an office setting for designers, or elsewhere and in industries other than the garment industry.

In some implementations, the torso simulator system includes an anthropometric mannequin torso, a housing for the mannequin torso, motion actuators that provide movement (and safety) of the mannequin torso. The motion components include vertical and rotational motion axes, which can actuate by use of pneumatic actuators, servo actuators, electromagnetic actuators (e.g., Lorentz force motors), a combination of these, or other actuators or linear motors. For example, rotational motion can be effected by servo motors or other rotational motion actuators or components. In some instances, non-linear motion actuator(s) can be used to provide incremental and angular encoders (e.g., angular force versus tension or via simple angular encoders) to provide non-linear motion profiles. Rotational motion around a non-linear axis can mirror a rotational motor scheme used in a linear system. Motion control can be pre-programmed or actively controlled with one or more processors. For example, motion control can be performed using a myRTO FPGA/ARM processor controlled via a custom Labview interface on a Windows laptop and communicating via wifi or USB connection. Control and recording of the motion profile can be provided through the Labview interface with initial parameters.

In some implementations, the mannequin torso includes a lattice support structure, for example, formed from SLS 3D printed nylon. The lattice support structure mounts to the rotational axis atop the linear (or non-linear) axis. The lattice support structure is contained within a synthetic skin (e.g., silicone skin) molded to the shape of the human torso (but without breasts), where the synthetic breasts (e.g., silicone breasts) are subsequently attached to (e.g., molded onto) the synthetic skin of the mannequin torso. In some examples, a more durable synthetic skin and/or breast tissue can be made from solid silicone, while a more anthropometrically representative breast tissue can be formed from silicone gel breast tissue simulant encapsulated in a silicone skin. The makeup of the synthetic skin of the torso and/or breast tissue is described in more detail later.

Pressure sensors are disposed between the lattice structure and the synthetic skin, such as embedded in the synthetic skin adjacent the lattice structure, to provide force and/or pressure feedback. The pressure sensors can take the form of silicone tubing in the synthetic skin and can be filled with a fluid, with pressure sensor devices attached to the end(s) of the silicone tubing. The placement of these pressure sensors and their silicone tubings can vary, for example, based on desired locations for pressure readings, such as at the shoulders, breasts, and/or ribcage of the mannequin torso. For example, the placement (or tracks) of the lengths of silicone tubing can provide localization of force sensing, such as pressure measurements corresponding to shoulder weight, circumferential squeezing, or other desired parameters of a torso garment fit (e.g., brassiere fit).

The pressure sensor(s) provide quantifiable data related to position and applied force or pressure from a garment (or other object) on the mannequin torso. The data can be interpreted to determine fit and comfort of the garment overall and/or at target areas, identify areas of concern or in need of improvement, and/or other determinations. For example, a first iteration of a brassiere design can be fit on the mannequin torso, the pressure sensors can identify areas with pressure or force readings above a maximum desired threshold or below a minimum desired threshold. As the brassiere design is continually developed, a later iteration of the brassiere design can be tested and compared to the results of the pressure sensor data from the first iteration of the brassiere design, for example, to see (e.g. view or measure) a quantifiable change (e.g., improvement) between garment iterations and designs.

In some implementations, motion testing and analysis of the mannequin torso include quantification of anthropometric dynamics developed to quantify motion and durometer of the mannequin torso. These quantifications of anthropometric dynamics can be used to validate the anthropometric equivalence of the mannequin torso, for example, in a clinical study including multiple steps. These steps can include: 1) stress/strain/acceleration/jerk; 2) durometer; 3) viscoelastic and damped oscillations; 4) tubing pressure dynamics; and 5) fluorescent marker digital image correlation (DIC) treadmill system.

The present disclosure also describes scanning systems for underwater scanning of the human torso, for example, for obtaining neutral breast position scans. The human female torso provides a more "neutral" position of the breasts when submerged underwater, so the scanning systems described herein are capable of capturing images and scans with a human subject submerged underwater. The results of the scans can be used for more accurate modeling of neutral breast positioning. For example, the scanning system can include an underwater 3D ultrasound robot and an underwater housing for 3D scanner/cameras to provide surface and subsurface scans of breast and torso tissue while the torso is submerged underwater, which provides buoyancy to the breasts, thereby producing a "neutral" position of the breasts. In some instances, a tank system provides a bubble- and current-free water volume for underwater torso scanning.

In general, use of the human torso simulator system can include the steps of: 1) obtaining a 3D scan of a human model; 2) creating a first digital model of the torso with breasts and a second digital model of the torso without breasts; 3) creating outer molds of the digital model(s); 4) generating (e.g., model and 3D print) a lattice support structure in the general form of the second digital model without breasts and with an inner offset from the periphery of the second digital model; 5) disposing one or more pressure sensors on the lattice structure for sensing pressure, force, or other properties; and 6) disposing (e.g., molding) a synthetic skin onto the lattice support structure, thereby connecting (e.g., embedding) the pressure sensors in the synthetic skin. The synthetic skin may or may not include synthetic breasts. If the synthetic skin does not include synthetic breasts at this stage, then another step can generally include disposing synthetic breasts (molded according to the first digital model) onto the synthetic skin. The human torso simulator system can further include attaching the mannequin torso to a base structure configured to actuate, and/or can further include wear testing, validation testing, and other testing and analysis.

Human Form Scanning

Figure 1B:
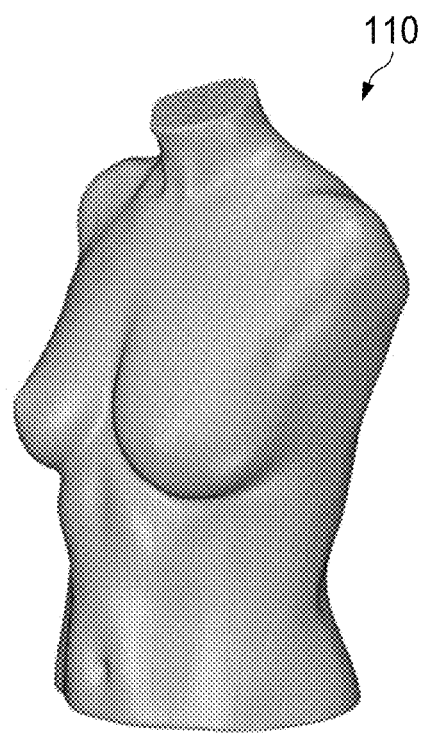
Figure 1C:
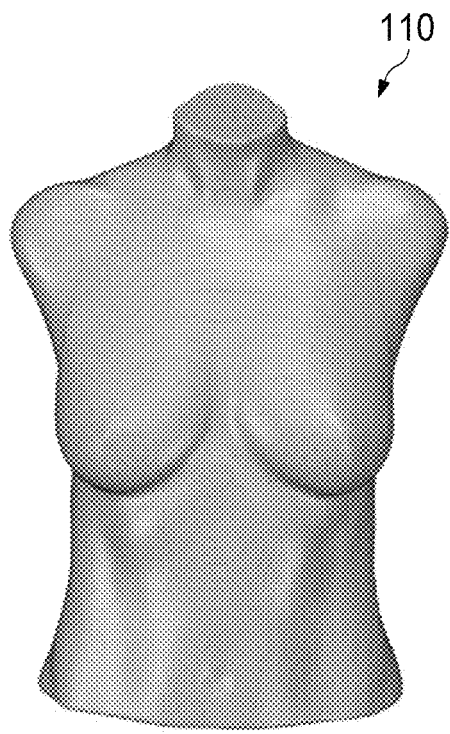
Figure 1D:
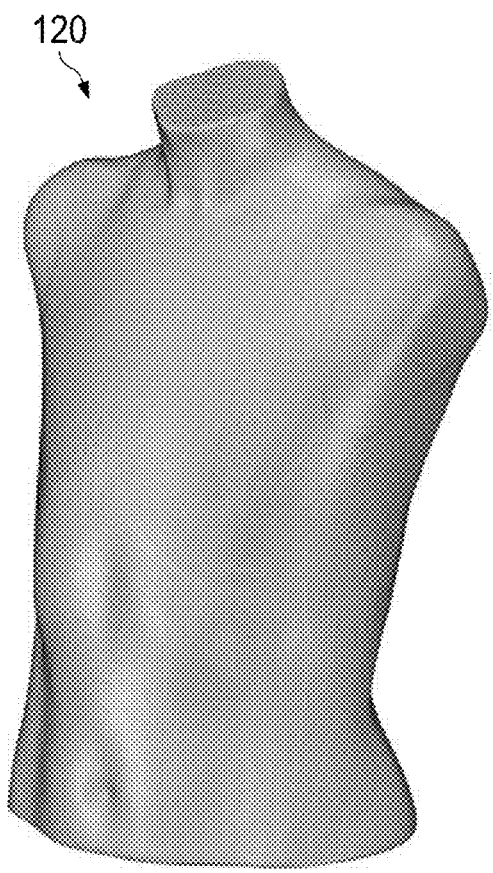
Figure 1E:
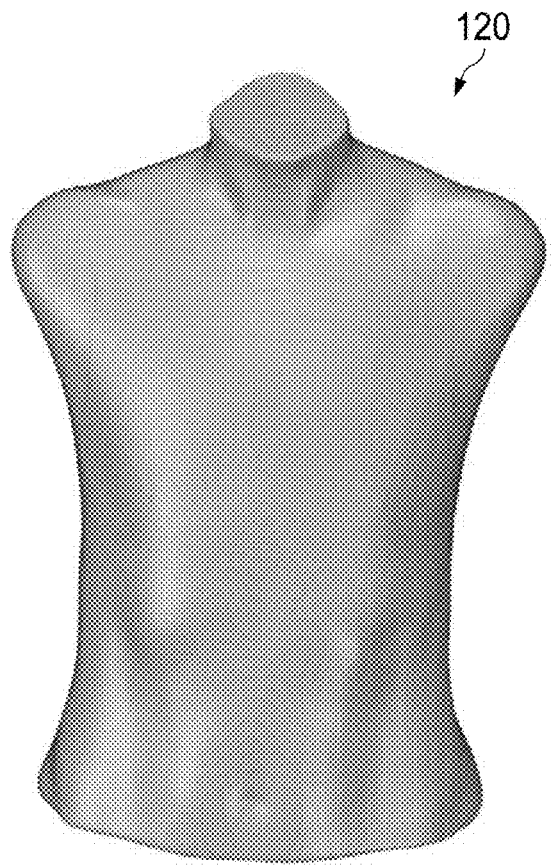

As described above, the human torso simulator system includes a mannequin torso (e.g., breast motion simulator) capable of anthropometrically representing a female torso. Generating this mannequin torso may first include scanning one or more human forms (e.g., a human torso, specifically, a human female torso) to produce one or more 3D digital models of a human torso. One or more of these 3D digital models can be used as a basis for one or more mannequin torsos. For example, FIGS. 1a-1e show 3D example digital models 100, 110, 120 of a human form generated from a 3D scan of a human subject. Specifically, FIG. 1a shows model 100 as a full body model (with the head redacted) of a human subject. FIGS. 1b and 1c show a perspective view and a front view (respectively) of model 110, which is a partial upper torso model without a head and arms. FIGS. 1d and 1e show a perspective view and a front view (respectively) of model 120, which is similar to model 110, except model 120 has the breasts removed.

Figure 2A:
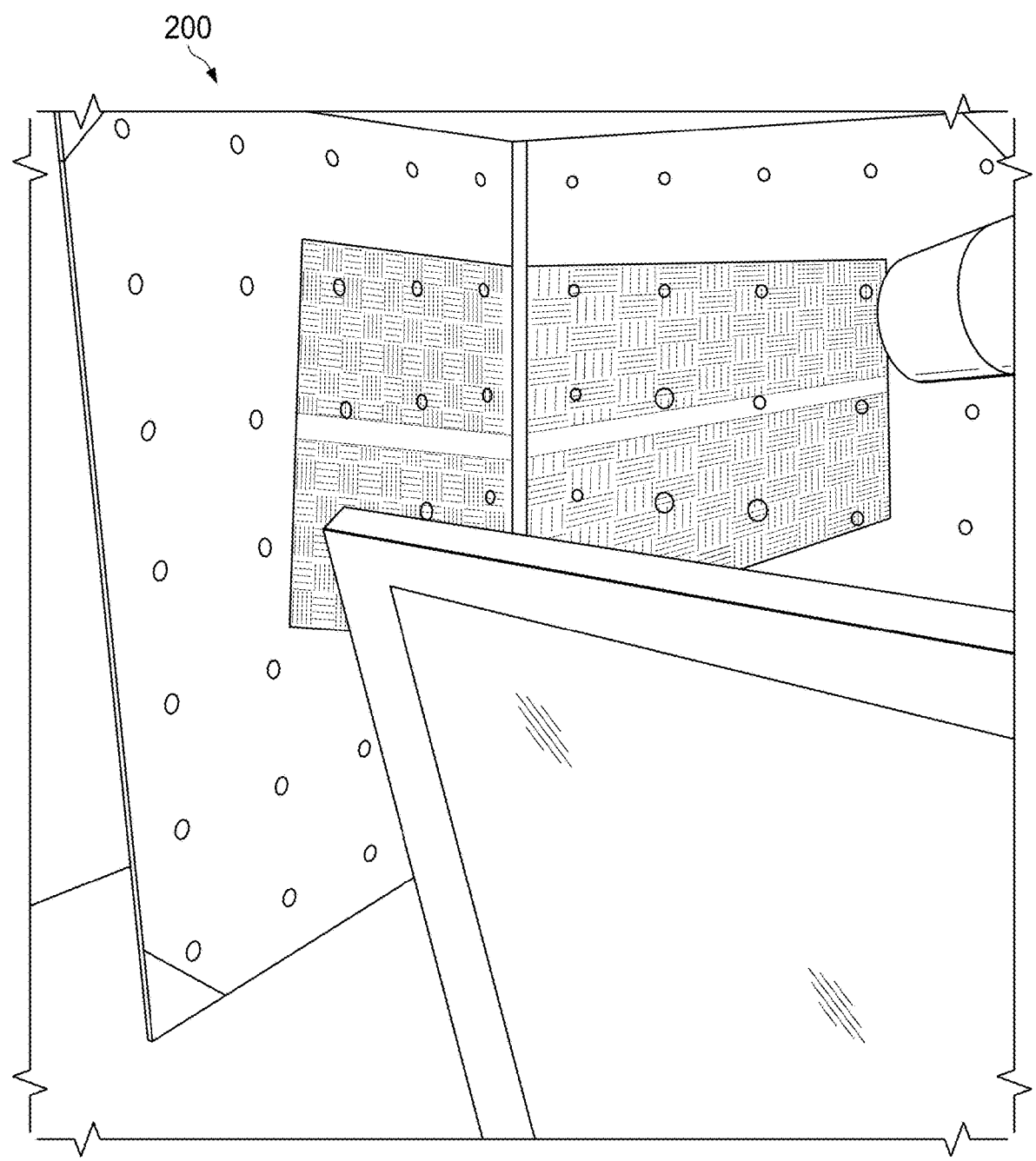
FIG. 2a is a partial view of an example structured light scanning assembly.

The digital model(s) can be obtained in a number of different ways, such as 3D scanning groups, photogrammetry, time-of-flight sensing, structured light (e.g., see FIG. 2a for example structured light scanning assembly 200), 3D ultrasound, elastography, CT scan (computerized tomography), CAT scan (computerized axial tomography), Mill (magnetic resonance imaging), a combination of these, or other scanning techniques. In some instances, surface scanning only may be insufficient in scanning a human subject. For example, a surface scan of a human torso may not accurately detect breast overhang (e.g., the sag of breast tissue that contacts the skin), which could lead to less than accurate scans of the human subject. As such, scanning techniques that include, at least in part, a three-dimensional scan (e.g., ultrasound, CT scan, Mill, 3D ultrasound elastography, and/or others) can provide a more accurate digital model of a human subject.

Figure 2B:
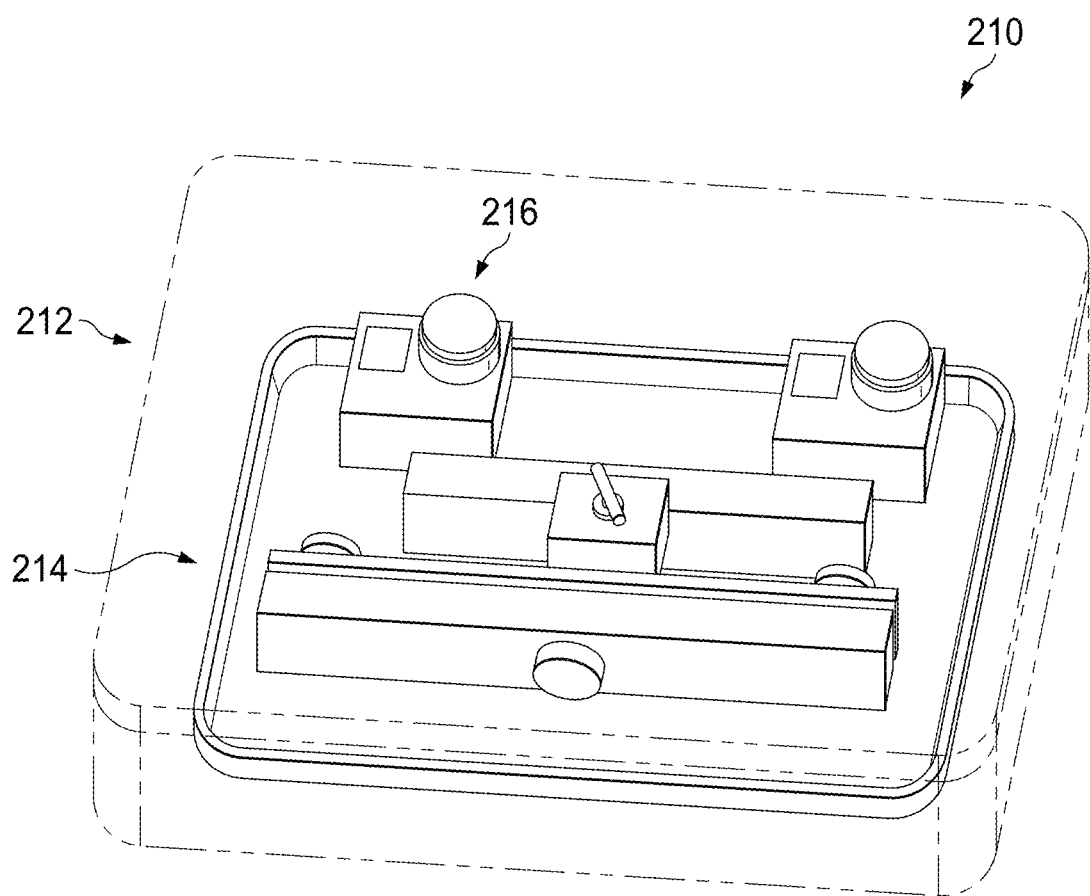
FIGS. 2b-2e are various views of an example sensor system with a sensor apparatus and a support structure.

In some implementations, the scanning technique can include scanning a human subject underwater such that the buoyant force of water (or salt water) biases the breasts of the subject toward their "neutral" position. This scanning technique can provide a digital model of breasts in a neutral position. For example, FIGS. 2b-2e show an example sensor system 210 that includes a sensor apparatus 212, and in some implementations, a support structure 218 to support and hold the sensor apparatus 212. The sensor apparatus 212 can include a housing 214 that houses a sensor 216, the sensor being configured to perform a scan of a subject immersed underwater in a vessel (e.g., a pool, bath, or other structure capable of holding water or other fluid). In some examples, such as instances where the sensor 216 is waterproof, the housing 214 can be excluded. The sensor 216 can take many forms, and can include one or more sensor types. For example, FIG. 2b shows the sensor 216 as including a laser pico projector, a 4k webcam based 3D structured laser scanner, two GoPro™ Hero 4 cameras with distortion free lenses (e.g., for photogrammetry 3D scanning underwater) that can be triggered through a 3.5 mm audio jack port, and a 3D scanner sensor (e.g., "structure.io" sensor). However, the sensor 216 can include additional, fewer, and/or different sensor types. The example sensor 216 may include redundant sensors for failsafe, redundant scanning of a human subject. The sensor(s) 216 is/are housed within waterproof housing 214, which can include waterproofed cable channels extending from the housing 214 to a computer or other receiver configured to connect to the cables and communicate with (e.g., receive input from or trigger) the sensor(s) 216. The sensor system 210 can include a cable (e.g., a six foot cable providing 3.5 mm stereo audio plug and 5× USB3.0 connections inside the housing 214) between the sensor(s) 216 and a processor/computer. A clear, flat surface of the housing 214 provides a window for 3D scanning of the subject by the sensor(s) 216.

Figure 2C:
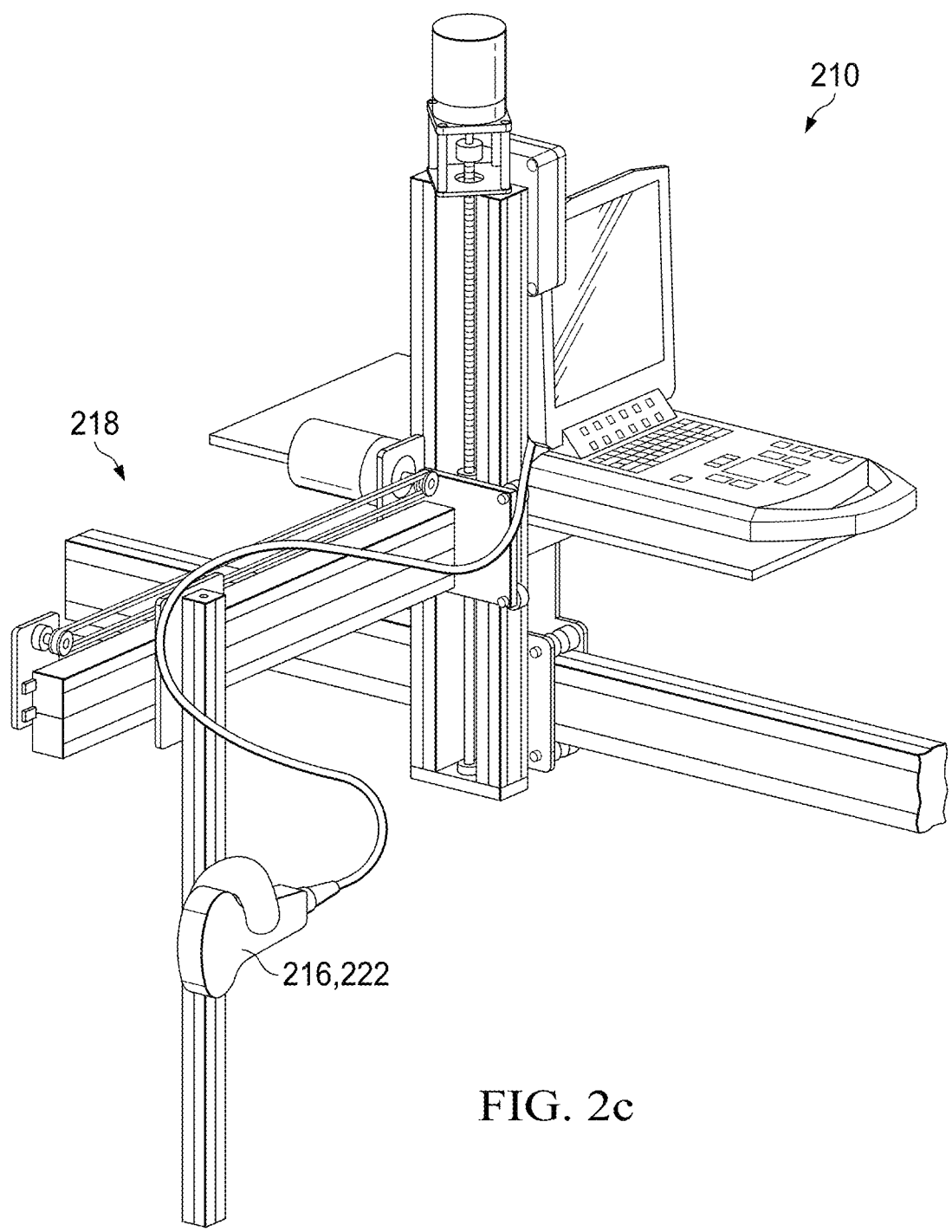
Figure 2D:
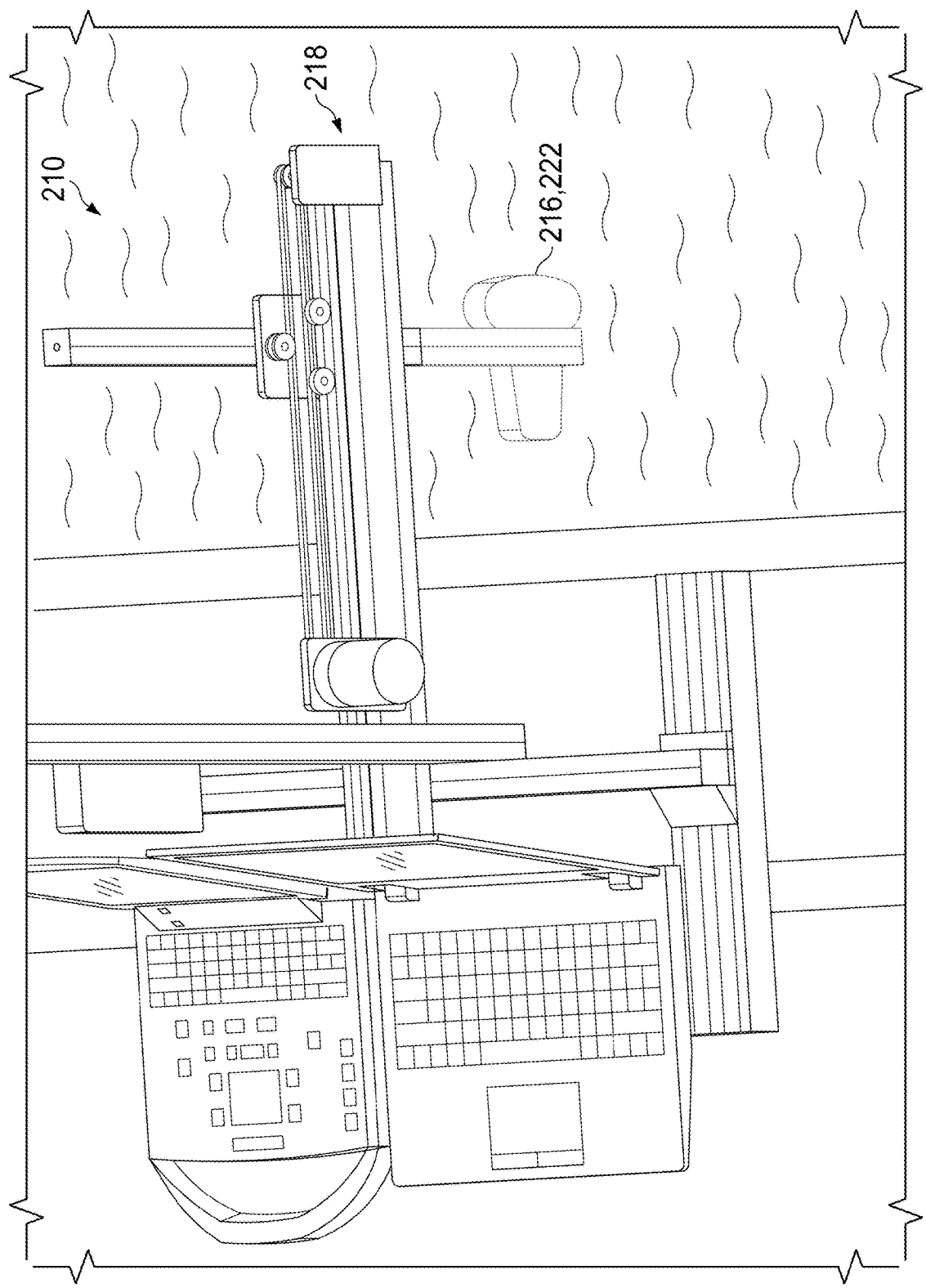
Figure 2E:
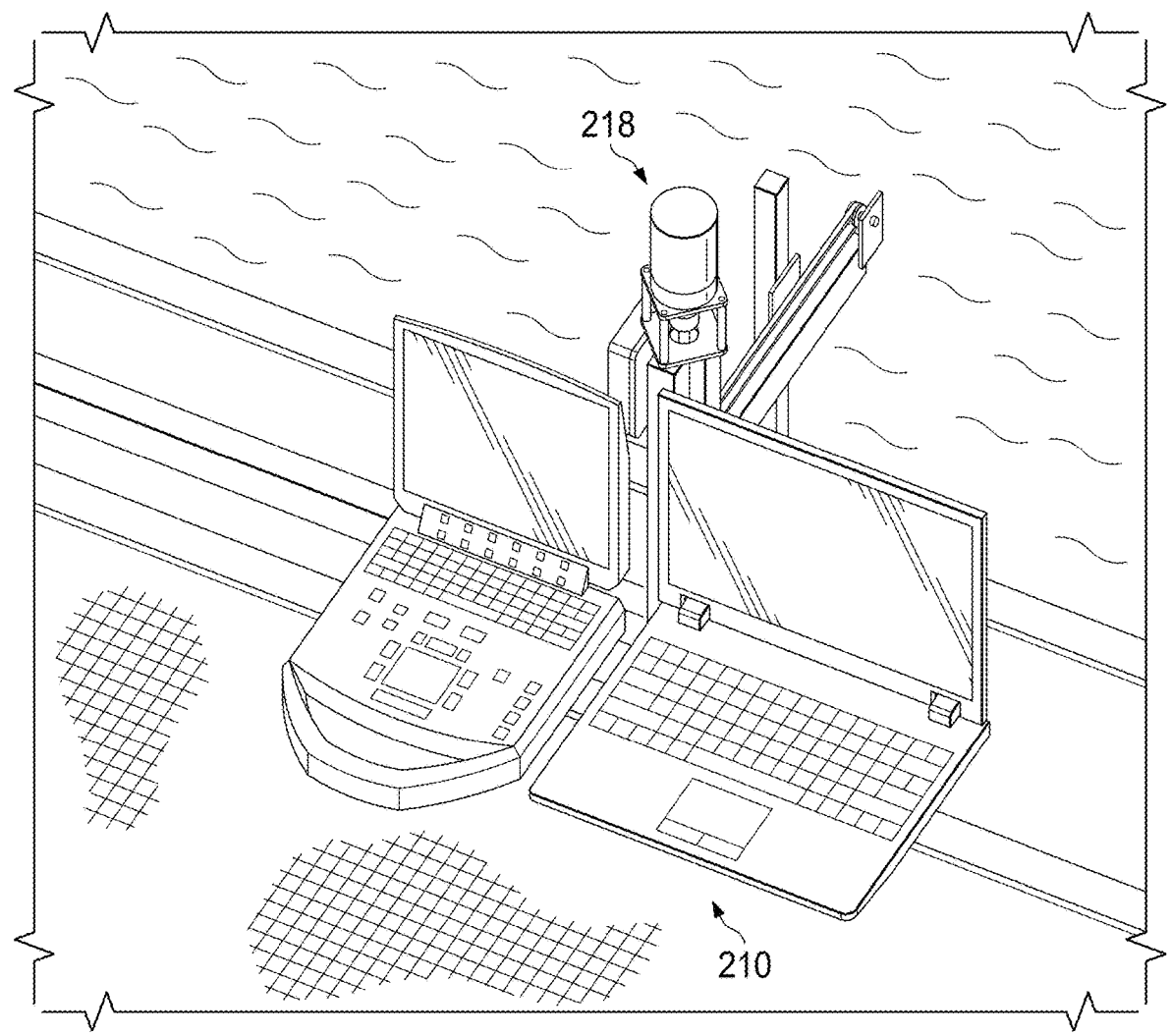

FIGS. 2c-2e show the sensor(s) 216 (in the example form of a 3D ultrasound probe 222) on an example support structure 218. The example support structure 218 can include a 3-degree-of-freedom stage with a sensor holder that protrudes (from above the surface of the water) underwater to hold the example ultrasound probe 222 (and/or other example sensor 216). Single axis scans can be made and images can be recorded from an ultrasound video output or recorded as DICOM images on the ultrasound. The series of images can be post-processed into 3D models using a variety of software.

In some implementations, the example support structure 218 can be actuated to move the sensor(s) 216 around the subject being scanned, for example, to provide a more complete and thorough 3D scan of the subject. As mentioned earlier, this scanning technique may better reflect the actual anatomy of the subject as compared to a single-location and/or surface scan, such as by accurately capturing the breast overhang in a neutral (buoyant) orientation of the breasts of the subject.

The example sensor system 210 may be used to form a digital scan used as the basis for the first model 110, the second model 120, or both the first model 110 and the second model 120, where the second model 120 (with breasts) can incorporate the neutral position of the breasts of the subject.

Though FIGS. 1a-2e are shown as scanning techniques for a human female torso, the scanning techniques are applicable to other subjects, such as male or female human subjects, mannequins, or other non-human subjects.

In some implementations, the example sensor system 210 includes a vessel (e.g., a pool, bath, or other) to hold a fluid (e.g., water or salt water) having a predetermined density and to at least partly immerse at least one three-dimensional object (e.g., a human subject) having a predetermined buoyancy, and a sensor apparatus (e.g., sensor apparatus 210, 212) that senses a three-dimensional form of the three-dimensional object while at least partly immersed in the fluid and provides a data model representative of the sensed three-dimensional form at least partly immersed in the fluid. The predetermined density of the fluid renders the three-dimensional object substantially buoyancy-neutral. The fluid can include at least one of water and a buoyancy-modifying agent dissolvable in water. The three-dimensional object can include at least a human body part, such as a female breast. The sensor apparatus can include at least one housing (e.g., housing 214) that resists infiltration by the fluid when submerged in the fluid.

As described earlier, the sensor 216 of the sensor apparatus can include a variety of sensors. For example, the sensor 216 can include a stereo pair of image sensors, a structured light projector and an image sensor to detect reflected structured light, at least one of a laser or ultrasonic range finding device, a three-dimensional ultrasound imaging device, a combination of these, or another sensor. The sensor apparatus can be used to measure at least one of a shape, a density, and/or an elasticity of at least an internal portion of the three-dimensional object. In some examples, the three-dimensional object can include at least one fiducial marker affixed to the three-dimensional object, where the sensor apparatus can sense a location of the fiducial marker(s).

The sensor apparatus can include an actuator configured to move at least a portion of the sensor apparatus though the fluid relative to the three-dimensional object. For example, the example support structure 218 can include one or more actuators to move the example sensor 216 in a circular motion about the subject, in a three-axis realm of movement, or in another movement pattern to capture the subject. In some instances, the example support structure 218 can also positionally retain (at least a portion of) the three-dimensional object to be substantially stationary in the fluid. In some implementations, the example sensor system 210 includes a computer system to receive sensor data from the sensor apparatus, process the sensor data into the data model, and provide the data model to a user.

Figure 3:
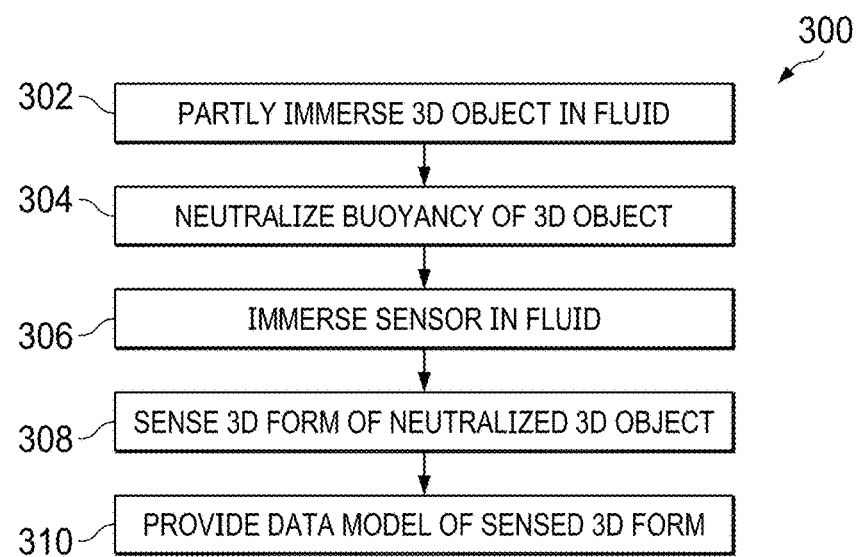
FIG. 3 is a flowchart of an example method for three-dimensional sensing.

FIG. 3 is a flowchart of an example method 300 for three-dimensional sensing, for example, using the example sensor system 210 of FIGS. 2b-2e. At 302, an object is at least partly immersed in a fluid with a predetermined density, the object having a predetermined buoyancy. At 304, the predetermined buoyancy of the object is substantially neutralized by the fluid. At 306, a sensor is at least partly immersed in the fluid. At 308, the sensor senses a three-dimensional form of the buoyancy-neutralized three-dimensional object. At 310, a data model, based on the sensing, is provided that is representative of the three-dimensional, buoyancy-neutralized form of the at least partly immersed, three-dimensional object. Sensing the three-dimensional form can include capturing a plurality of stereo pairs of image sensor data. Sensing the three-dimensional form can include projecting structured light onto the three-dimensional object, and detecting, by an image sensor, the structured light reflected off the three-dimensional object. Sensing the three-dimensional form can include measuring a range distance between the sensor apparatus and the three-dimensional object. Sensing the three-dimensional form can include determining least one of a shape, density, or elasticity of at least an internal portion of the three-dimensional object. The method can include moving at least a portion of the sensor through the fluid relative to the three-dimensional object. The method can include positionally retaining a portion of the three-dimensional object, such that the portion of the three-dimensional object is retained substantially stationary in the fluid. The method can include affixing at least one fiducial marker to the three-dimensional object, where the sensor apparatus can sense a location of the fiducial marker.

In some implementations, the example sensor system 210 can include a computer-implemented method for three-dimensional sensing, similar to the method 300 of FIG. 3. For example, the computer-implemented method can include sensing, by a sensor apparatus at least partly immersed in a fluid having a predetermined density, a three-dimensional form of a three-dimensional object having a predetermined buoyancy, wherein the three-dimensional object is substantially buoyancy-neutralized by the fluid, and providing a data model, based on the sensing, representative of the three-dimensional, buoyancy-neutralized form of the at least partly immersed, three-dimensional object.

In some implementations, a sensor system includes an apparatus configured to substantially neutralize effects of gravity on a three-dimensional object. The apparatus can take on a variety of forms, such as a zero-gravity environment assembly (e.g., outer space testing) or other assemblies. The sensor system also includes a sensor to sense a three-dimensional form of the three-dimensional object while the three-dimensional object is substantially gravity-neutralized. In certain implementations, a method can include substantially neutralizing the effects of gravity on a three-dimensional object (e.g., in a zero-gravity environment), sensing a three-dimensional form of the object while the three-dimensional object is substantially gravity-neutralized, and providing a data model based on the sensed three-dimensional form.

Mannequin Torso

Figure 4A:
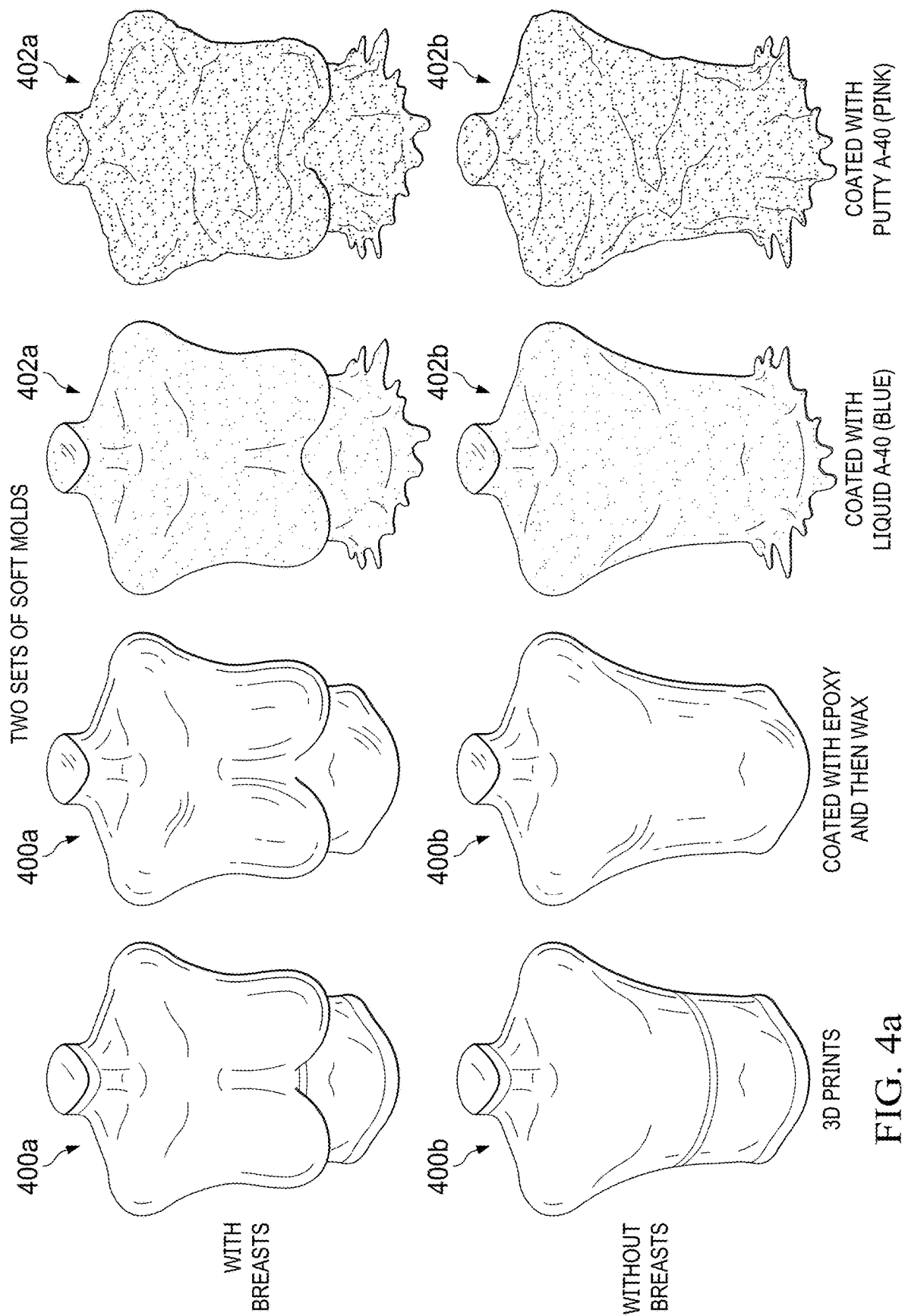
Figure 4C:
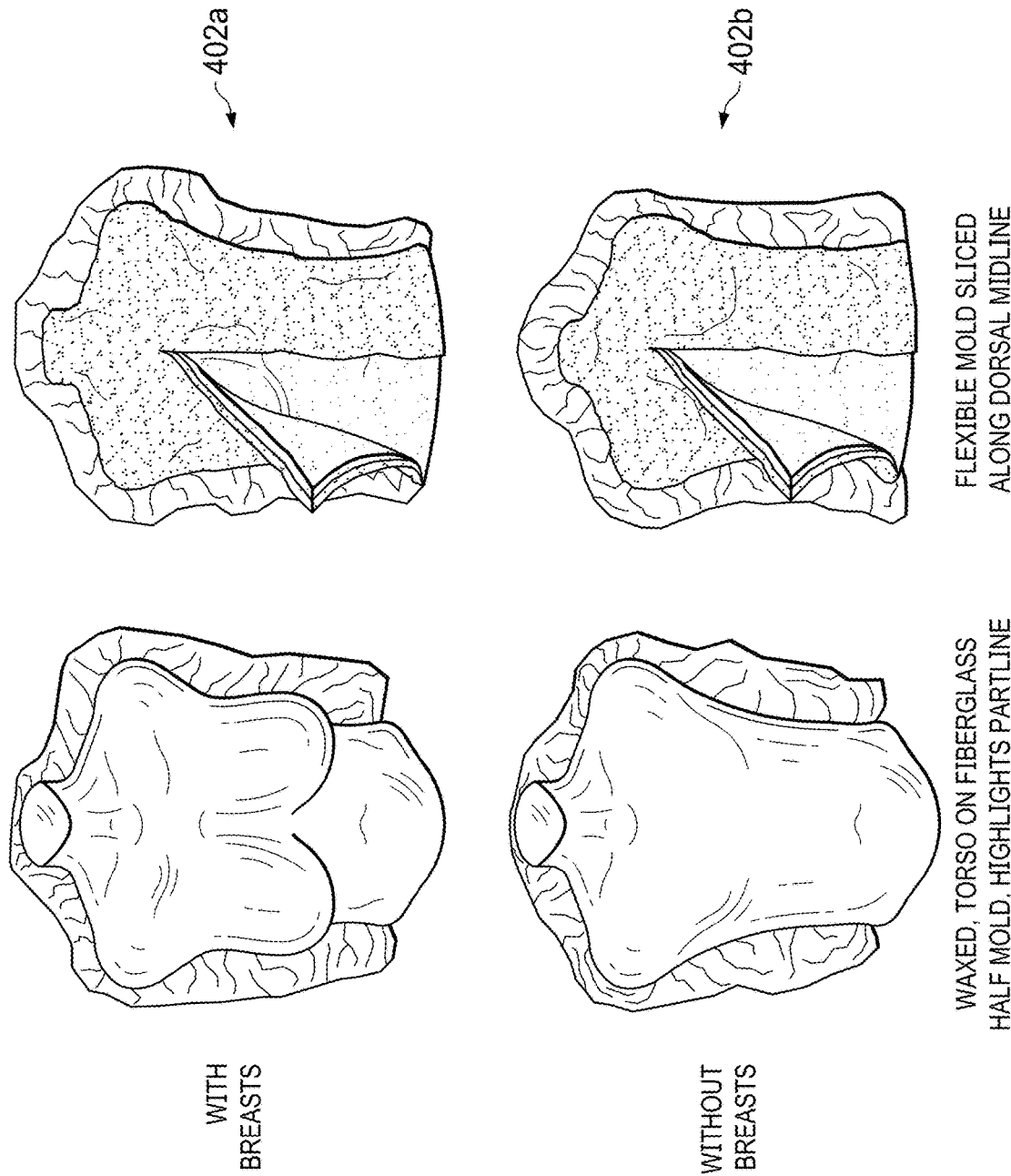

Either or both of the first model 110 (with breasts) or the second model 120 (without breasts) are used to create the prosthetic mannequin torso described herein. For example, the first model 110 and/or second model 120 are used to create molds for the mannequin torso. FIGS. 4a-4c show a variety of views of example 3D prints 400a and molds 402a of the first model 110 (with breasts) and a variety of views of example 3D prints 400b and molds 402b of the second model 120 (without breasts). The prints 400a and 400b are used to create the molds 402a and 402b, respectively, and the molds 402a and 402b can be used as outer periphery molds in the creation of synthetic skin and/or synthetic breast tissue (described in more detail hereafter). The molds 402a and 402b can be made of a variety of materials, such as a combination of epoxy, wax, and putty, and can be made to be flexible or rigid.

From the second model 120 (without breasts), a support structure in the form of a lattice network of rigid materials is formed. The support structure, sometimes referred to as a lattice structure or lattice support structure in examples herein, is digitally formed starting from the second model 120, then manufactured (e.g., 3D printed) to create a physical structure. The support structure functions as a rigid core structure that synthetic skin and synthetic breast tissue connect to, and also forms a rigid core structure that can rigidly mount to a movable base, for example, for motion control and testing. The support structure imitates the shape, rigidity, or both shape and rigidity, of an underlying skeletal structure of a human subject (or other subject). The support structure can be formed in the (exact or general) shape of an underlying skeletal structure, or can be formed generally in the shape of the subject but with an inner offset to allow for a generally consistent thickness of synthetic skin to be applied onto the support structure. In some instances, the lattice network of rigid material is used to decrease weight of the support structure (e.g., as compared to a solid, consistent-thickness support surface), and can provide functional benefits of increased flexibility due to its lattice network as compared to a solid surface, and can further allow for a secure attachment to a synthetic skin (e.g., silicone skin layer or layers), such that the silicone intercalates into the openings of the lattice network of material.

Figure 5A:
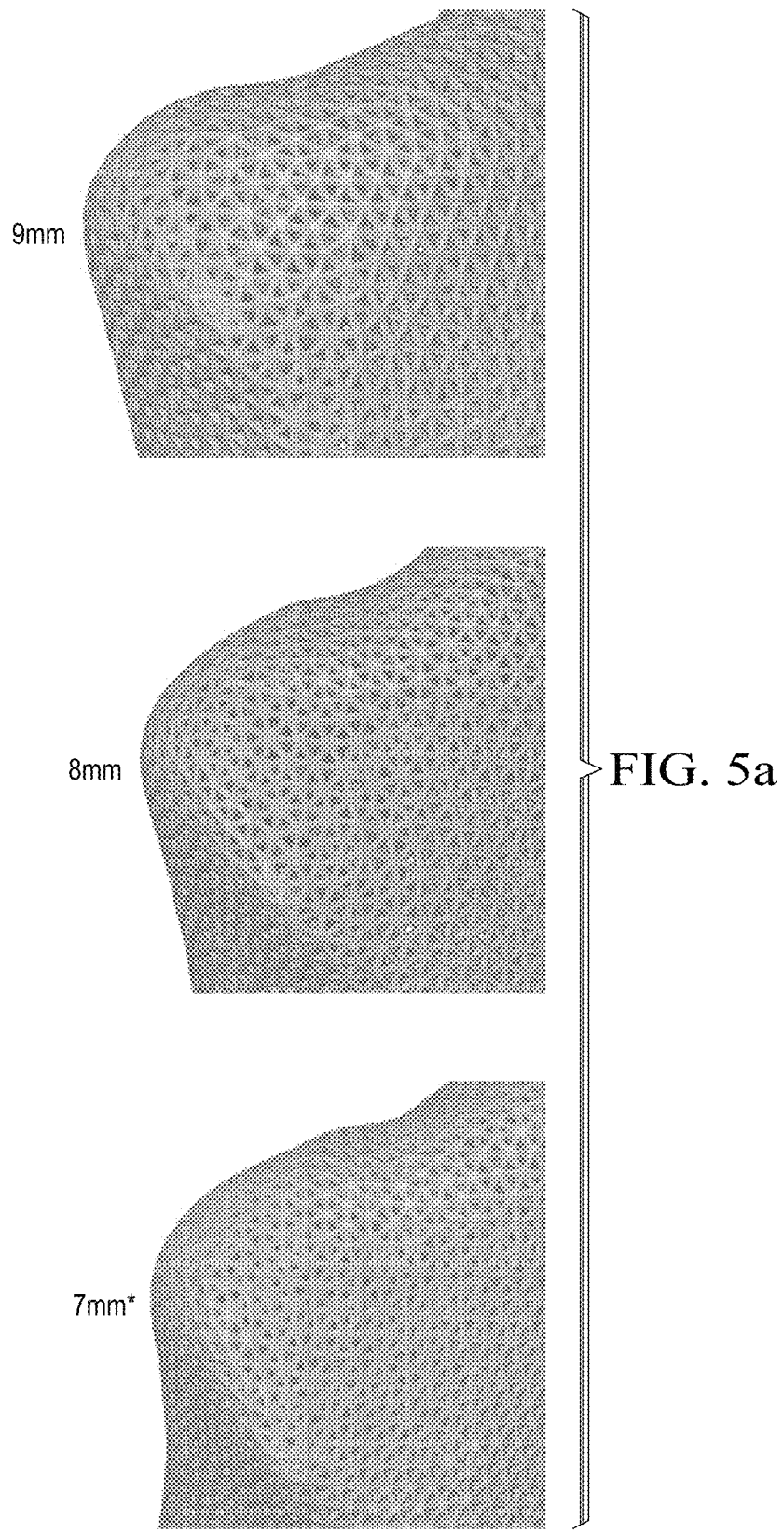
FIG. 5a is three close-up views of lattice networks of rigid material with different facet sizes.
Figure 5B:
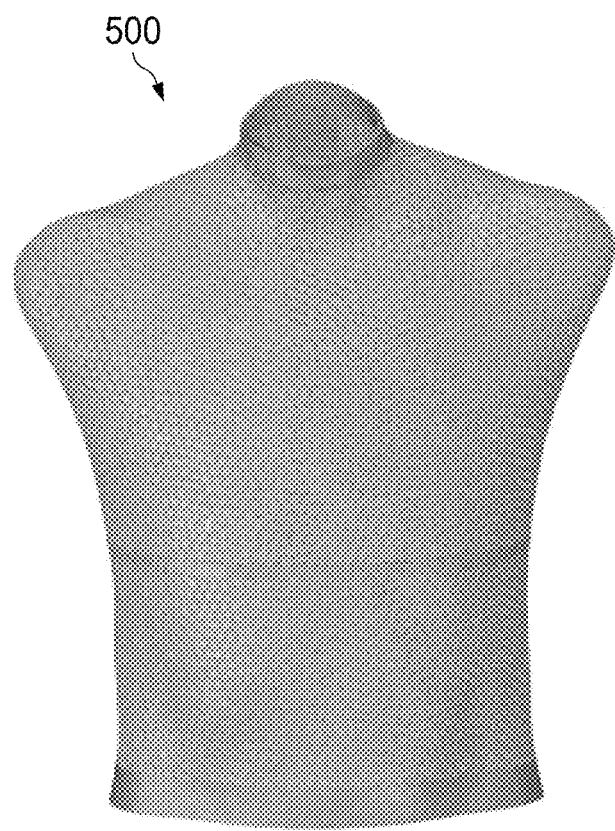
FIGS. 5b and 5c are a front view and a bottom view of a digital model of an example support structure incorporating a structural lattice network.
Figure 5C:
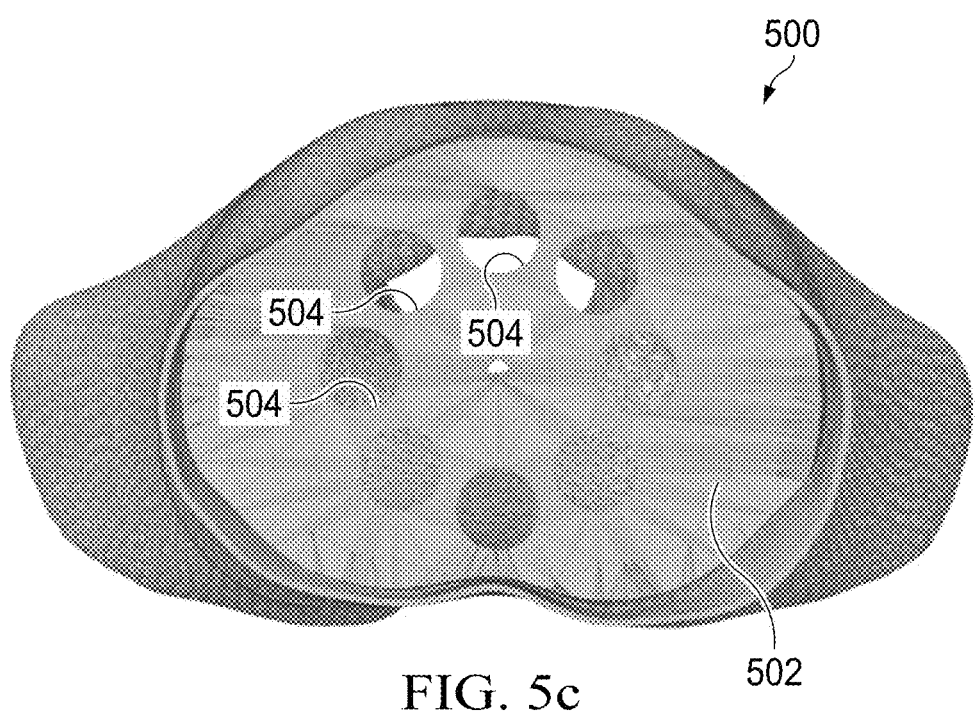
Figure 6A:
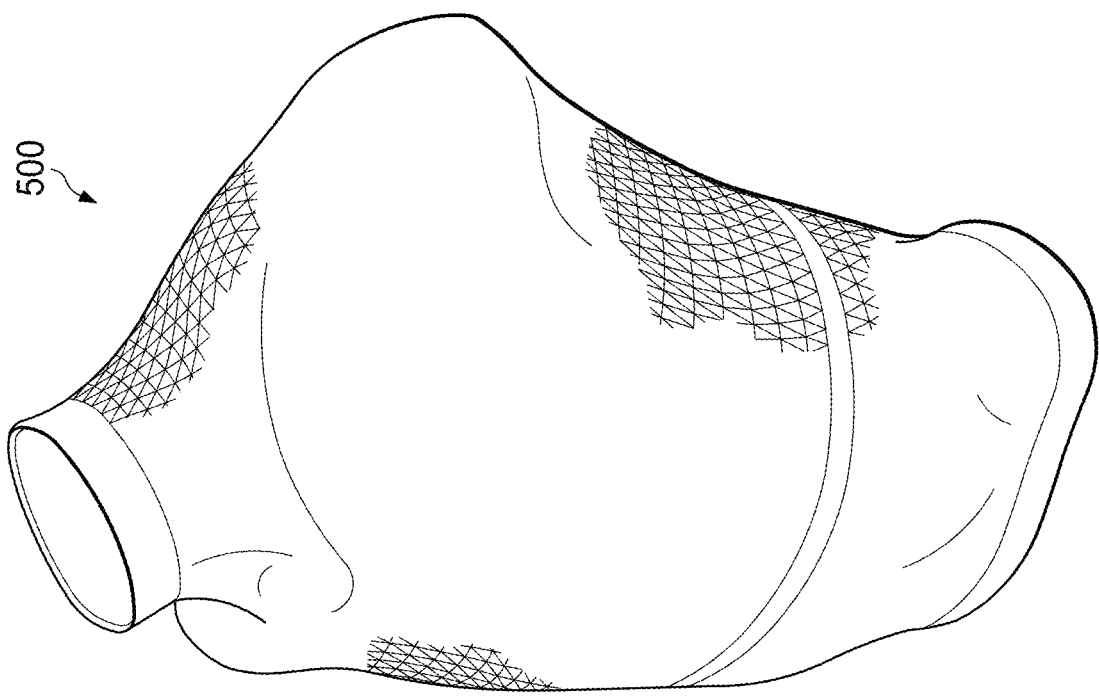
FIGS. 6a-6c are a front view, perspective side view, and rear view of a physical model of the example support structure of FIGS. 5b and 5c.
Figure 6B:
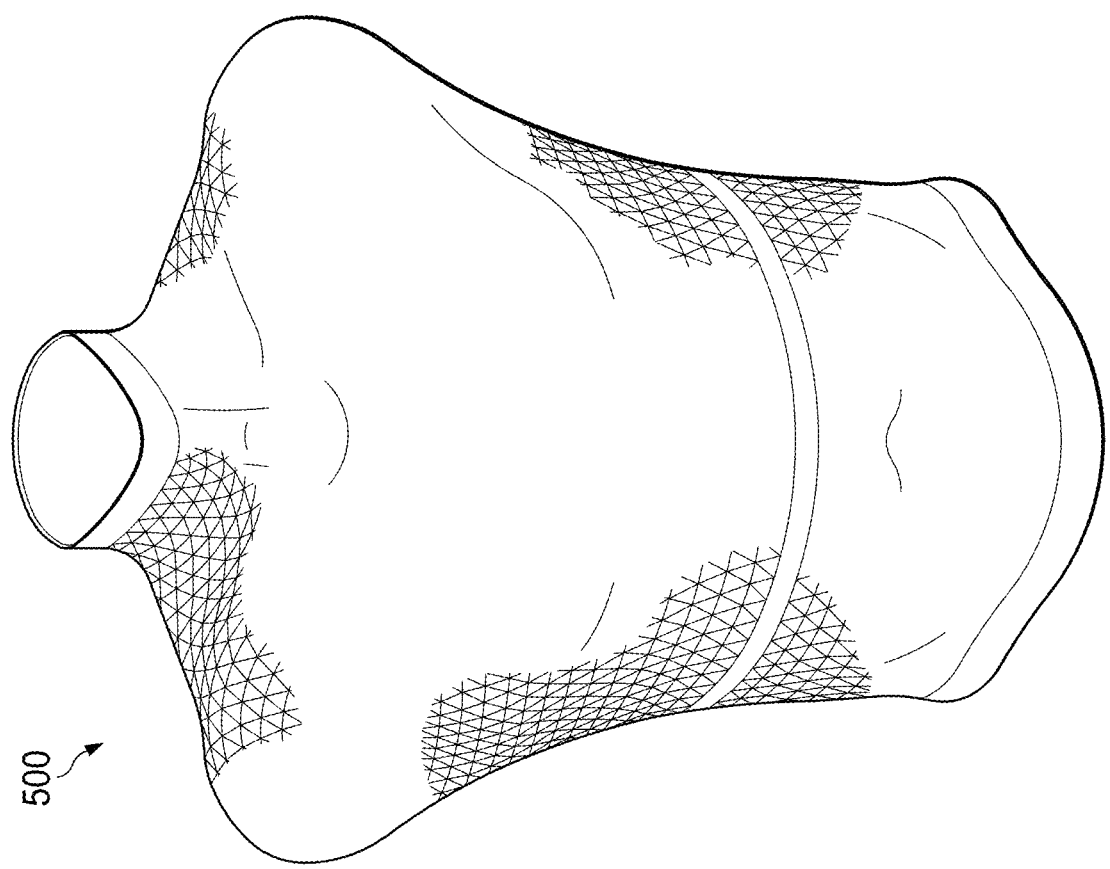
Figure 6C:
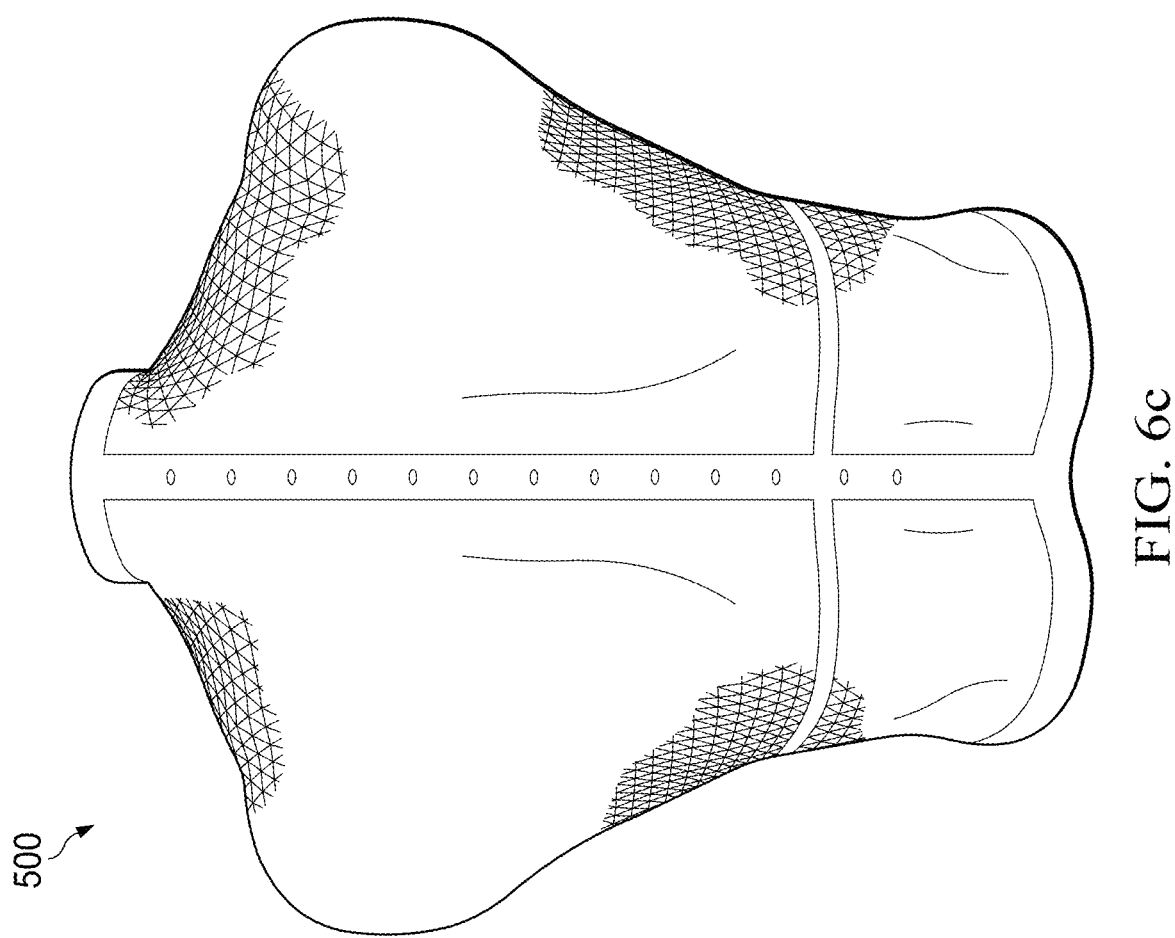

The design of the lattice structure can vary. FIG. 5a provides three close-up views of a lattice network of rigid material with a 9 millimeter (mm) facet size, an 8 mm facet size, and a 7 mm facet size. The facet size of the lattice network can vary beyond 7 mm, 8 mm, and 9 mm, for example, to a facet length of greater than 9 mm, less than 7 mm, or between 7 mm and 9 mm, to a desired size and rigidity of the support structure. FIGS. 5b and 5c show a front view and a bottom view of a digital model of an example support structure 500 incorporating a structural lattice network, and FIGS. 6a-6c show a front view, perspective side view, and rear view of a physical model of the example support structure 500 of FIGS. 5b and 5c.

Figure 7:
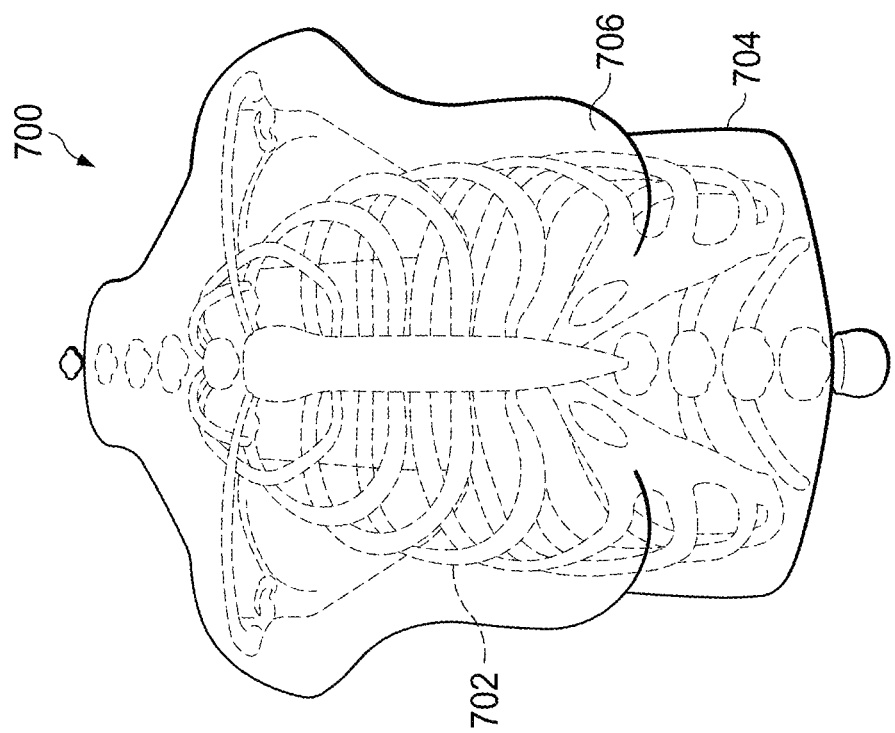
FIG. 7 is a front schematic view of an example model of a partial female human torso with a skeletal structure, epidermal layer, and intermediate tissue.

The shape of the example support structure 500 is based on the female torso 3D scan that has had the breasts digitally removed (e.g., the second model 120), and is offset from that female torso 3D scan inwardly a specified thickness. The size of this inner offset can vary, for example, based on the desired thickness of the synthetic skin material to be placed on the support structure. In the example support structure 500, the inner offset is 7.5 mm, and is offset consistently throughout the torso relative to the female torso 3D scan without the breasts. In some instances, this offset can be different, such as a different dimension that is consistent between the support structure 300 and the 3D scan, or can be a variable offset at various locations about the support structure. For example, the exact shape of the support structure 500 and/or the synthetic skin (described in more detail later) can vary based on the type and quality of 3D scan available. For example, the rigid support structure 500 can more accurately resemble the shape and location of a skeletal structure, and the synthetic skin can vary in thickness, density, composition, and/or other characteristics to more accurately match the epidermal layer, tissue, muscular structure, and/or other anthropometric characteristics of the scanned subject. FIG. 7 shows an example model 700 of a partial female human torso with a skeletal structure 702, epidermal layer 704, and intermediate tissue 706 between the skeletal structure 702 and the epidermal layer 704. In certain implementations, the support structure 500 can match (exactly, substantially, or more closely) the skeletal structure 702 in shape, location, and/or rigidity, and the synthetic skin layer can match (exactly, substantially, or more closely) the epidermal layer 704 and/or intermediate tissue 706 in variable thickness, shape, location, density, and/or other characteristics. For example, an MRI, 3D ultrasound, or other scanning techniques may provide an anthropometrically accurate scan of a subject (e.g., skin and bone structure and body mass index, which can vary by subject age, girth pre- and post-pregnancy, and other factors), which can be used to provide a more anthropometrically accurate support structure (e.g., 500) and synthetic skin to match, at least partially, the anatomy of a human body.

For convenience of manufacturing, the example support structure 500 has a 7.5 mm offset, with the lattice network of rigid material of the example support structure 500 being 3 mm thick, thereby allowing about 6 mm of skin material between the outermost edge of the lattice network material and the 3D scanned surface. The surface facets can be made uniform, for example, with an average facet length of at or between 7 mm and 9 mm, though the facet length can vary to a desired dimension, such as to achieve a desired rigidity. The thickness of the lattice network of material can vary as well, for example, to provide more or less rigidity in the support structure.

The offset allows a desired thickness of the synthetic skin (for example, to substantially match human skin, anatomically and/or anthropometrically) while also providing a final mannequin torso periphery size that is accurate (exactly or substantially) to the scanned subject. In implementations of a human female torso, the support structure 500 excludes a profile of the breasts, for example, since the breast tissue is generally flexible and excludes a rigid core.

In some implementations, the example support structure 500 includes a base, for example, a base plate 502 as shown in FIG. 5c. The base plate 502 allows for selective attachment to a support base of an actuator assembly, described in more detail later. The example base plate 502 is integral with the lattice network of rigid material, and is made from the same rigid material as the lattice network. The base plate 502 includes attachment points 504, for example, in the form of apertures, notches, or other shapes and patterned to selectively engage with a support base of an actuator assembly, a support base of a mount, or other support structure. The attachment points can vary in structure, shape, and location than those shown in FIG. 5c, for example, based on the support base that the base plate 502 is configured to selectively attach to. In some implementations, the base plate 502 (or other base) rigidly attaches to (but may not be integrally formed with) the lattice network of rigid material.

The digital model of the example support structure 500 can be generated in a variety of ways. For example, the software NTOPOLOGY can be used when inputted with the listed parameters (e.g., thickness, facet length, lattice type, and/or others). The physical model of the support structure 500 is formed from rigid material based on the digital model. In some implementations, the support structure 500 is 3D printed in a single part, or it can be 3D printed in sections. In some examples, the support structure 500 is printed with SLS nylon, though the material used to print the support structure 500 can vary.

The spacing of the lattice network of rigid material provides for attachment of the synthetic skin to the material without special treatment or adhesives. For example, in instances where the synthetic skin is made at least partly of silicone or gel and the support structure 500 is made at least partly of nylon, the synthetic skin can attach to the support structure inherently due to the material compositions and the spacing in the lattice structure.

With the example support structure 500 formed, a synthetic skin is disposed over the lattice structure and connected to the lattice structure. The synthetic skin has a thickness, connects to the lattice network of rigid material of the lattice structure 500, and is configured to anthropometrically imitate (at least in part) the epidermal/skin layer of a human being, for example, the human subject of the 3D scanning described above.

Figure 8A:
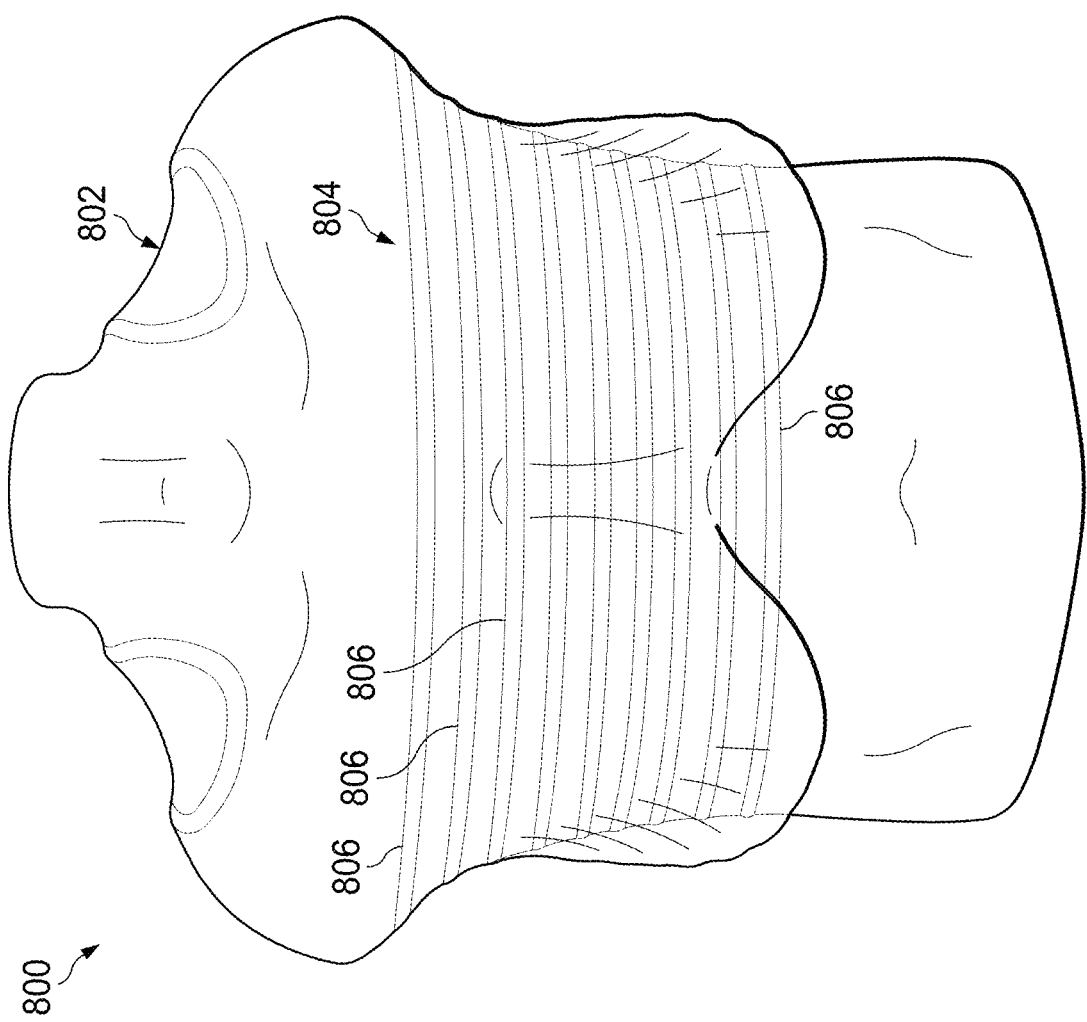
FIG. 8a is a partial front view of an example mannequin torso that includes a synthetic skin disposed over a support structure.
Figure 8C:
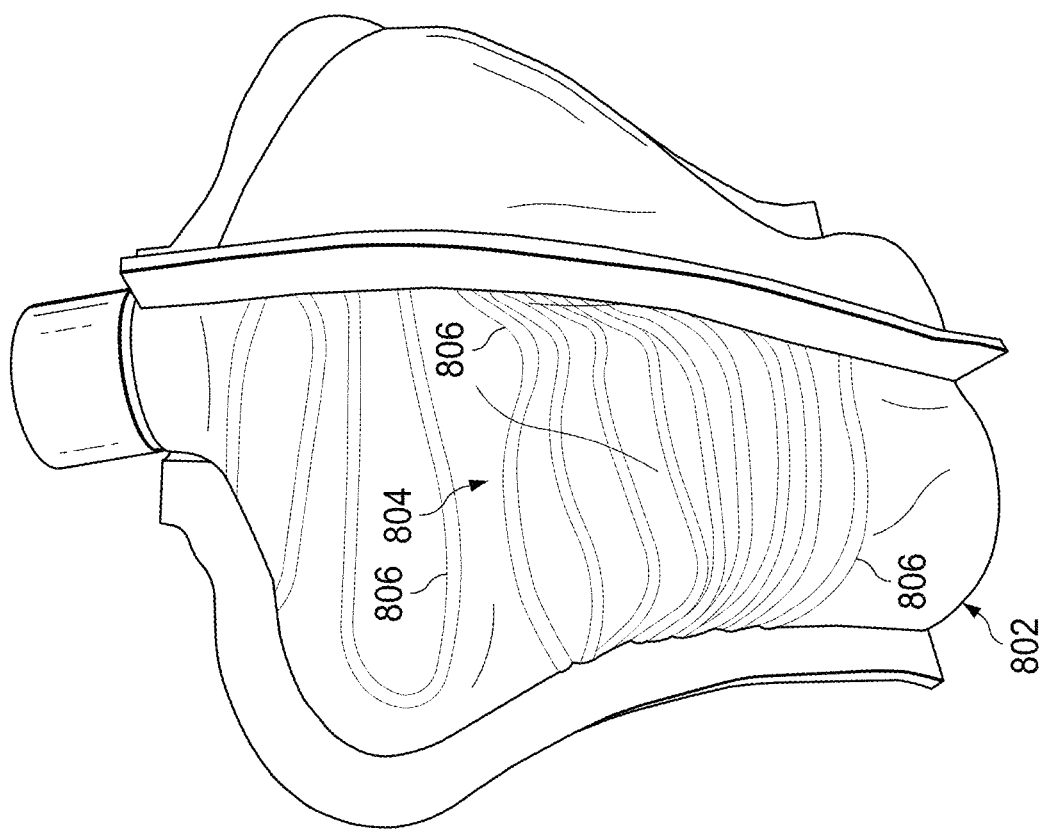
FIGS. 8b and 8c are a front perspective view and a rear perspective view of the mannequin torso of FIG. 8a partially within an outer mold or casing.
Figure 8B:
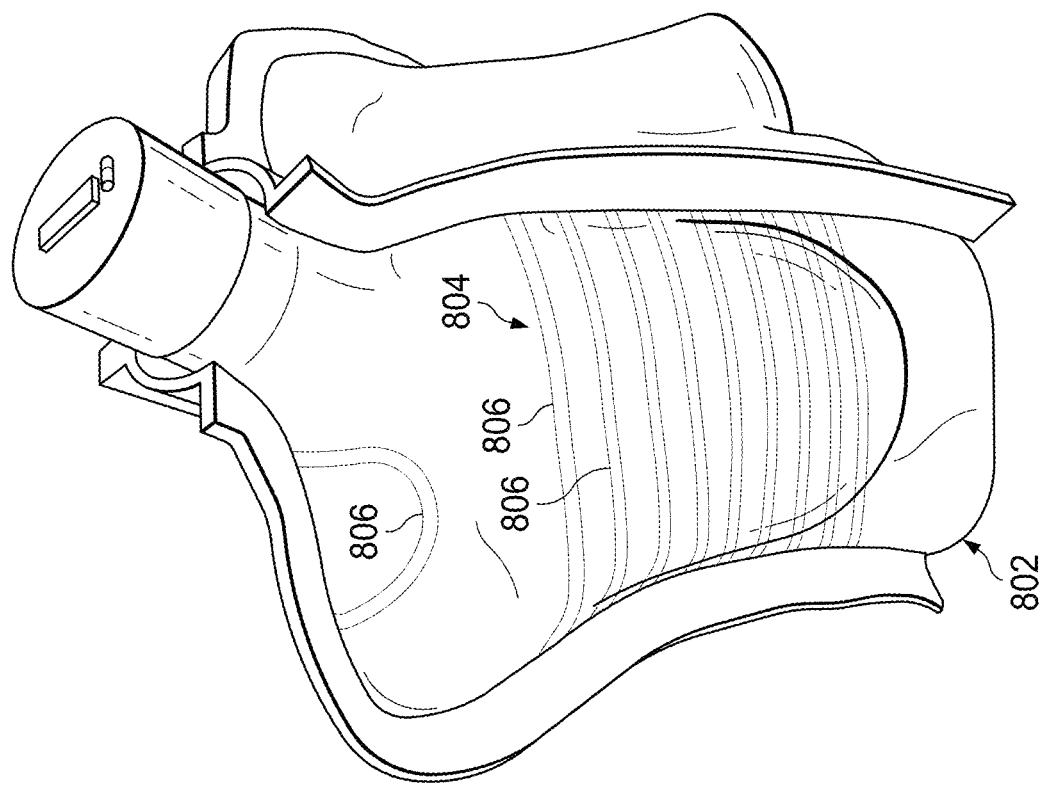

The materials that make up the synthetic skin can vary. Some instances of the synthetic skin can include silicone, gelatin (e.g., ballistic gel or non-ballistic gel), a combination of these, or other materials that anthropometrically imitate the epidermal layers of a human being. In some examples, the synthetic skin includes silicone to imitate human skin. In other examples, the synthetic skin includes ballistic gelatin to imitate human skin. The particular composition and materials of the synthetic skin can vary, though the compositions that most reflect human skin include either silicone or gel. In other implementations, a synthetic skin or covering take a variety of forms and include a variety of different materials to imitate skin of a subject. FIG. 8a is a partial front view of an example mannequin torso 800 that includes a synthetic skin 802 disposed over a support structure (e.g., support structure 500). The example mannequin torso 800 also includes a pattern of pressure sensors 804 in the form of silicone tubing distributed between the synthetic skin 802 and the support structure (e.g., embedded in the synthetic skin 802), and is described in more detail below. FIGS. 8b and 8c are a front perspective view and a rear perspective view of the mannequin torso 800 partially within an outer mold or casing, and includes sensors 806 including a pattern of silicone tubing 806, as described in more detail below.

In some examples, the makeup of the torso skin is approximately 00-10 durometer using Ecoflex silicone at a ratio between 1:1 and 1.4:1 with a current chosen ratio of 1.2:1 parts A:B of ecoflex silicone. The skin thickness is molded onto the lattice using 3D SLS printed nylon molds, first for the torso then the breast tissue which may consist of a skin thickness of silicone 00-10 on the inner surface of the breast mold followed by attachment of this skin to the torso and backfilling the breast tissue volume with silicone gel. Currently we are using Quantum Silicone 317 and/or 324 gel on penetration durometer scale (approximately 8-15 cm). Alternatively, the breast tissue may consist of solid silicone or higher durometer scale silicone gel encased in a greater than or equal to 1 mm thickness skin (currently 1.5 mm but may be increased for durability).

In certain implementations, the makeup of the torso synthetic skin includes ballistic gel. The ballistic gel can include the same or similar durometer characteristics, durometer ranges, and/or thickness as the example silicone materials, and the same or similar molding process as the example silicone materials, described earlier and also described later. For example, the ballistic gel that makes up the synthetic skin can have a durometer range of 00-10, and the ballistic gel that makes up the body of the breasts can include a durometer range of 00-05. In some implementations, ballistic gel and medical gel have a longer lifecycle (e.g., about 3 years) compared to silicone (e.g., about 6 months), and dry ballistic gel does not dehydrate. Example gelatins include 10% Ballistic Gelatin by Clear Ballistics, medical gel by Humimic Medical™, or other gelatins.

Figure 9B:
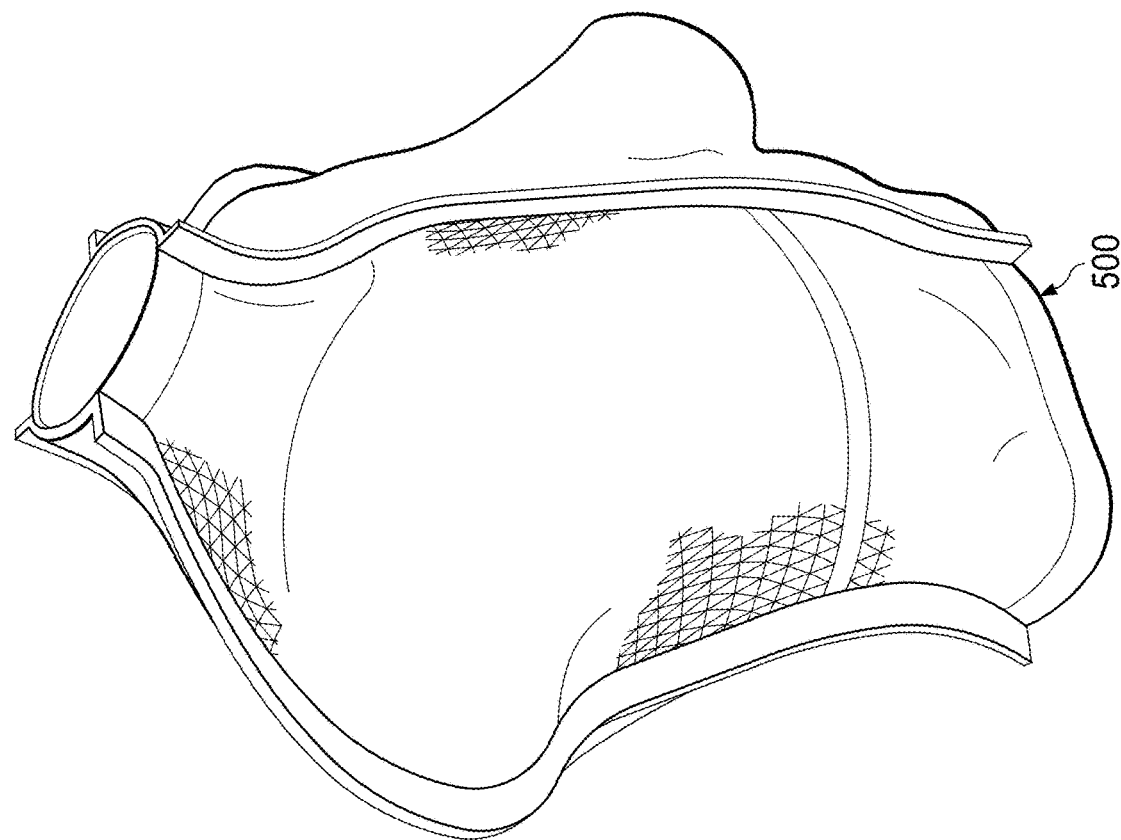
FIGS. 9a and 9b are perspective side views of an example lattice structure partially encased in a first outer mold without breasts (FIG. 9a) and partially encased in a second outer mold with breasts (FIG. 9b).
Figure 9A:
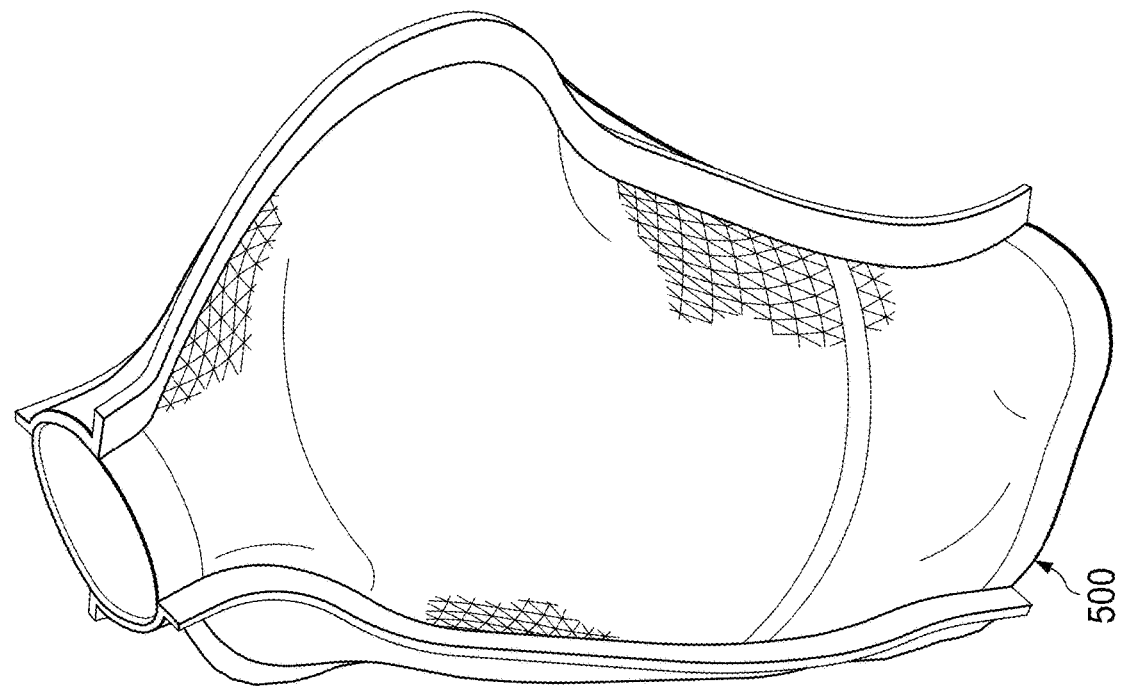

In some implementations, the synthetic skin 802 is disposed over the lattice support structure 500 by molding the synthetic skin 802 to the lattice support structure 500 using outer molds (e.g., mold 402a and/or mold 402b). FIGS. 9A and 9B are perspective side views of the example lattice structure 500 partially encased in a first outer mold without breasts (FIG. 9a) and partially encased in a second outer mold with breasts (FIG. 9b). The first outer mold and second outer mold can be based on molds 402a and 402b, and can be separated into multiple parts for ease of molding the synthetic skin 802. The offset between the lattice support structure 500 and the respective first and second outer molds of FIGS. 9a and 9b represent the space occupied by the synthetic skin 802 as the synthetic skin 802 is molded to the lattice support structure 500. The holes in the lattice support structure 500 can be sealed and made fluid-tight before placement into the respective molds to (substantially or entirely) prevent seeping of the silicone of the synthetic skin 802 through the mesh spacing of the lattice network of rigid material. The mesh sizing can take into account attachments, weight, and ease of sealing to provide optimal benefits of the lattice structure when used in this context.

As described earlier, the composition of the synthetic skin 802 can vary. FIG. 10 provides front and side views of and a table of example silicone formulations for the synthetic skin 802: example formulation 1, example formulation 2, example formulation 3, and example formulation 4. The synthetic skin 802 is generally formed from a silicone composition and molded using, for example, the mold 402a with breasts, or partially with the mold 402b without breasts and partially with the mold 402a with breasts. However, the synthetic skin 802 can be formed from a medical gelatin or ballistic gelatin, as described earlier. In some examples, the synthetic skin 802 can be formed in two parts: a skin portion without breast tissue, and separately molded breast tissue that connects (integrally or separately) to the skin portion without breast tissue. The synthetic skin portion without the breast tissue can be formed from a first composition (e.g., silicone composition such as 00-10 durometer Ecoflex™ silicone, medical gel with a 00-10 durometer, or ballistic gel with a 00-10 durometer) and the breast tissue can be formed from a second silicone composition (e.g., 00-10 durometer Ecoflex™ silicone, Qgel 317, medical gel, ballistic gel, or a combination of these, such as a solid silicone pouch surrounding a silicone gel material).

As mentioned earlier, the thickness of the synthetic skin 802 can vary. In the example formulations of FIG. 10, three layers of the silicone formulations can provide a thickness similar to the 6 mm available skin thickness described with respect to FIGS. 5b-6c. For the synthetic skin formulations (excluding the breast tissue), the four example formulations each include three layers of 00-10 durometer Ecoflex™ silicone at a ratio A:B equal to 1:1 of the silicone, though this ratio can vary lower or higher up to or exceeding 1.4:1 (e.g., an example ratio that approximates human skin is a ratio of 1.4:1 Ecoflex™ 00-10 silicone). The synthetic breast tissue can be integrally formed with the synthetic skin of the torso (e.g., when formed at the same A:B ratio as the skin) or formed separately from and attached to the synthetic skin of the torso (e.g., when formed at a different ratio than the skin). The four formulations for the breast tissue vary from a 1:1 ratio of Qgel 317 to a 1.2:1 ratio of Qgel 317. In some examples, the breast tissue has a ratio A:B of 1:1 to 1.05:1 of Qgel 317.

Figure 11:
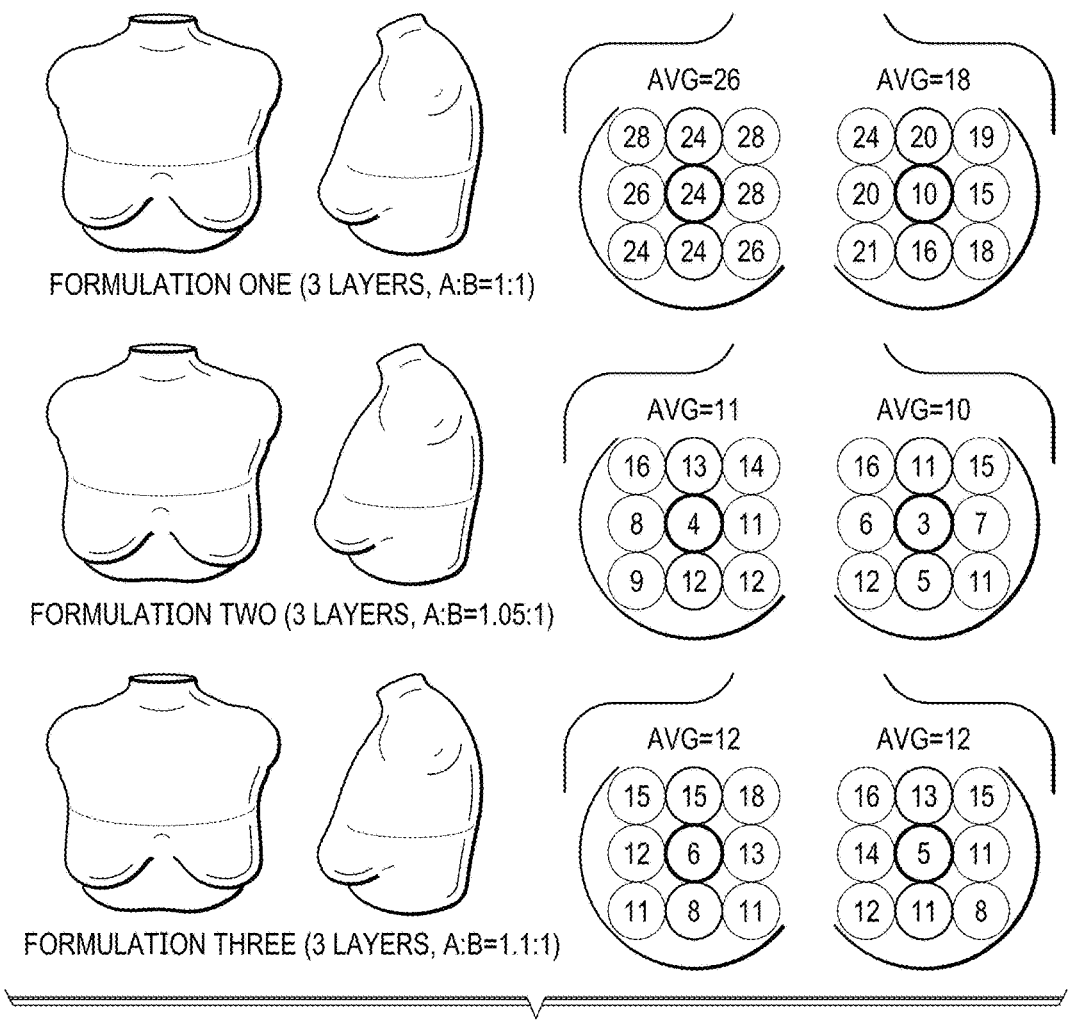
FIG. 11 includes partial schematic views of example durometer measurements of example formulations 1, 2, and 3 of FIG. 10.

Once the synthetic skin 802 is created (e.g., at the example formulations of FIG. 10), the synthetic skin 802 can be tested with a durometer against durometer measurements on a corresponding human subject to see which formulations are most accurate to the corresponding human subject. FIG. 11 shows example durometer measurements of example formulations 1, 2, and 3, and the formulation can be chosen at least partially based on its consistency in density measurements, using the durometer, as compared to the human subject. The durometer can be an FO-type durometer (e.g., GS-744G) with an indentor applied with a known force and produces a measured displacement that corresponds to the durometer reading. A lower durometer reading corresponds to a lower firmness of the material (e.g., a softer material). In some implementations, the durometer scale provides anthropometrics for breast tissue firmness without the need for elastography approaches, for example, either through mechanical imaging, ultrasound-based, or other, modalities. Initial measurements of breast firmness by a durometer of a human subject and of the synthetic skin and breast tissue can be compared for accuracy, and the synthetic skin composition (and synthetic breast composition) can be determined based on its consistency with the human subject, specifically, the consistency of the durometer readings of the synthetic skin, as compared to durometer readings of a corresponding human subject.

In some implementations, a prosthetic torso assembly (like the example mannequin torso 800) includes a support structure (e.g., example support structure 500) at least partially in a shape of a human torso, where the support structure is formed by a lattice network of rigid material, such as nylon, polyamide, or other rigid material. The prosthetic torso assembly also includes a synthetic skin (e.g., example synthetic skin 802) disposed over the support structure and connected to the support structure, the synthetic skin having a thickness, comprising silicone or gelatin (e.g., ballistic gel), and configured to anthropometrically imitate a human torso.

The prosthetic torso assembly can further include synthetic breasts (e.g., synthetic breast tissue) connected to the synthetic skin, where the synthetic breasts include silicone or gelatin (e.g., ballistic gel) and are configured to anthropometrically imitate female human breasts. The synthetic breasts can be formed integrally with the synthetic skin, or coupled to the synthetic skin. The coupling can be aided with adhesive or other coupling techniques, though in some instances the silicone of the synthetic skin and the silicone of the synthetic breasts inherently adhere to each other to a degree sufficient to couple the synthetic breasts to the synthetic skin, likewise with ballistic gelatin. The synthetic breasts can include a consistent solid composition or silicone or gelatin throughout the synthetic breasts, or the synthetic breasts can include a silicone or gelatin skin layer surrounding a volume of silicone gel or ballistic gel.

The skin of the synthetic breasts can include a thickness of greater than or equal to one millimeter, and the thickness of the synthetic skin can be between 5 mm and 7 mm (e.g., about 6 mm). The synthetic skin can be molded to the support structure. The support structure can be a hollow lattice structure defining a torso chamber within the hollow lattice structure. The torso chamber can house pressure sensors, one or more controllers and processors, a support base plate, a combination of these components, or other components of the prosthetic torso assembly. The prosthetic torso assembly can further include a support base that can selectively attach to the support structure. For example, the support structure can selectively mount to the support base. The support base can be coupled to an actuator assembly, where the actuator assembly is configured to move the support base and the support structure to mimic human movement.

The prosthetic torso assembly can further include a network of silicone tubing (e.g., example silicone tubing 806) between the support structure and the synthetic skin, and the network of silicone tubing can provide force or pressure sensing in the synthetic skin, for example, when coupled to pressure sensors (e.g., pressure sensors 804). The network of silicone tubing can be at least partially embedded in the synthetic skin and adjacent the support structure.

In certain implementations, a prosthetic female torso assembly includes a support structure at least partially in a shape of a human torso, the support structure formed by a lattice network of rigid material, a synthetic skin disposed over the support structure and connected to the support structure, the synthetic skin formed at least partially from silicone and configured to imitate a human torso, and synthetic breasts connected to the synthetic skin, where the synthetic breasts are formed at least partially from silicone or ballistic gel and are configured to imitate female breasts.

In some examples, the synthetic skin can made at least partially from a first composition comprising a 00-10 durometer Ecoflex™ silicone or 00-10 durometer ballistic gel. In some examples, the synthetic skin includes three layers of the first composition. The synthetic breasts can be made at least partially from a second composition comprising Qgel 317 silicone or a ballistic gel. In some examples, the synthetic breasts is made from a pliable silicone layer surrounding a volume of silicone gel, and the synthetic breasts are formed integrally with the synthetic skin or otherwise coupled to the synthetic skin.

Figure 12:
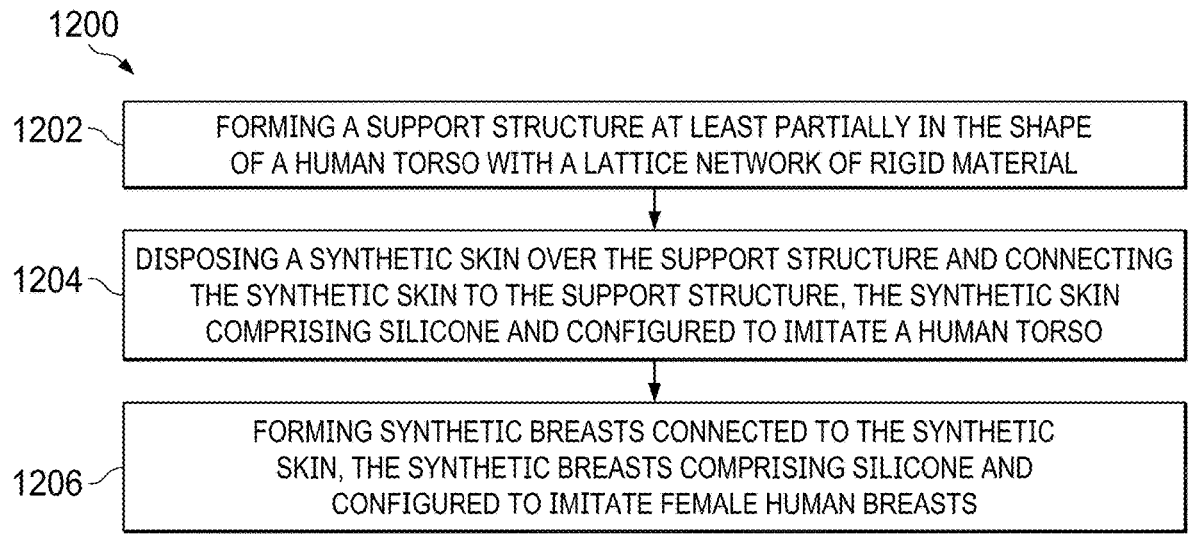
FIG. 12 is a flowchart of an example method for forming a prosthetic torso assembly.
Figure 13B:
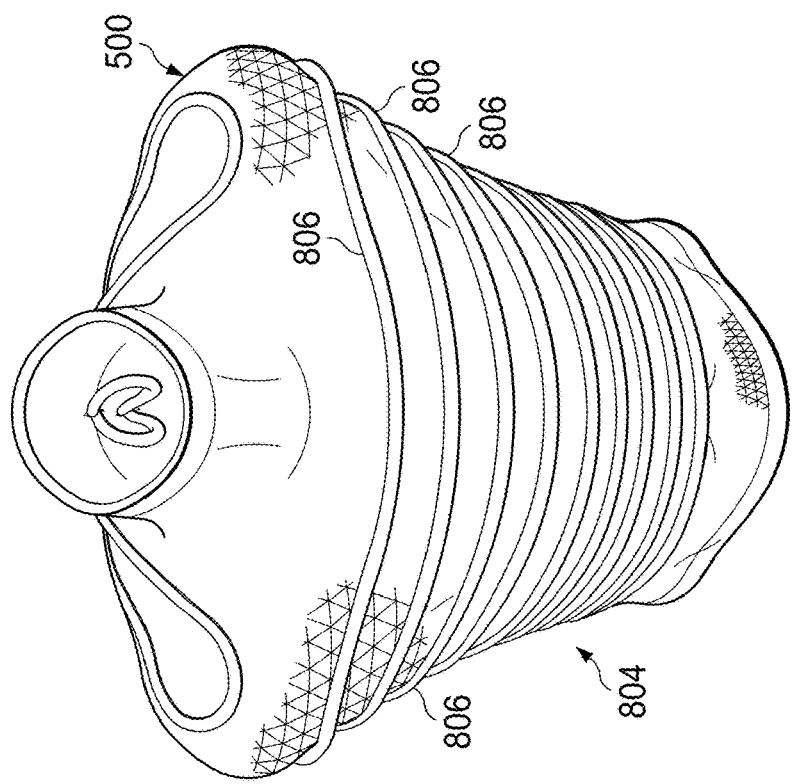
FIGS. 13a-13e are front, top perspective, rear, rear perspective, and close-up views, respectively, of an example support structure or core with a pattern of pressure sensors in the form of silicone tubing disposed over the outer surface of the example support structure.
Figure 13A:
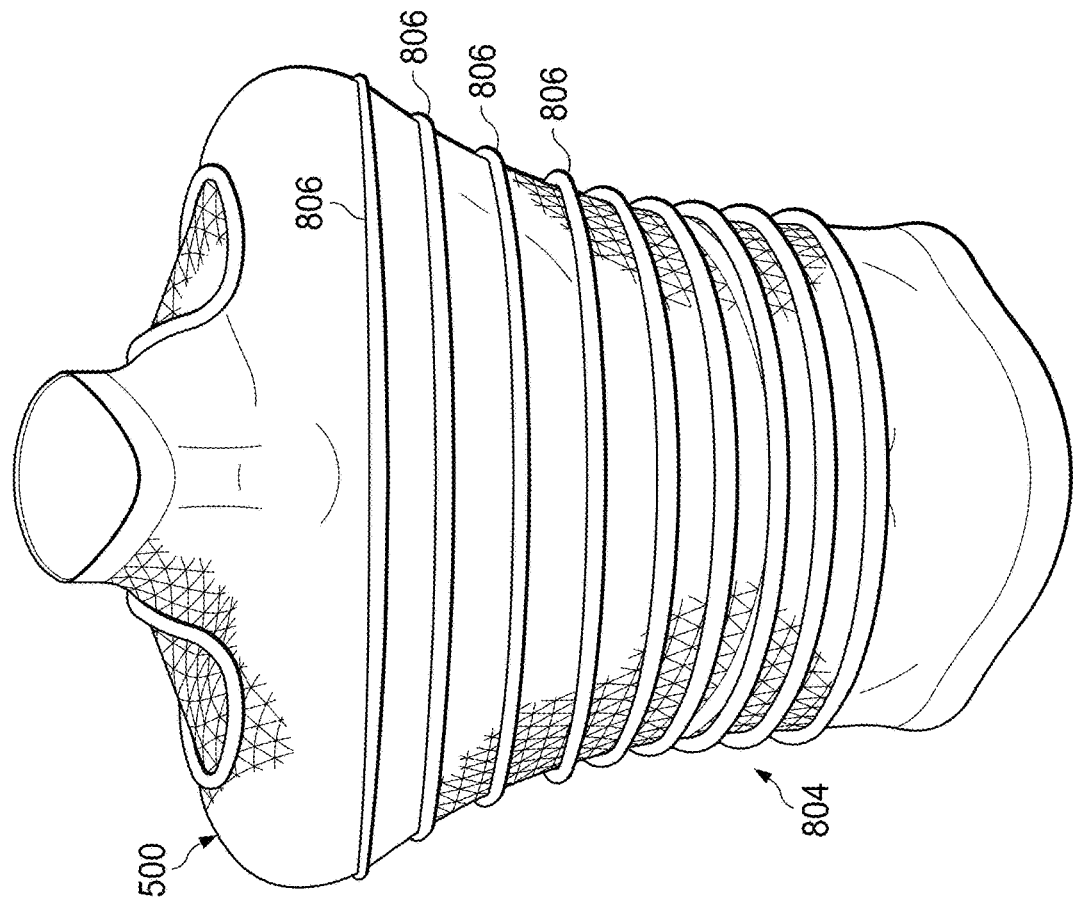
Figure 13D:
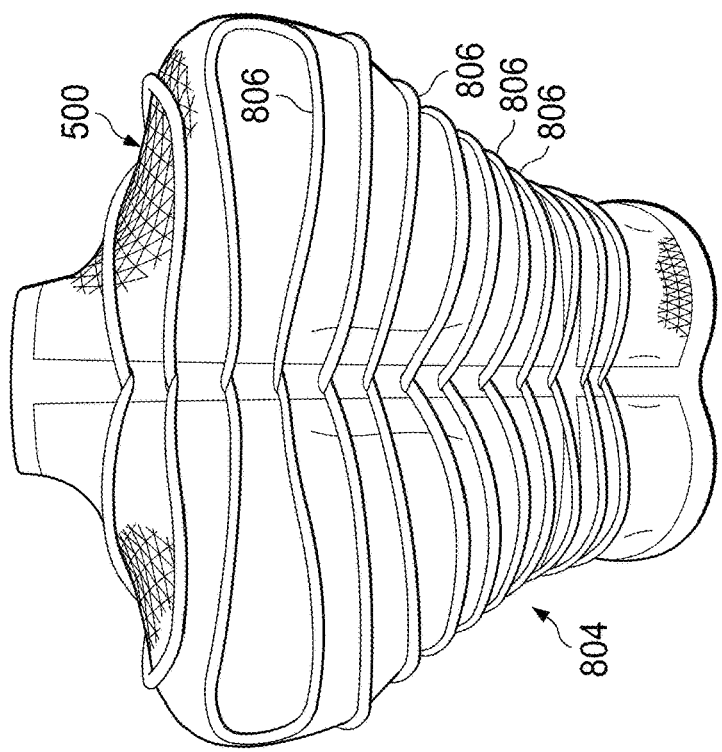
Figure 13C:
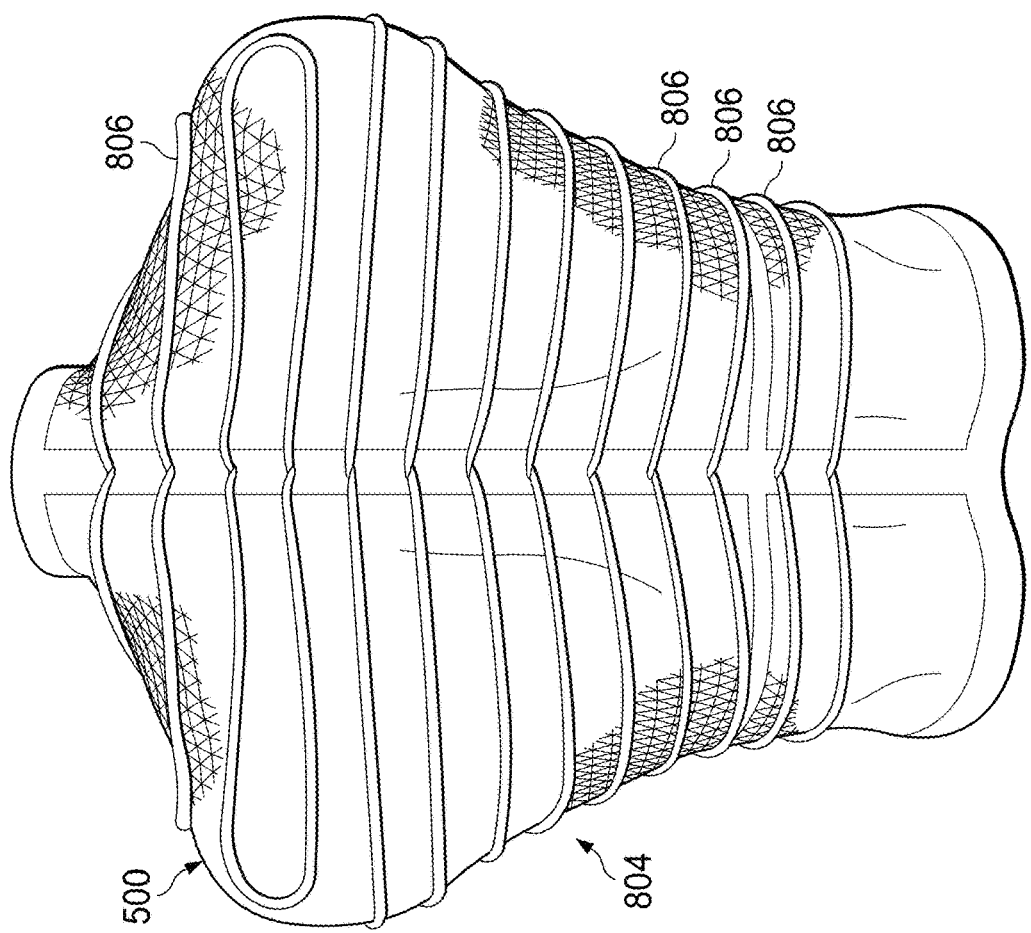
Figure 13E:
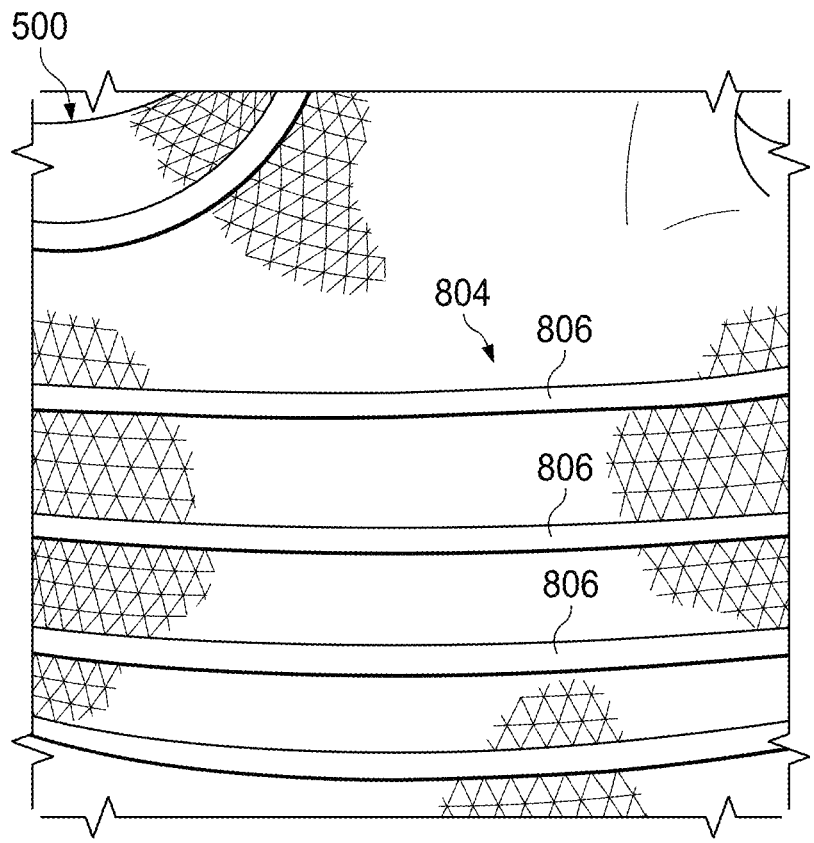

FIG. 12 is a flowchart of an example method 1200 for forming a prosthetic torso assembly, for example, the example mannequin torso 800 with the example lattice support structure 500 and example synthetic skin 802 of FIGS. 5*a*-11. At 1202, a support structure is formed at least partially in a shape of a human torso with a lattice network of rigid material. At 1204, a synthetic skin is disposed over the support structure and is connected to the lattice structure. The synthetic skin includes silicone or ballistic gelatin and imitates a human torso. Optionally, at 1206, synthetic breasts are formed and connected to the synthetic skin. The synthetic breasts include silicone or ballistic gel, and imitate female human breasts.

Forming the lattice structure can include printing, with a 3D printer, the lattice structure. Disposing the synthetic skin over the lattice structure and connecting the synthetic skin to the lattice structure can include molding the synthetic skin over the lattice structure. Forming a lattice structure can include arranging the lattice network of rigid material in a direct mesh pattern to form the lattice structure. The synthetic breasts can be formed integrally with the synthetic skin, or attached separately to the synthetic skin. The method can include positioning a network of silicone tubing between the lattice structure and the synthetic skin, where the network of silicone tubing provides force and/or pressure sensing in the synthetic skin.

Skin Pressure Sensing

The example prosthetic mannequin torso 800 can be formed with pressure sensors disposed adjacent to, on, or within the synthetic skin 802, for example, to provide garment fit feedback (e.g., size, compression, and/or other force/pressure related features). The pressure sensors can take a variety of different forms and include structures that allow the pressure sensors to integrate with the synthetic skin 802 of the mannequin torso 800. For example, the pressure sensors can include (or attach to) flexible silicone tubing or other flexible lumen, sensor pads, diaphragms, a combination of these, or another pressure sensor type, to sense pressure and/or force feedback. In the example prosthetic mannequin torso 800 of FIGS. 8*a*-8*c*, and in some implementations, the mannequin torso 800 includes pressure sensors 804 including silicone tubing 806 incorporated into the synthetic skin (e.g., synthetic skin 802). The pressure sensors 804 provide force feedback, pressure feedback, or both force and pressure feedback for forces and/or pressures experienced by the synthetic skin 802. Sensor controllers (e.g., MPXV7002 or similar, or other controller(s)) attached to the silicone tubing 806 or other flexible lumen receives and provides feedback on the forces/pressures experienced by the silicone tubing 806. The silicone tubing 806 is filled with a fluid, and imparts a hydraulic force on a fluid pressure sensor component of the pressure sensor 804 in response to and representative of the forces/pressures experienced by the silicone tubing 806.

FIGS. 13a to 13e show front, top perspective, rear, rear perspective, and close-up views of the example support structure 500 (or core) with a pattern of the pressure sensors 804 in the form of silicone tubing 806 disposed over the outer surface of the example support structure 500. The silicone tubing 806 is arranged over the support structure 500 in a desired pattern. For example, a majority of the silicone tubing 806 (or other flexible lumen) is arranged horizontally relative to an upright posture of the mannequin, in a position that is emulative of one of spinal nerves C8-T12. This horizontal arrangement can include tubing that extends horizontally around the support structure 500 starting from and ending at a spinal cord area. The fluid pressure sensor component of the pressure sensors 804 can be located away from the synthetic skin 802, such as within the hollow chamber area defined by the inside of the lattice network of rigid material of the support structure 500, and the flexible lumen can extend from the fluid pressure sensor to the synthetic skin 802 through holes defined along a spinal region of the support structure 500. The mannequin torso 800 can be donned with a garment, such as a bra or other upper torso garment, and the pressure sensors 804 can sense pressure and/or force applied to the mannequin torso 800 by the garment. The mannequin torso 800 can be kept static to measure the magnitude and location of static forces and pressures against the synthetic skin 802. The mannequin torso 800 can instead, or also, be actuated to move, for example, in a walking motion, running motion, jumping motion, or other human-like motion, and the pressure sensors 804 can measure the dynamic forces and pressures applied to the synthetic skin 802 by the garment and/or other environmental factors (e.g., gravity acting on the synthetic skin 802 and breast tissue).

FIGS. 13a to 13e show the silicone tubing 806 arranged in a pattern of horizontal lines, and includes loop sections of the silicone tubing 806 at the shoulder blades and shoulders of the support structure 500. However, the pattern can be different. For example, some or all of the silicone tubing 806 can be arranged in smaller units, or sections of tubing, include coiling tubing areas, can form a grid or mass of tubing at select areas or all areas of the torso, a combination of these patterns, or other patterns. Combinations of patterns and/or alternative patterns can provide localized sensing, such as at target areas of known discomfort for a wearer of a garment. In some instances, the silicone tubing 806 can include coiled tubing or a mass of tubing at and/or within the breast tissue of the synthetic skin, for example, for localized sensing over and/or within the breast tissue. For example, the silicone tubing 806 can be arranged in spiral tubing sections, and can be positioned separately or in combination with straight lines or other shapes and patterns.

In some implementations, the silicone tubing 806 includes pressure release valves, for example, to allow for transportation and/or use of the mannequin torso in different pressure environments (e.g., on a plane, at varying elevations relative to sea level, or other pressure environment). The pressure release valves can be selectively released and plugged for recalibration and pressure equilibration of the pressure sensors 804 to provide consistent and accurate pressure/force measurements. The system can include one or more pressure release valves to control and/or equilibrate the pressure in the one or more pressure sensors (i.e., silicone tubing 806). In some examples, the pressure sensors are connected to one or more three-way valves. A three-way valve allows for equilibration of pressure for one or multiple pressure sensors at once.

The pressure sensors 804, specifically the silicone tubing 806, are disposed over the lattice support structure 500, and the silicone skin 802 can be molded to the support structure 500 with the silicone tubing 806 already in place (i.e., disposed in a predetermined pattern over the lattice support structure 500). In some instances, the silicone tubing 806 can position (e.g., center) the lattice support structure 500 within the outer mold (e.g., the outer molds of FIGS. 9a and 9b) before and during molding of the synthetic skin 802 over the lattice support structure 500. In some implementations, the lattice structure can be printed with channels, partial channels, notches, or other guiding paths for the silicone tubing 806, for example, to better position the silicone tubing 806 on the lattice support structure 500 and hold the silicone tubing 806 on the lattice support structure 500 during the molding process of the synthetic skin 802.

In the example mannequin torso 800, the silicone tubing 806 has an outer diameter of between 4 and 6 mm (e.g., 5 mm), and the synthetic skin has an average thickness of about 6 mm. As such, the silicone tubing 806 is used to help center the lattice support structure 500 within the outer mold(s) when molding the synthetic skin 802, since the silicone tubing 806 generally extends around an entirety of the support structure 500 and may contact or come in close contact with the outer molds themselves as the synthetic skin 802 is molded. This centering feature also promotes a consistent thickness of the synthetic skin 802 as it is molded, since the silicone tubing 806 promotes a consistent gap between the lattice support structure 500 and the outer mold(s) as the synthetic skin 802 is formed.

In some implementations, a sensor apparatus (such as the mannequin torso 800) includes a mannequin configured to emulate a human body part, the mannequin including a core (e.g., support structure 500 with lattice network of rigid material) configured to emulate flexibility of a substantially inflexible skeletal portion of the body part, and a pliant, or flexible, covering (e.g., synthetic skin 802) that has a pliant three-dimensional surface configured to emulate contours of an epidermis of the body part, and at least one pliant three-dimensional interior portion configured to emulate resiliency of a pliant portion of the body part. The sensor apparatus also includes at least one pressure sensor (e.g., pressure sensor 804) arranged between the three-dimensional surface and the core and configured to sense pressure applied against the pliant three-dimensional surface. The pressure sensor can include at least one flexible lumen (e.g., silicone tube 806) at least partly filled with a fluid, and a fluid pressure sensor (e.g., fluid pressure sensor component of pressure sensor 804) configured to provide a pressure signal that is representative of a fluid pressure of the fluid. A majority of the flexible lumen can be arranged horizontally relative to an upright posture of the mannequin, in a position that is emulative of one of spinal nerves C8-T12. However, the arrangement of the flexible lumen can vary, as described earlier with respect to pressure sensor(s) 804. The fluid pressure sensor can be located away from the pliant covering, and the lumen can extend from the fluid pressure sensor to the pliant covering through holes defined along a spinal region of the core. In other instances, the lumen extends from the fluid pressure sensor to the pliant covering through a bottom opening of the torso, through a neck opening of the torso, through other openings in the torso, a combination of these, or other locations of the torso. In some instances, the fluid pressure sensor can include a flex circuit that the pressure sensor tubing(s) connects. The flex circuit can be positioned within the torso structure, such as coupled to an interior surface of the torso (e.g., on an interior surface of the lattice structure), within a neck region of the torso, or elsewhere within the torso structure or near the torso structure. The flex circuit can take the form of a flat circuit that includes some degree of flexibility, for example, to be able to mirror the surface profile and curvature of an interior surface of the torso structure. The human body part can be a human torso, the pliant covering emulates the contours of a human torso, and the pliant three-dimensional interior portion is emulative of at least one subdermal torso tissue. The human body part can be a female human torso, the pliant three-dimensional interior portion is emulative of at least an interior portion of human female breast tissue, and the pliant covering emulates the contours of at least one human female breast. The pliant three-dimensional interior portion can be configured to emulate movement or recovery of the pliant portion when the body part is subjected to movement or acceleration. The mannequin can be configured to be donned with a garment, and the pressure sensor is configured to sense pressure applied to the mannequin by the garment.

In some implementations, an apparatus includes a mannequin configured to emulate the form of at least a portion of a human body, and at least one pressure sensor arranged within the mannequin. The pressure sensor is configured to provide sensor feedback quantifying force, pressure, or both force and pressure that the mannequin undergoes. In certain instances, a method includes sensing pressure applied to the surface of a mannequin, and providing a measurement based on the pressure.

Figure 14:
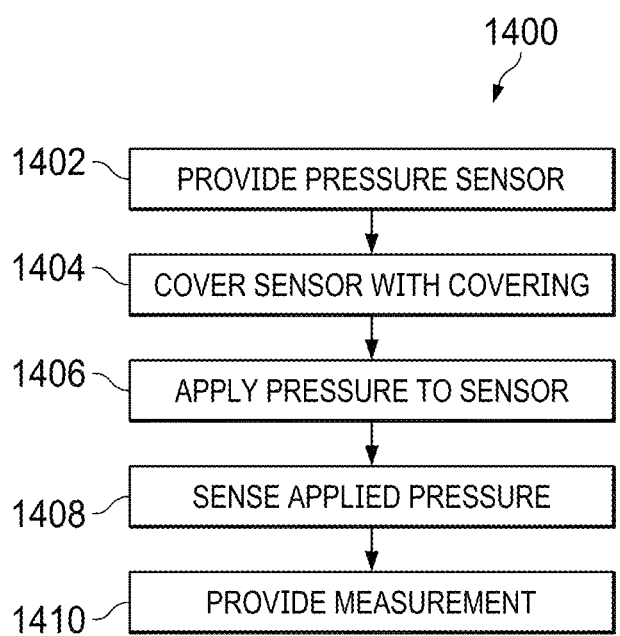
FIG. 14 is a flowchart of an example method for sensing pressure applied by a covering on a body part.
Figure 15A:
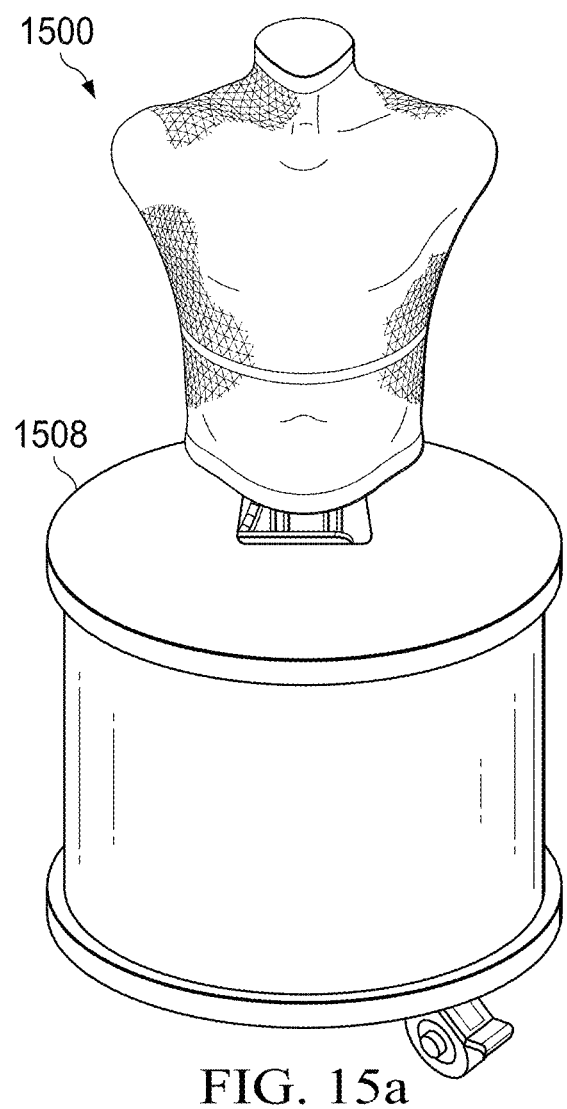
FIGS. 15a-21b are various views of an example actuator assembly and its components, with some views showing an example lattice support structure or an example mannequin torso mounted on the example actuator assembly.
Figure 15B:
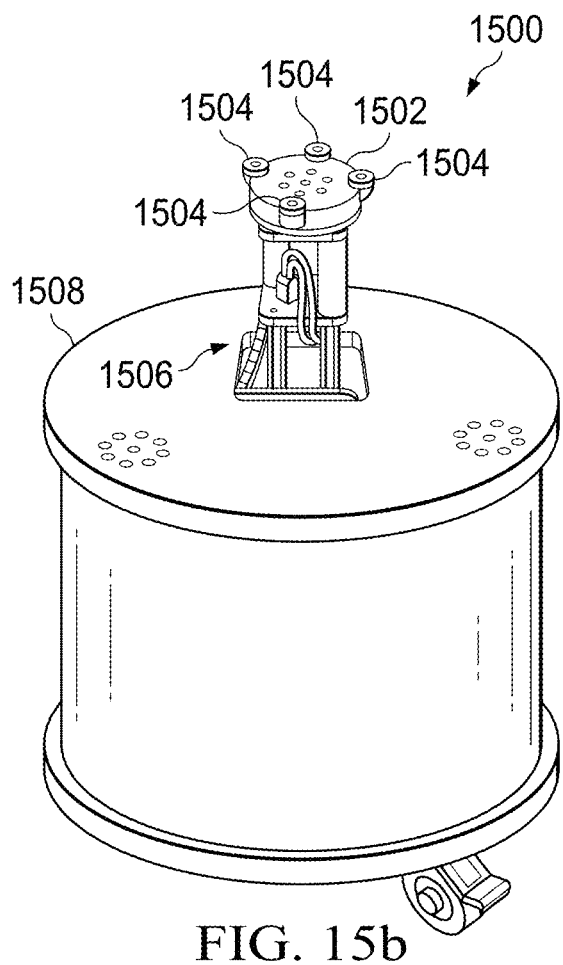

FIG. 14 is a flowchart of an example method 1400 for sensing pressure applied by a covering on a body part, for example, performed by the example mannequin torso 800 with the example lattice structure 500, example synthetic skin 802, and example pressure sensors 804 of FIGS. 5a-11 and 13a-13e. At 1402, a pressure sensor apparatus is provided. At 1404, the pressure sensor apparatus is at least partly covered with a covering (e.g., synthetic skin). At 1406, pressure is applied against the pressure sensor by the covering. At 1408, the pressure sensor apparatus senses the applied pressure. At 1410, at least one measurement value based on the sensed pressure is provided. The method 1400 may include moving or accelerating the pressure sensor apparatus and the covering, distorting, by the moving or accelerating, at least one pliant portion of the pressure sensor, applying, by the distorting, pressure of the pressure sensor apparatus applied against the covering, sensing the applied pressure, and providing a pressure measurement value of the sensed applied pressure. In some instances, the distorting can be for a single measurement or a time-varying distortion of the pliant portion, where the applied pressure is a time-varying applied pressure, the sensed pressure is a time-varying pressure, and the pressure measurement value is a time-varying pressure measurement value. The covering can further include a garment configured to be worn on the body part. Providing a pressure sensor apparatus can include receiving a three-dimensional model of a body part having a core portion model representative of a substantially inflexible skeletal portion of the body part, a surface model representative of three-dimensional contours of an epidermis of the body part, and at least one interior portion model representative of a flexible portion of the body part, and constructing a mannequin based on the three-dimensional model can include constructing a core, based on the core portion model, configured to emulate the substantially inflexible skeletal portion of the body part, constructing a flexible covering including a flexible three-dimensional surface, based on the surface model, configured to emulate contours of the epidermis of the body part, and at least one flexible three-dimensional interior portion, based on the interior portion model, configured to emulate a flexible portion of the body part, and arranging at least one pressure sensor between the three-dimensional surface and the core, configured to sense pressure applied against the flexible three-dimensional surface.

In some implementations, the method 1400 can be a computer-implemented method for sensing pressure applied by a covering on a body part, including sensing, by a pressure sensor apparatus, a pressure applied by a covering partly covering the sensor apparatus, and providing at least one measurement value based on the sensed pressure. The computer-implemented method can include any one or more steps described above with respect to the method.

FIGS. 15a-21b show various views of an example actuator assembly 1500 and its components. Some of the views of FIGS. 15a-21b show an example lattice support structure or an example mannequin torso mounted on the example actuator assembly 1500.

FIGS. 15b, 16a, and 17a-17b show the example actuator assembly 1500 as including a first example support base 1502, for example, for selectively attaching a mannequin torso (specifically, the support structure, such as example support structure 500) to the actuator assembly. The first support base 1502 is shown including an attachment structure in the form of magnets 1504 for selective attachment to the mannequin torso. However, the attachment structure can take other forms, such as fasteners or other selective attachment means. The actuator assembly 1500 is configured to move the mannequin torso to imitate human movement, such as walking, running, jumping movement, or other common movements of a human body. The actuator assembly 1500 can include an actuator system 1506 including actuators housed in a housing 1508, and the actuators connect to the support base 1502 to move the support base 1502 (and thereby, the mannequin torso when the mannequin torso is connected to the base 1502). The actuators can include a vertical actuator for vertical movement, a rotational actuator for rotational movement about a vertical axis, a combination of these, or other actuators. Example actuators include linear actuators (e.g., Lorentz force actuators), rotary vane actuators, rotary piston actuators, direct drive rotational motors, magnetic motors, servo motors, pneumatic actuators, or other actuators.

Figure 16A:
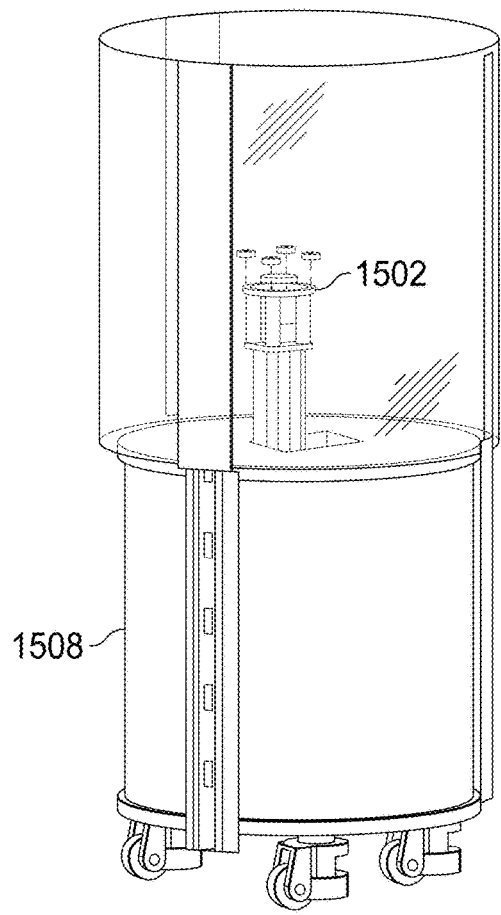
Figure 16B:
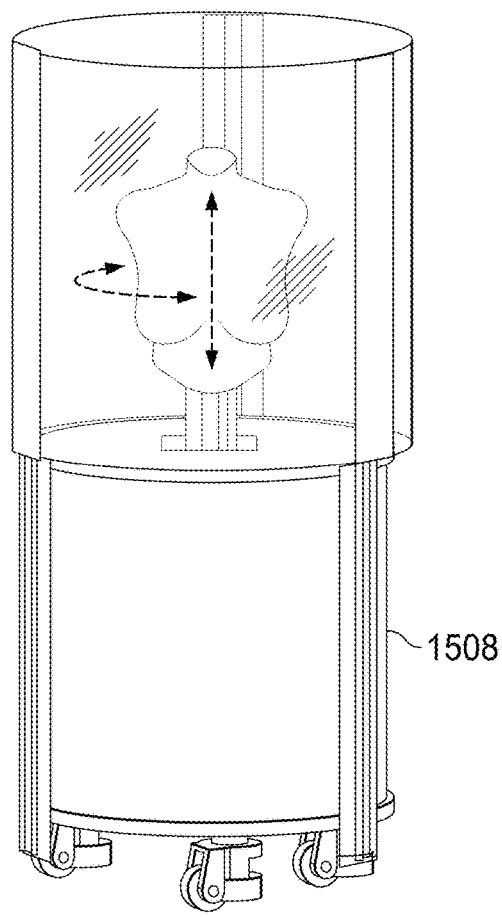
Figure 17A:
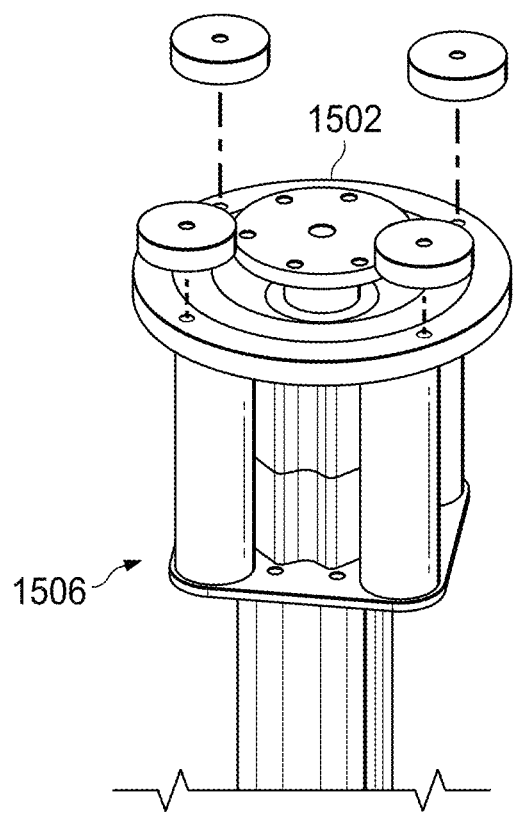
Figure 17B:
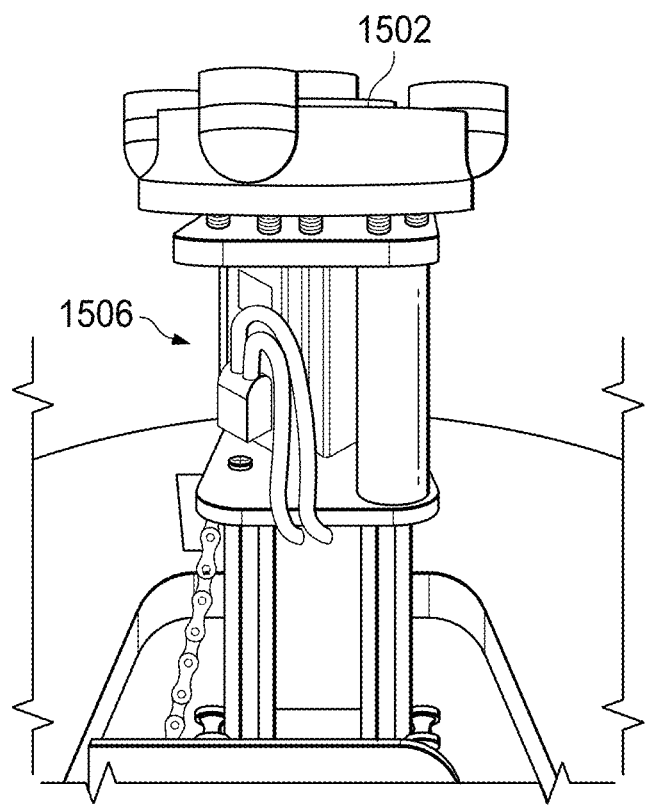
Figure 18A:
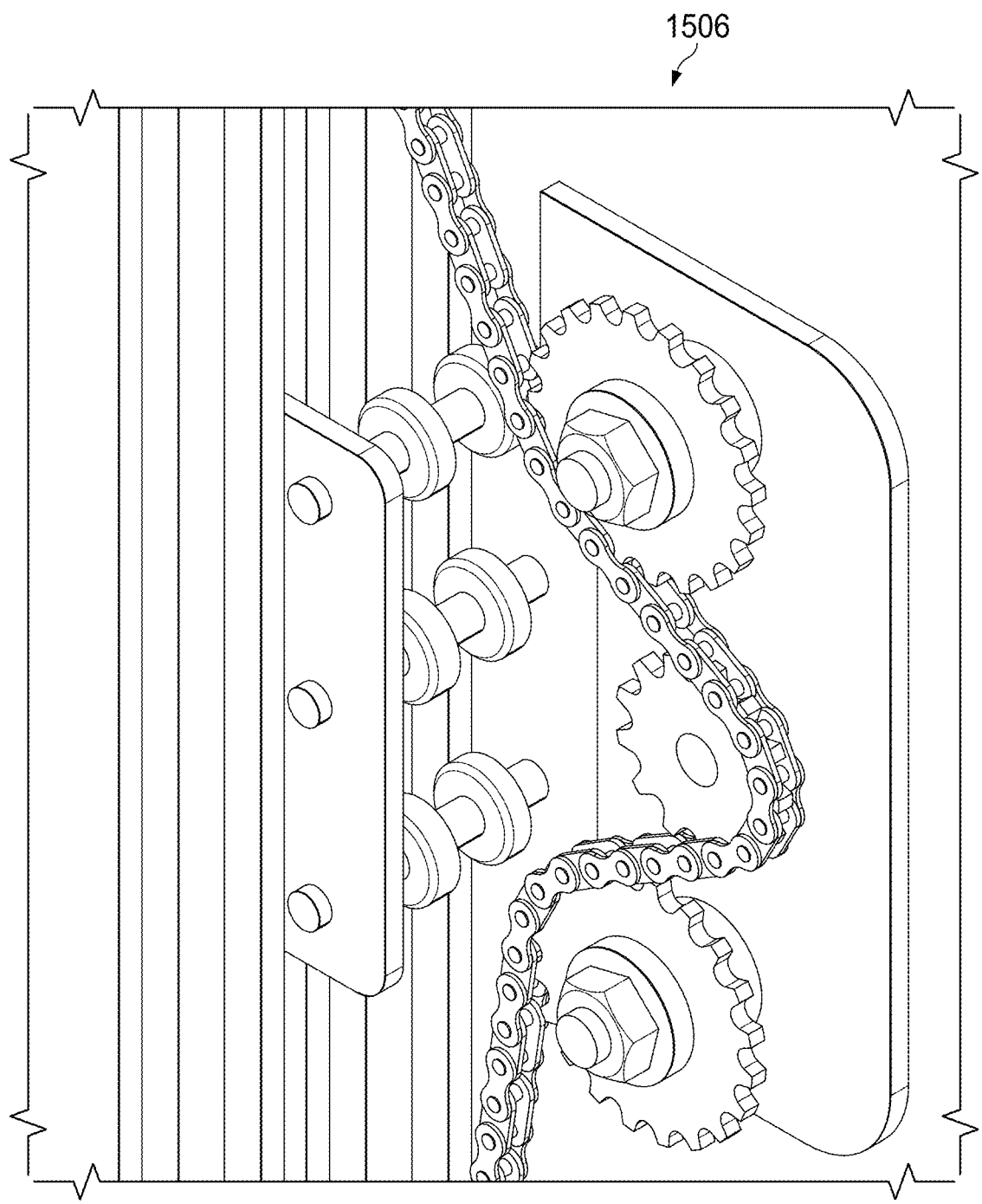
Figure 18C:
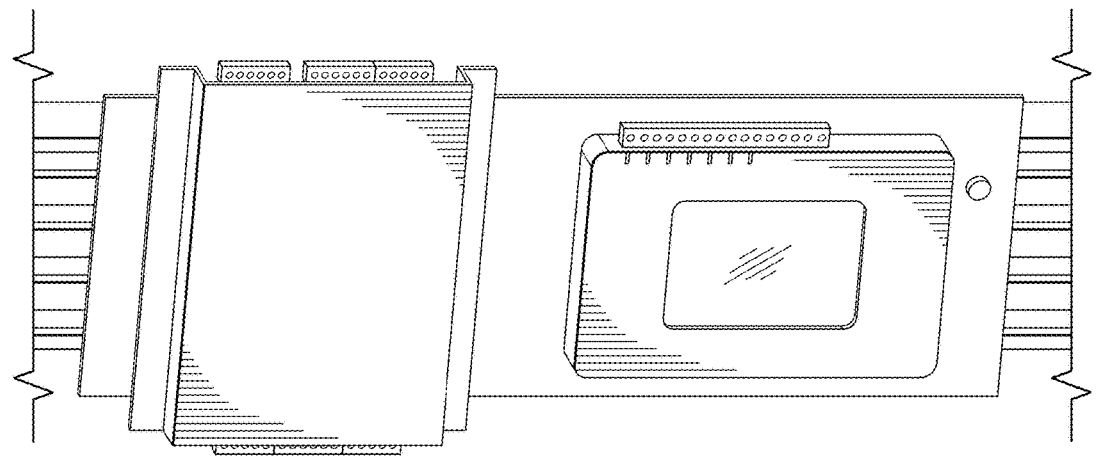
Figure 18B:
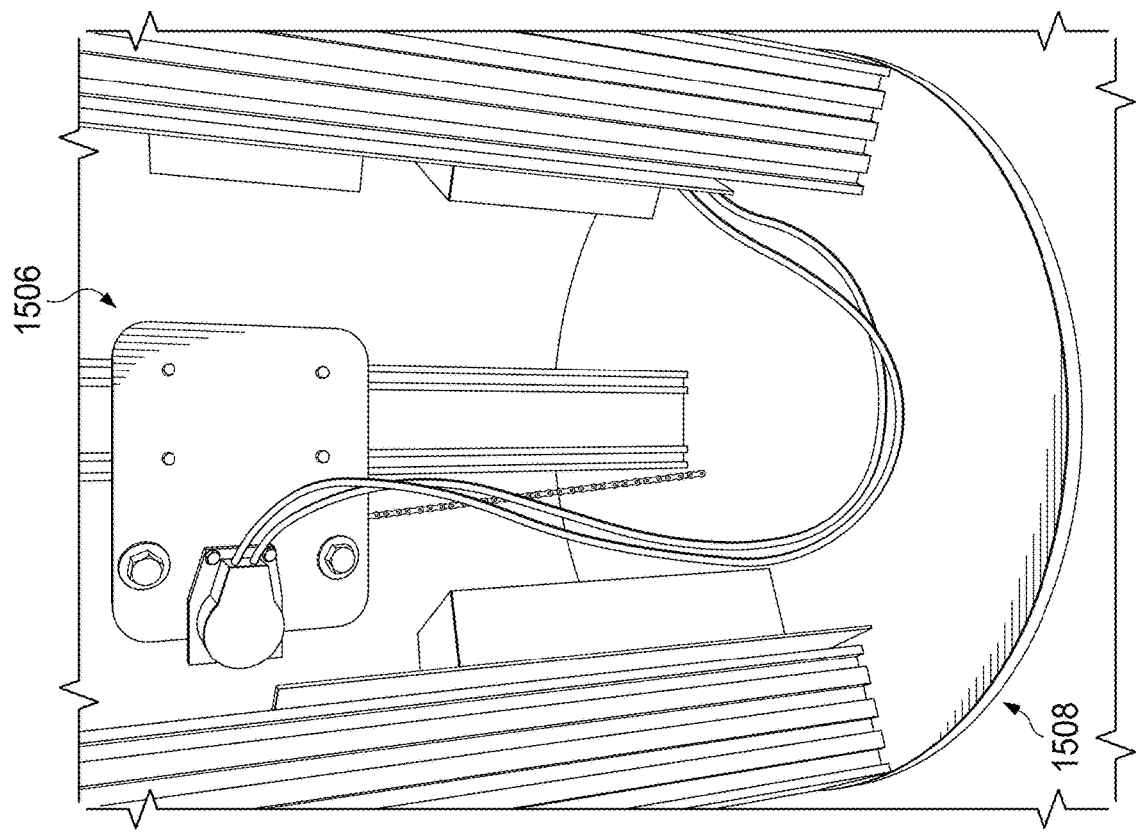
Figure 18D:
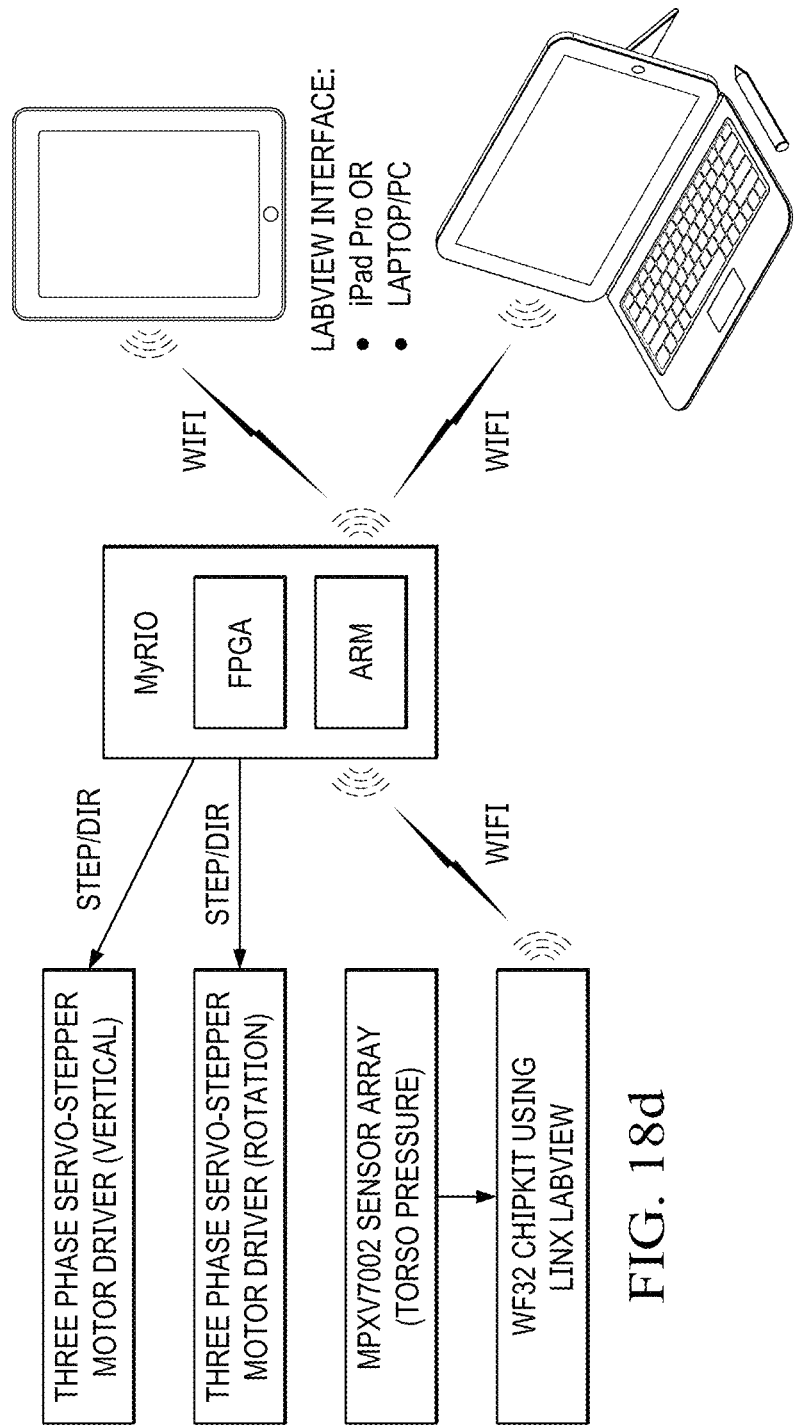
Figure 19A:
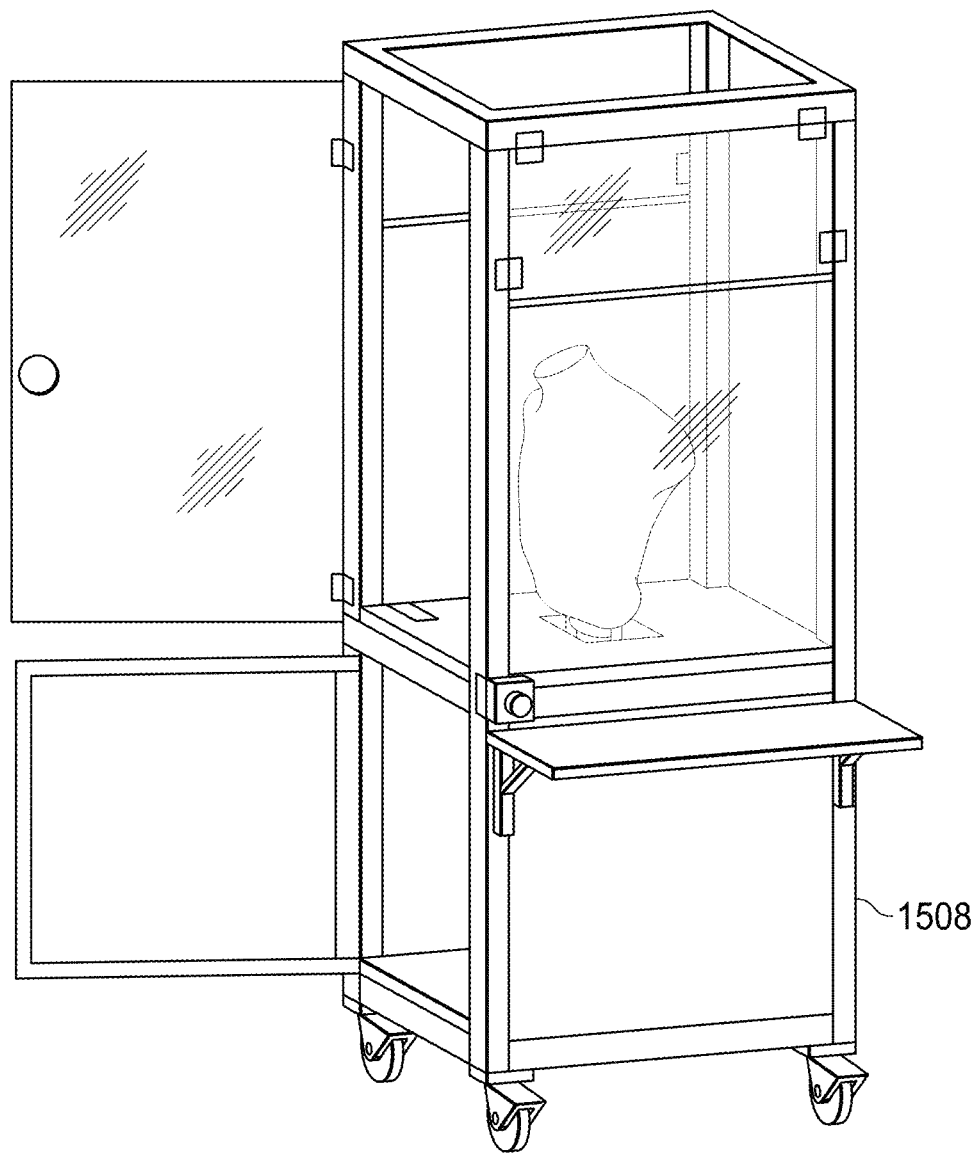
Figure 19B:
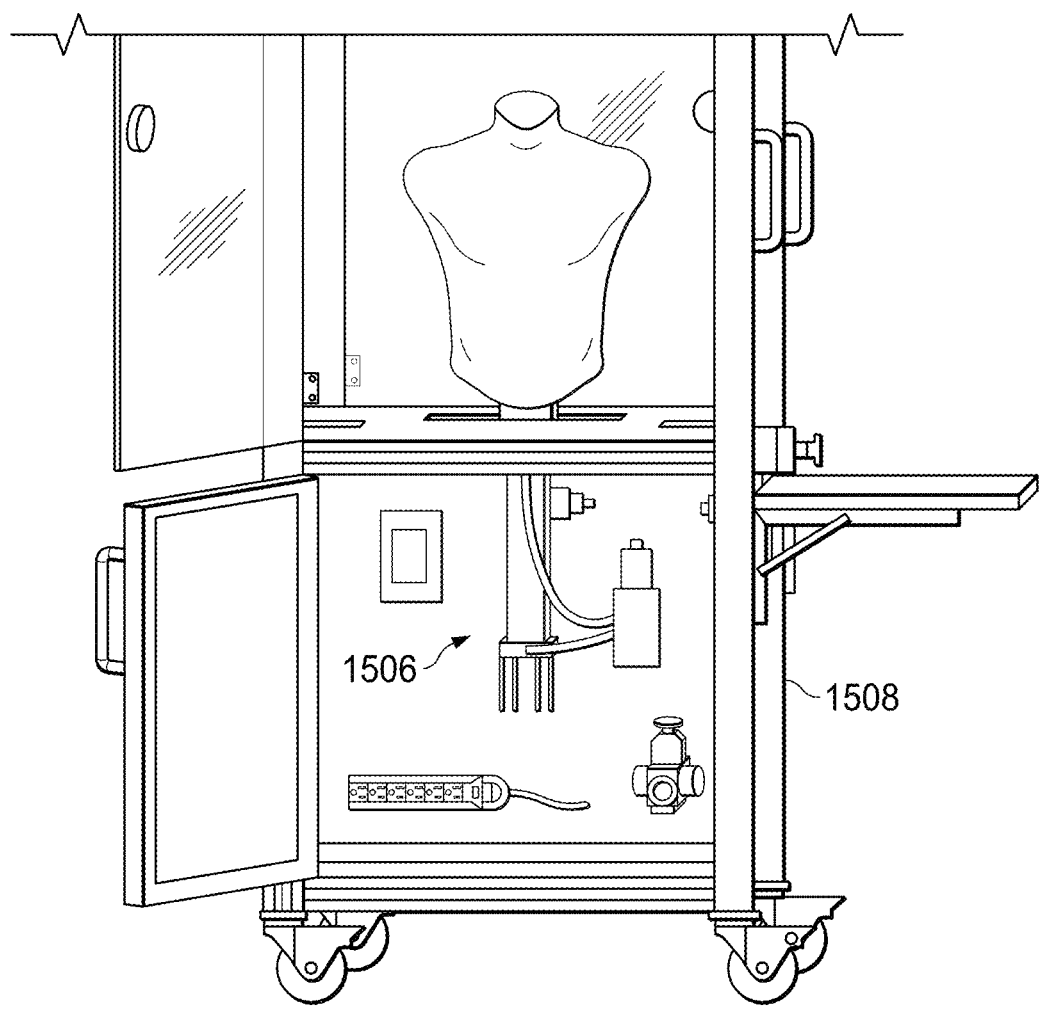
Figure 19C:
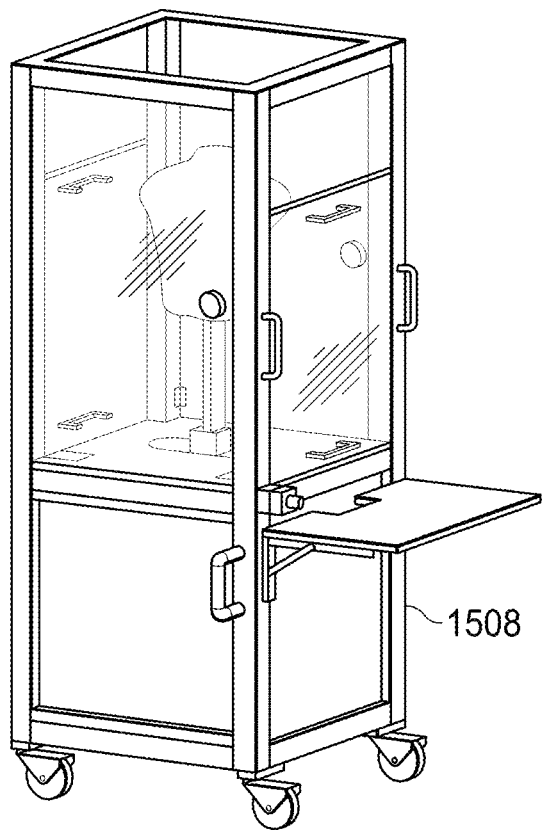
Figure 19D:
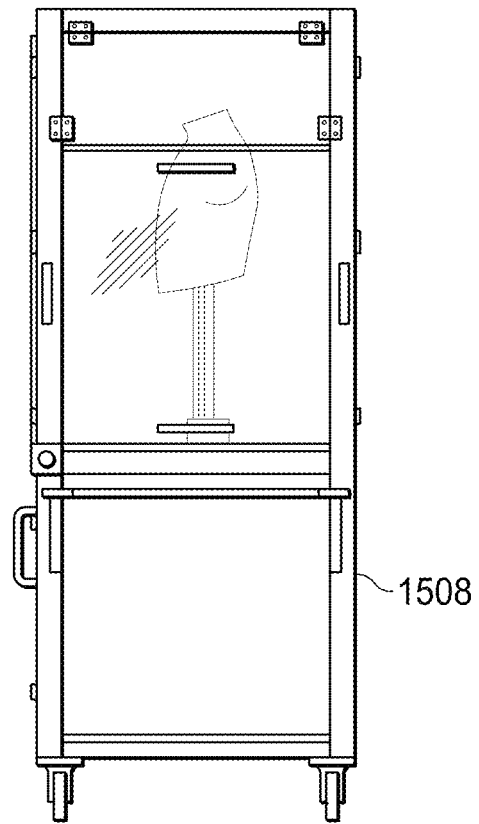
Figure 20A:
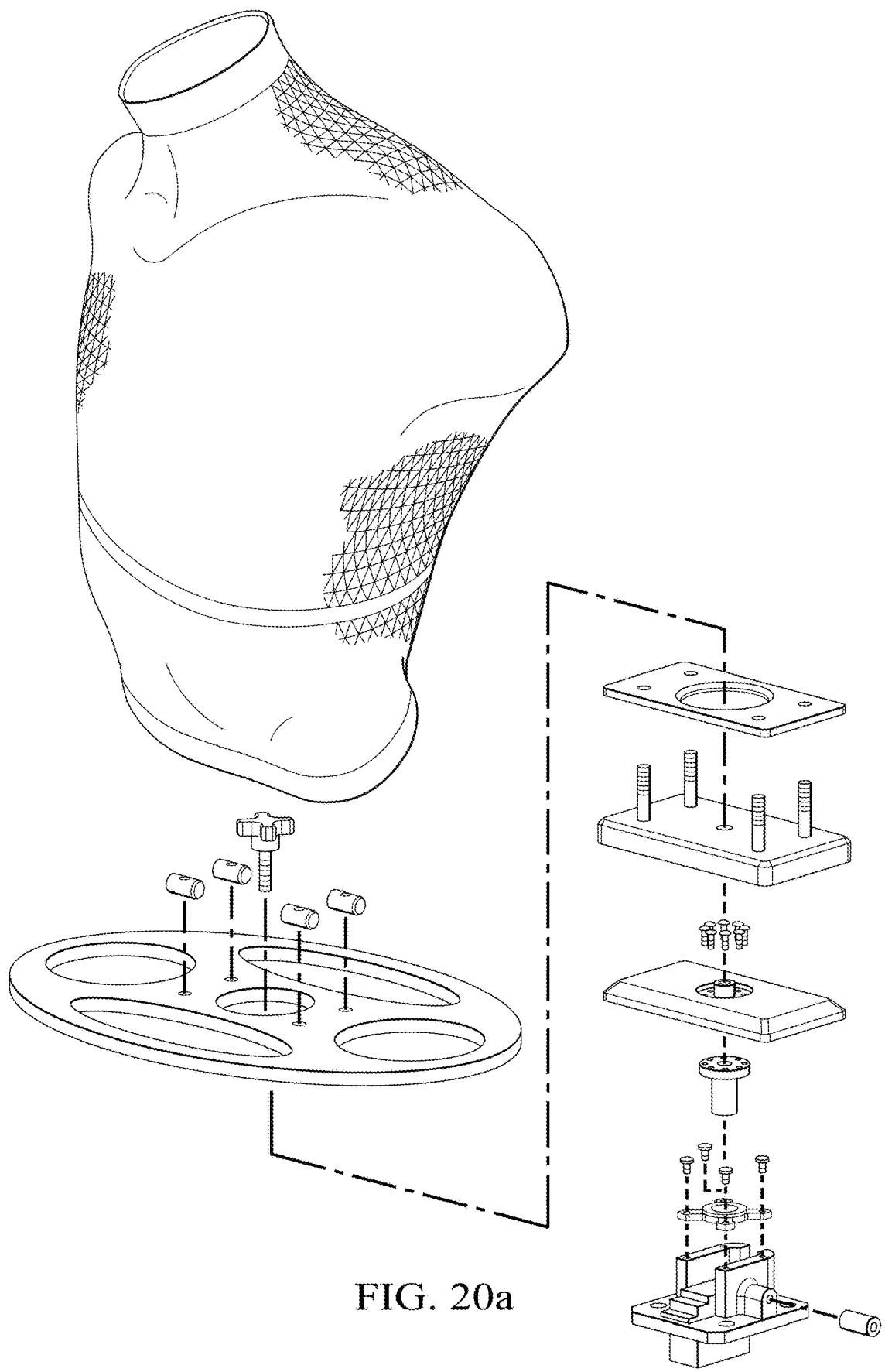
Figure 20B:
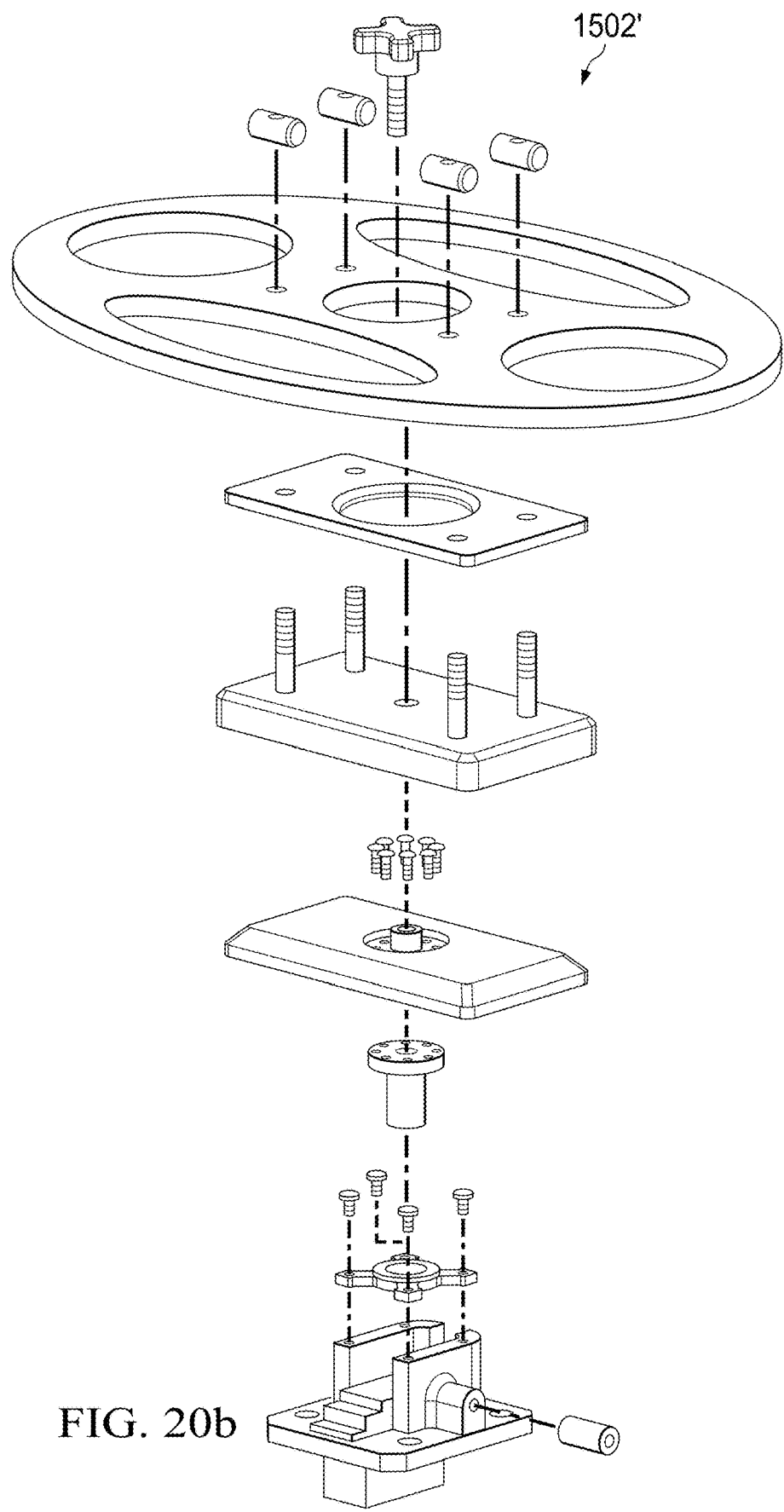
Figure 20C:
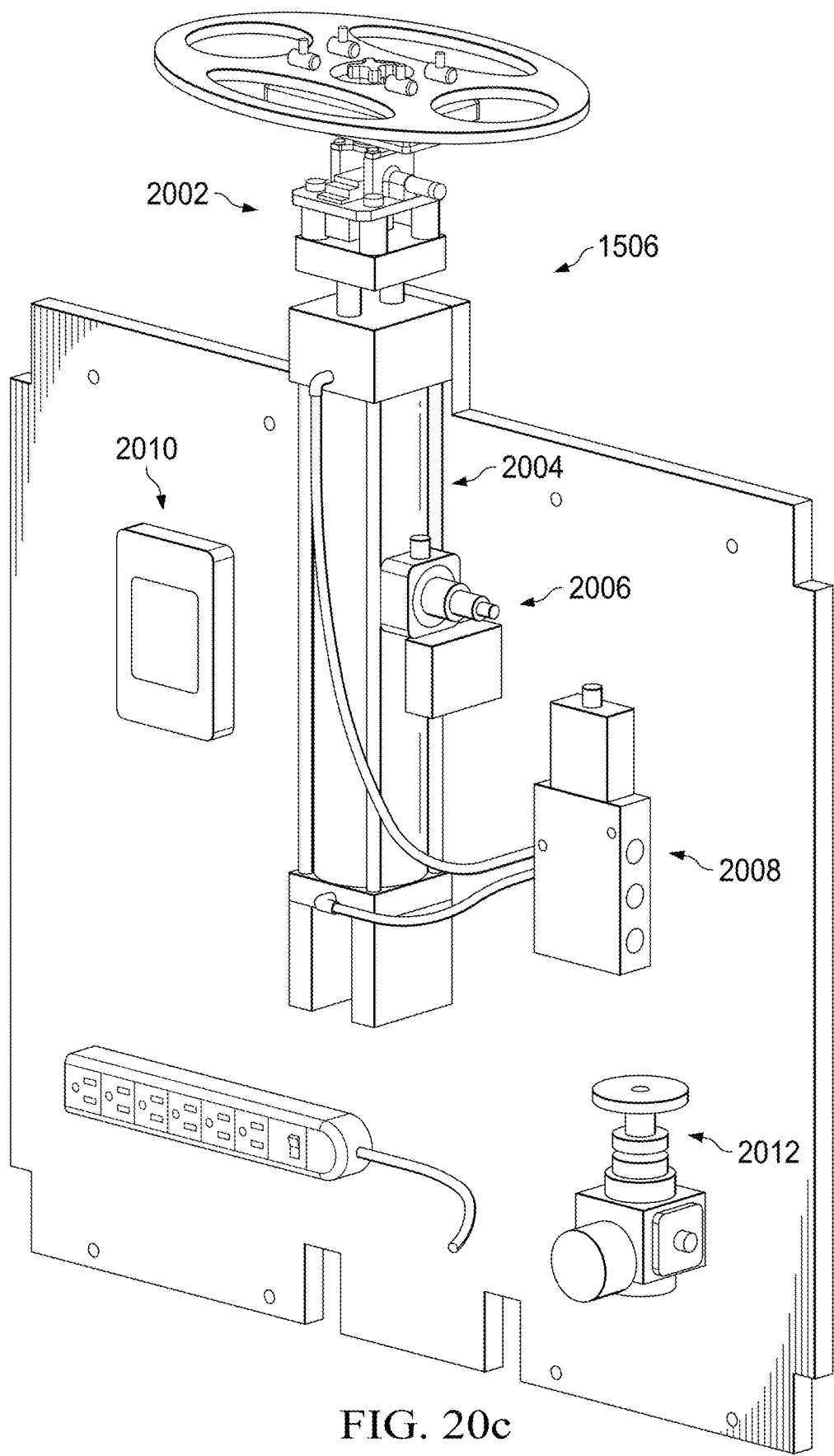
Figure 21A:
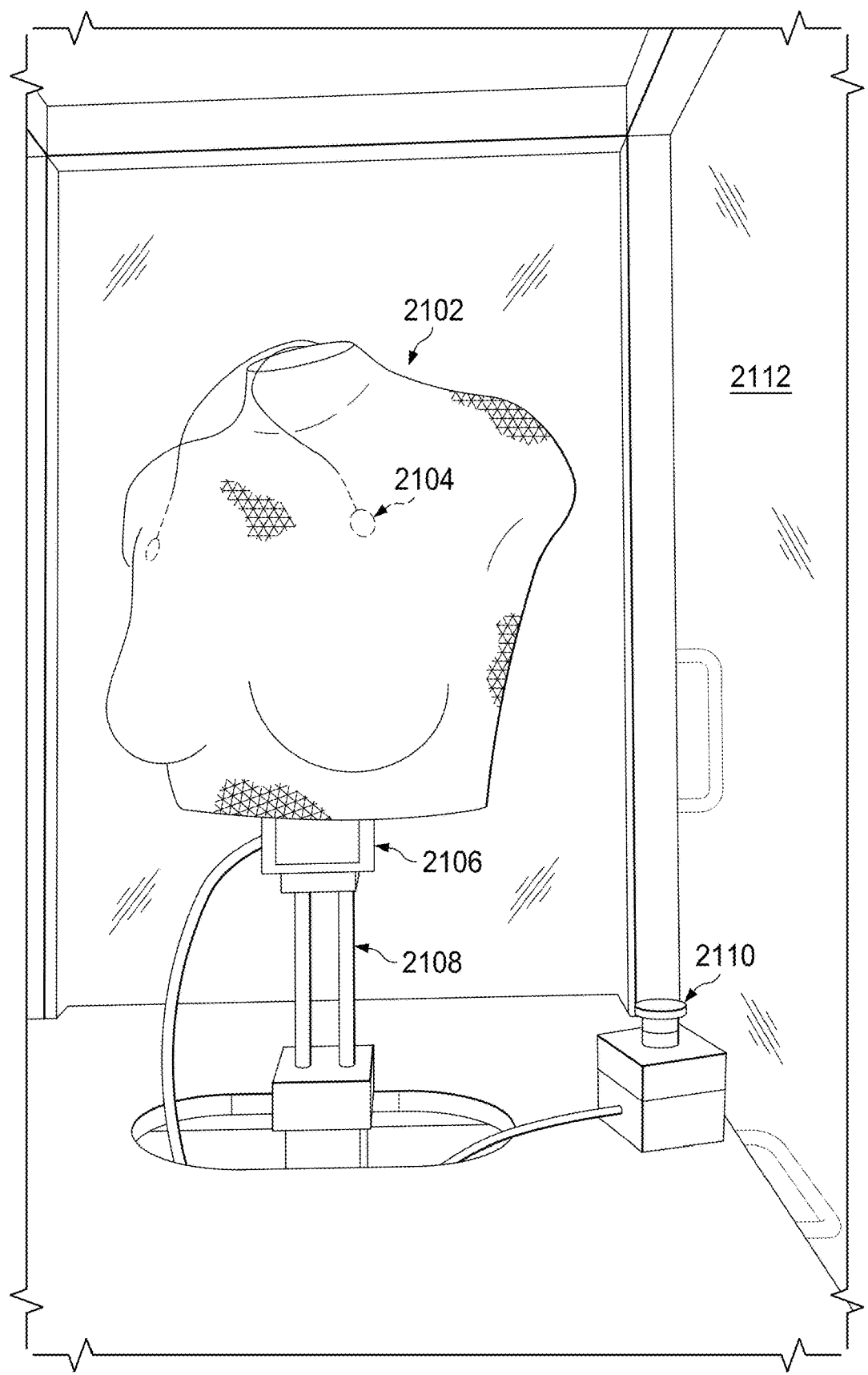
Figure 21B:
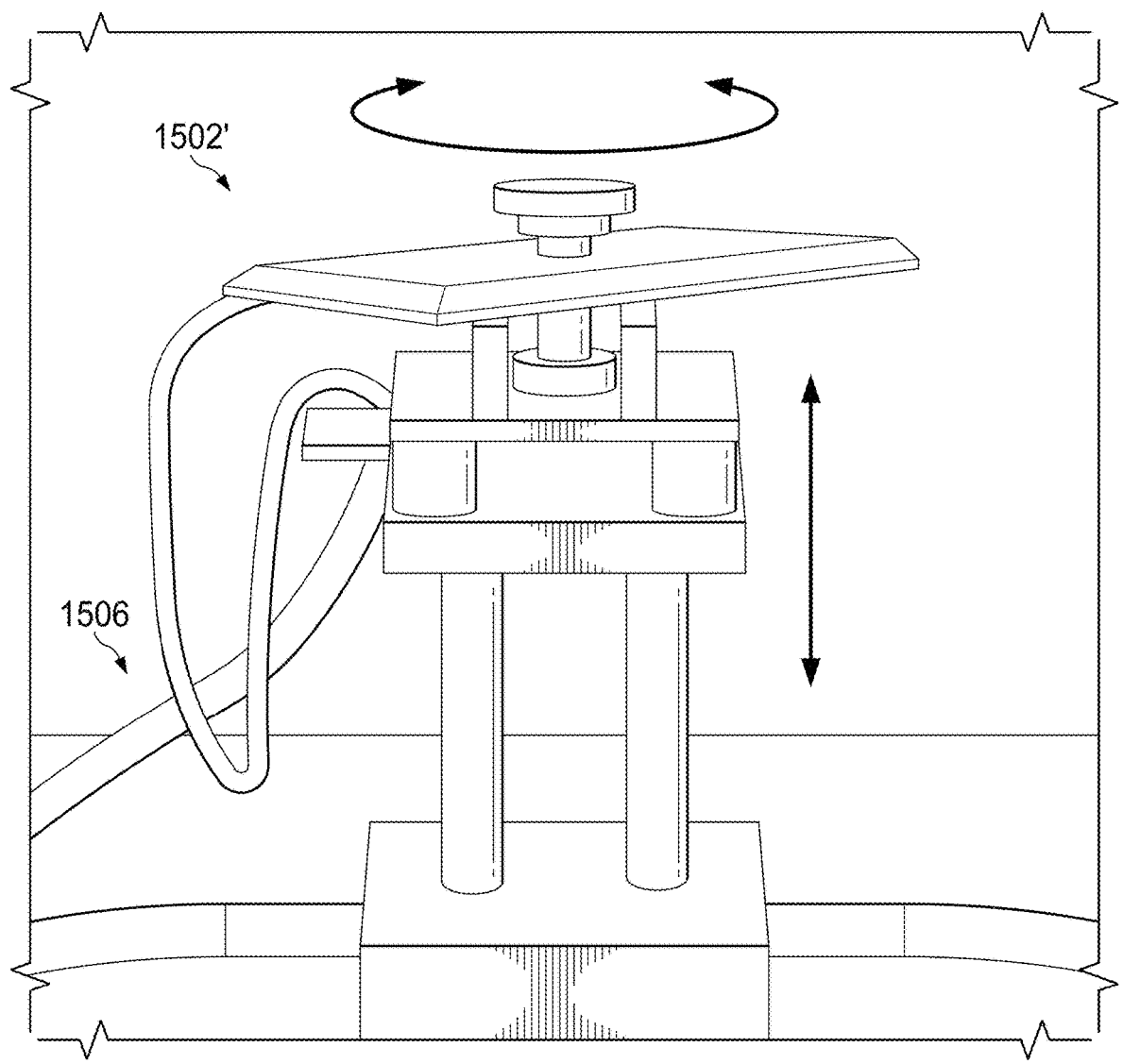

FIGS. 16b and 21b show example movement profiles that the example actuator assembly 1500 can move the support base 1502, and thereby the mannequin torso, according to a desired movement. FIGS. 18a, 18b, 18c, 19b, 20a-20c, 21a, and 21b show example actuator structures that can be used in the actuator system of the example actuator assembly 1500. For example, FIGS. 20a-20c show an example support base 1502', and an actuator system 1506 that includes (as shown in FIG. 20c) a servo rotational motor and mount 2002, rotationally fixed air cylinder 2004, draw wire position encoder 2006, proportional air control valve 2008, FPGA motion control and sensor input 2010, and air pressure regulator 2012. FIG. 21a shows the example actuator assembly as assembled, including the example torso structure 2102, accelerometers 2104 (embedded in synthetic skin of torso), rotational motion actuator 2106, vertical motion actuator 2108, emergency stop button 2110, and windows 2112. FIG. 18d is a schematic diagram of the actuator assembly 1500 and an example mannequin torso with a pressure sensor assembly connected to a controller (e.g., computer) with a user interface, for example, for control of movement of the actuator assembly 1500 and presentation of data from the sensor(s).

The example actuator assembly 1500 can be controlled to move an example mannequin torso (e.g., example mannequin torso 800) along a predetermined and desired movement profile that imitates a movement of a human body. The actuator assembly 1500 can also be used to test for the viscoelastic properties of the mannequin torso for fidelity testing (e.g., as compared to actual human body characteristics and movement).

Fidelity Testing, Motion Tracking, Analysis, and Quantification

Existing methods of breast motion analysis range from position analysis to finite element analysis of surface displacements of breasts during motion to provide approximate models of breast tissue dynamics. In some implementations, breast motion analysis techniques may include inducing cyclical stress (e.g., from motion) on the mannequin torso of the present disclosure and monitoring strain, for example, through optical tracking, visual inspection sensors, or other position tracking like inertial motion unit (IMU) or accelerometer data, or even pressure changes and data collected from pressure sensors (e.g., pressure sensors 804). From this information, rheological stress/strain curves can be made that provide information for elastic (G') and viscous (G") information regarding breast tissue and breast systems as a whole. This viscoelastic analysis quantifies the lag the breasts feel during the cyclical motion. Additionally, another technique relies on single (noncylical) motion, such as a single "jump" movement. From the oscillations induced in the breast tissue during and immediately after this jump, the log decrement can be calculated for the breast tissue as a whole, or discreetly, at regions of the breasts. The oscillation can be curve fit to determine a log decrement from the motion profile. These techniques are more than position based analysis, because it can provide viscoelastic information regarding breast tissue or a breast-in-bra system, as well as looking at dampening. This breast motion simulation promotes a better understanding of the tissue structure and movement of the breasts during different levels of activities, which can help bra manufacturing companies improve on bra design, for example, to target sources of discomfort and develop garments with better support.

Figure 24:
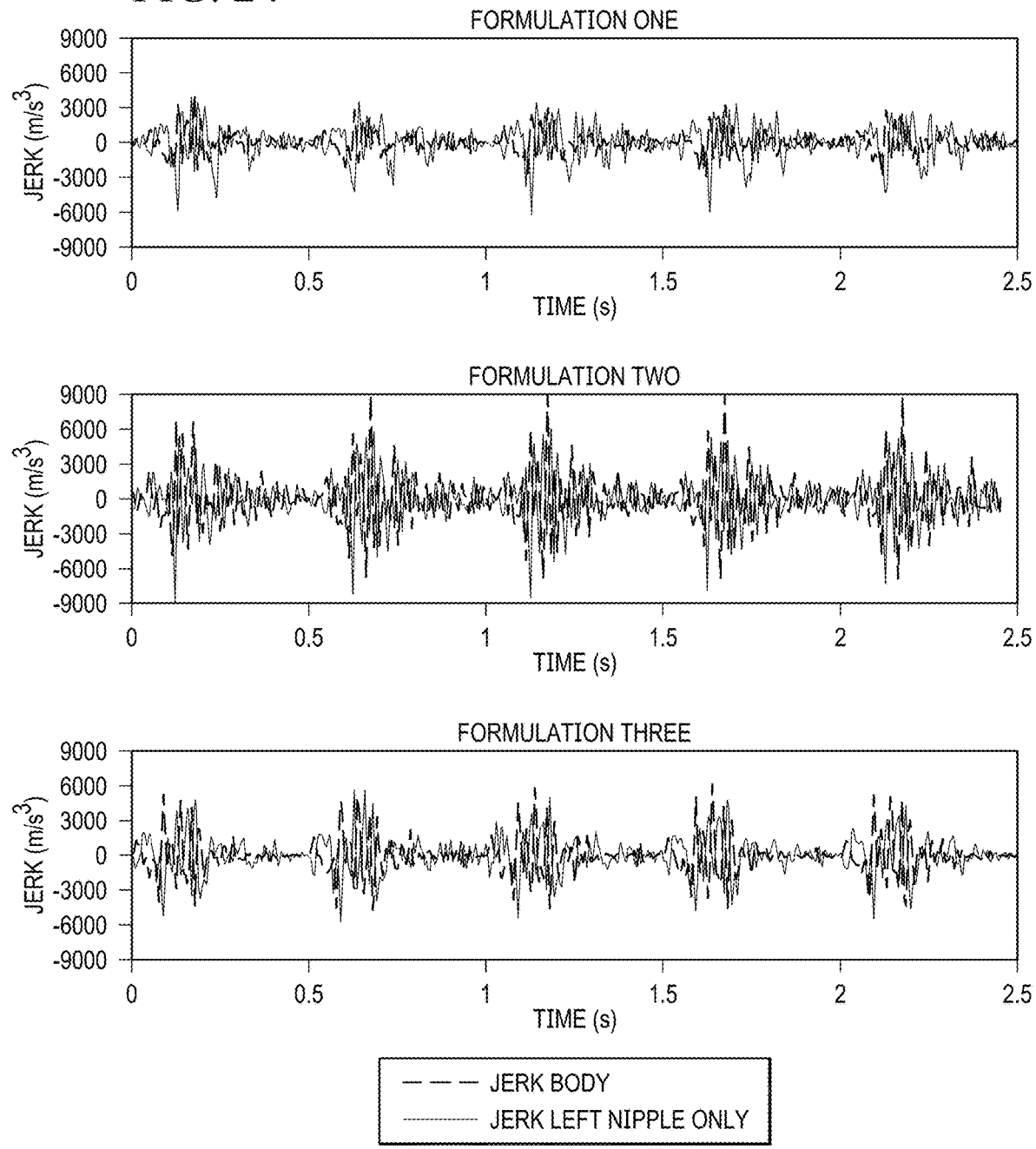

Motion tracking of a mannequin torso with several formulations of synthetic skin can be performed to receive motion profiles for the several formulations. The same motion can be done with human subjects for example, to compare data and test fidelity of the mannequin torso. From the motion profiles, acceleration and jerk characteristics can be determined. FIGS. 22-24 are plots showing example motion profiles, example acceleration profiles, and example jerk profiles for the torso and areola of the synthetic skin formulations 1-3 (described above).

The motion profiles of FIG. 22 show the downward lag in relative motion of the areolas in response to upward motion of the torso, upward relative overshoot of the areolas at the peak of motion, and subsequent relative undershoot of the areolas when the torso returns to start position. The oscillations of the areolas outside of zero position, upon returning to static resting 1G gravity, are also reflected in the damping of the torso motion as it approaches its resting position.

Acceleration and strain can be used as predictors of breast discomfort. FIG. 23 shows torso accelerations (e.g., at 2G) and relative areolas accelerations (e.g., of 4G and up to nearly 6G). Formulation 1 shows how the standard 1:1 ratio of the breast tissue formulation produces oscillations that are very consistent and smoother than other formulations. Formulation 1 has a better form, producing breasts that are firmer and extend slightly further forward from the torso than other formulations. Formulation 3 shows acceleration peaks that are much greater than the other formulations, suggesting the greater relative motion of this less firm formulation. Overall, all torso accelerations are very similar between the formulations despite the damped motion, for example, caused by the pneumatics and inertia of the breast tissue mass.

The influence of jerk (i.e., the derivative of acceleration, or change in acceleration) on perceived motion strength has been evaluated, and can provide a better evaluation of pain. Jerk peaks of areolas' relative motion, as shown in FIG. 24, approach extremes 9000 m/s^3. These extremes of areolas' relative jerk correspond to the peak and valley of the torso motion profile of FIG. 22.

In some implementations, breast motion can be represented as a single system defined by the areola-only motion. For example, the following may be ignored: 1) the mass of the mannequin torso or total mass of the breast tissue (since parts A and B are approximately the same mass), and 2) inertial-based aspects of motion. In lieu of a more thorough analysis, these assumptions can be made to produce a simplified representation of viscous and elastic components of motion as phase angles. The viscous component of damping can be expected to increase with velocity, while inertial aspects of motion can be expected to increase with acceleration. As stress is applied vertically, the resulting strain in the breast tissue and areolas is delayed. The lag between the torso and areola-only motion can also be viewed as a phase angle between their respective motions. When this phase angle is 0 degrees, the material is considered purely elastic, while it is considered purely viscous at 90 degrees. The metrics described here can be utilized to better explore strain and viscoelasticity.

Figure 25:
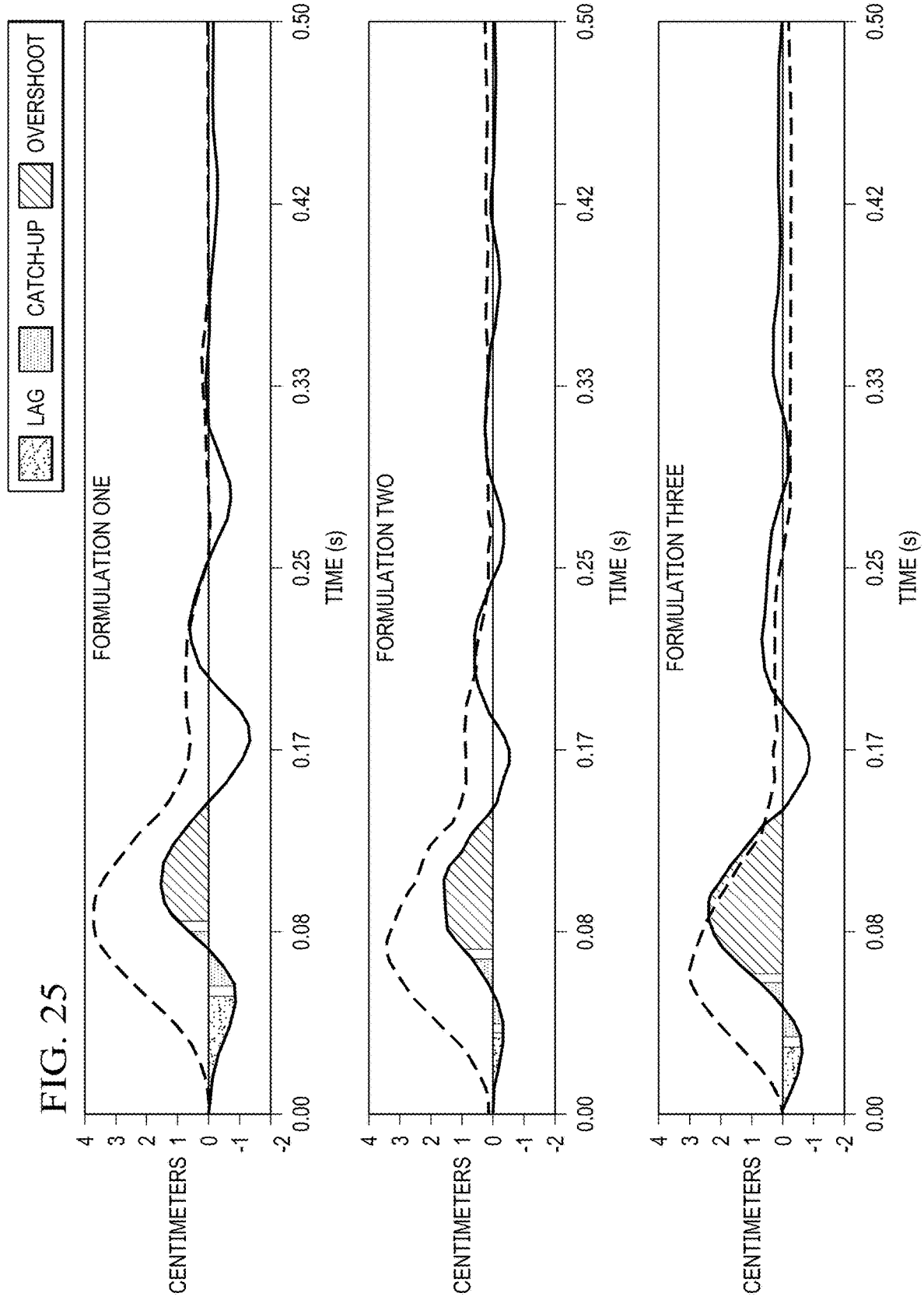

FIG. 25 shows the area of areola lagging the torso, followed by the catch-up phase, and then the overshoot of the areola back to neutral position. Area of motion increases as crosslinking and elasticity decrease and the viscous component increases. One notable aspect is the starting position of the breast at 1G gravity; this gravity force pulls the less firm, and more viscous, formulations downward and limits their downward motion during the motion cycle. As the 1:1 A:B silicone gel ratio is lessened, decreasing crosslinking, the initial valley time lag increases. The 1:1 A:B gel has a longer initial lag time, for example, because the shape of the breast is better maintained with this more rigid formulation. The peak lag time generally increases as the cross-linking decreases, meaning greater motion due to viscous and/or inertial components. As the cross-linking decreases in the gel, it becomes more viscous and less elastic, and the firmness decreases, as previously shown.

The valley time lag(s) of formulation 1 shows a larger lag than any of the other formulations and are at least partially due to the breasts keeping their form better and not initially sagging as much at rest. The more elastic nature of the 1:1 ratio formulation is further shown in the much lower peak time delay, as the breast tissue does not overshoot for as long, and more quickly returns to downward motion following acceleration reversal compared to other formulations. The initial areola lag and overshoot at the peak are presented in terms of viscoelasticity; however, they invariably have inertial components as the initial lag (shaded in grey) is the mass of the breast at rest transitioning into motion, while the overshoot (shaded in blue) contains the momentum of the breast in motion overshooting the peak of the torso motion (shaded in yellow). As the mass between the breasts is approximately equal within the limitations of the molding process, as weights of parts A and B are approximately equal, mass is excluded in favor of this viscoelastic approximation.

Figure 26:
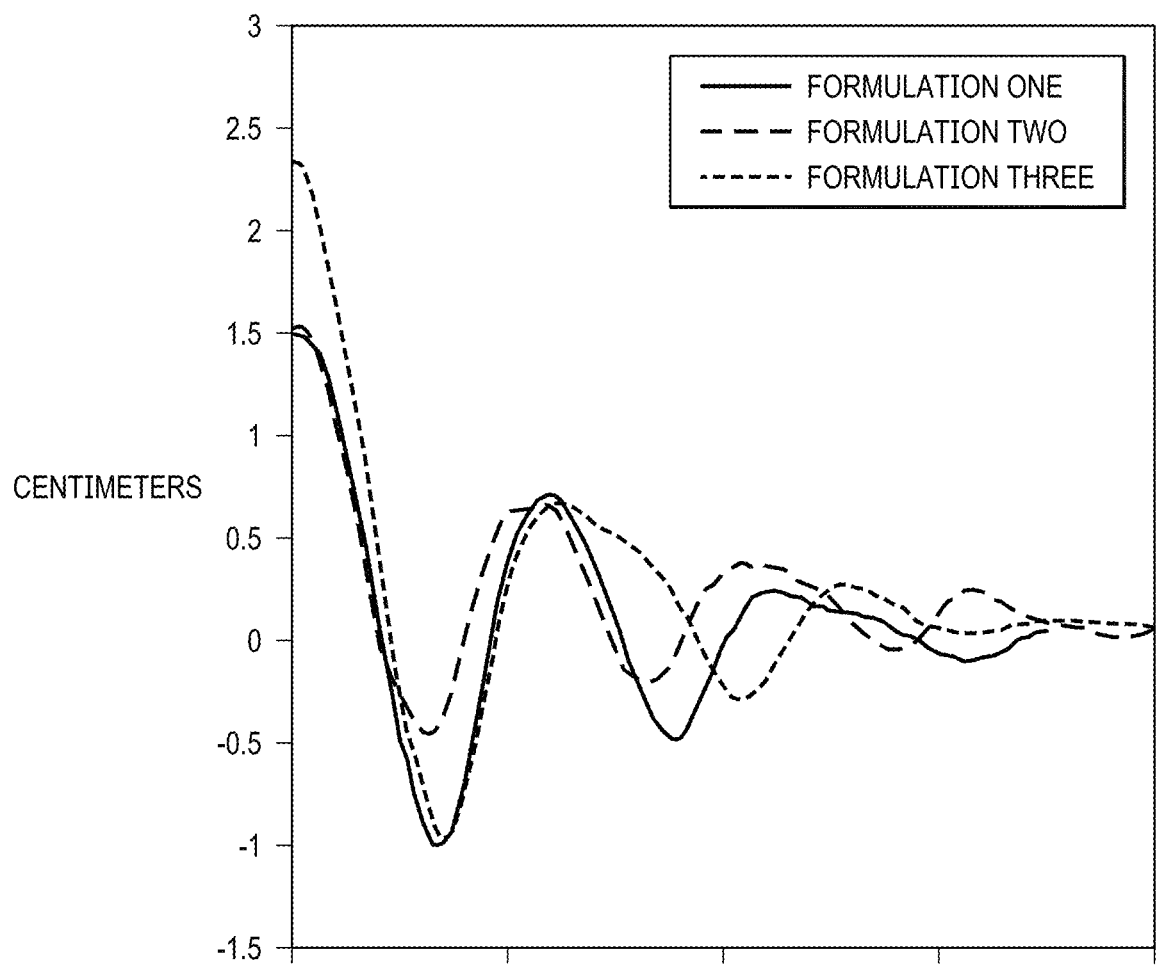
FIG. 26 is a plot of an example log-decrement for example torso formulations for areola-only motion.

In some implementations, the oscillation of the areolas-only motion relative to the torso upon returning to a resting or starting position of motion are used for basic log decrement of the portion of the motion profile after the breast tissue has been put into motion (i.e., meaning the initial valley lag portion is excluded due to inertia). The overshoot at the peak is also excluded and only areolas-only relative motion after the torso returns to rest is analyzed as oscillatory motion. Three representative traces are illustrated in FIG. 26, reflecting the: 1) the peak; 2) the return to starting position; and 3) the subsequent oscillation of the breast tissue. Formulation 1 is shown in blue, formulation 2 in red, and formulation 3 in green.

Figure 27:
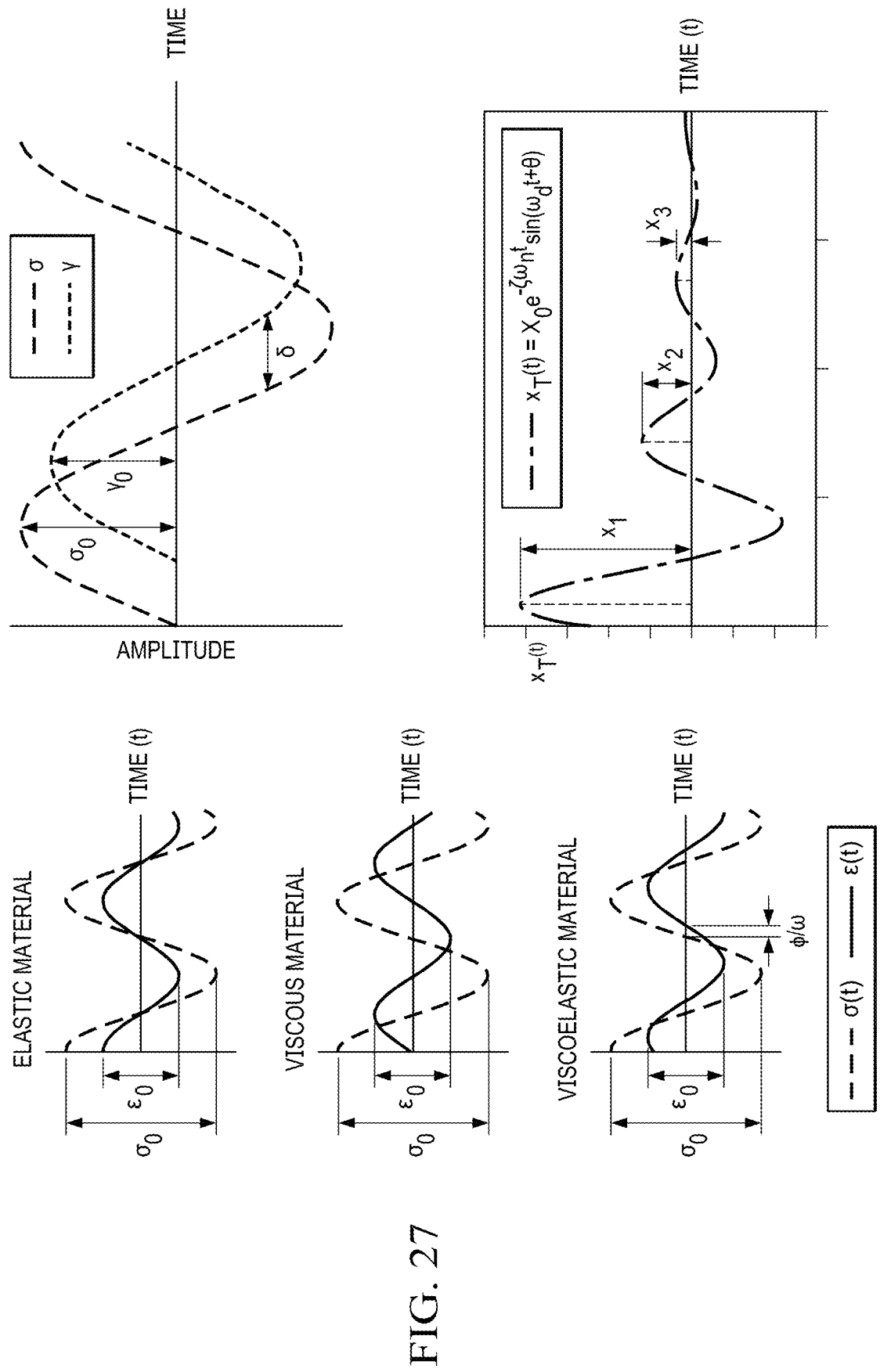
FIG. 27 is example plots and curves for example elastic, viscous, and viscoelastic materials, and an example damping ratio.

FIG. 26 shows the plotted analysis of the oscillatory motion of the areola after the peak of the torso motion. This analysis is a simplification of the breast as a single system defined by the areola-only motion, which treats the oscillation of the areola through this final motion as a damped oscillation. The log decrement of the ratio of sixteen sets of successive peaks provides a simplified understanding of the damping of the breast motion simulator formulations. As simplified in FIG. 27, the damping ratio is derived using the log decrement. For example, FIG. 27 shows the cyclic stress and strain curves vs time for various materials (i.e., elastic, viscous, and viscoelastic materials), a stress-strain curve showing amplitude and phase shift between stress and strain, and damping ratio. The damping ratio is also related to the logarithmic decrement for underdamped variations. FIG. 26 shows the representative areola oscillations from the three formulations during three unique oscillations. This analysis shows the damping ratio increasing as the formulation moves away from 1:1, thus relating the cross-linking of the silicone gel with this factor.

Figure 28:
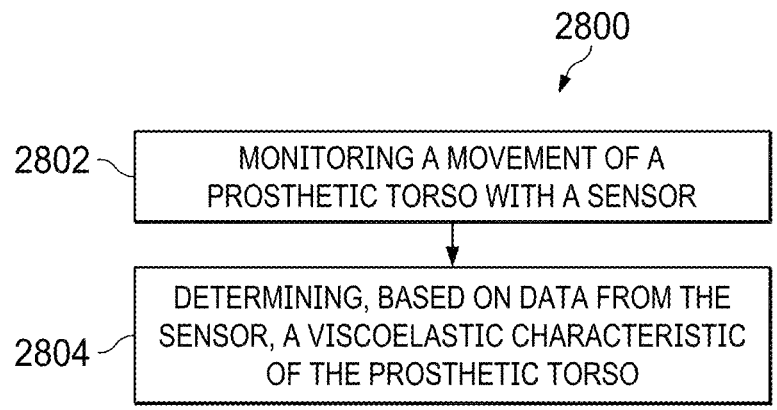
FIG. 28 is a flowchart describing an example method for analyzing a prosthetic torso with synthetic skin and breast tissue.

FIG. 28 is a flowchart describing an example method 2800 for analyzing a prosthetic torso with synthetic skin and breast tissue. At 2802, a movement of a prosthetic torso is monitored with a sensor. At 2804, a viscoelastic characteristic of the prosthetic torso is determined based on data from the sensor. The movement can include one or more of a jumping motion, a walking motion, or a running motion. The method can include controlling the movement of the prosthetic torso with an actuator assembly. The prosthetic torso can include a support structure in a shape of a human torso and a synthetic skin disposed over a support structure and connected to the support structure, the synthetic skin including synthetic breasts with silicone or gel (e.g., ballistic gel) and imitate female breasts. Monitoring the movement of the prosthetic torso can include obtaining a motion profile of the prosthetic torso, and the motion profile can include an oscillation profile of breasts of the prosthetic torso relative to a remainder of the prosthetic torso. The method can include generating an acceleration profile and a jerk profile from the motion profile, and determining, at least partially based on the jerk profile, the viscoelastic characteristic of the prosthetic torso. The viscoelastic characteristic of the prosthetic torso can include an elasticity or a viscosity of the synthetic breasts. The determined elasticity and/or viscosity of the synthetic breasts can be compared to a threshold elasticity and/or threshold viscosity, and be determined to have a greater or lesser elasticity or viscosity than the respective thresholds. The thresholds can be based on empirical or theoretical data of breasts. Monitoring the prosthetic torso can be performed with an optical sensor, pressure sensor, or other sensor type. In some implementations, the method can include obtaining stress/strain profiles of the prosthetic torso based at least partially on the pressure data from the pressure sensors.

While the silicone tubing 806 described above provides pressure sensing to give an end user a quantified feedback about garment fit and sizing, the tubing sensors can also be used in dynamic evaluation of bra support and resistance to breast motion. Also, development and validation through clinical testing demonstrate the anthropometric utility of the mannequin torso with synthetic skin as a substitute for human studies. Automation of motion and simulated tissue can allow for reproducible quantification of breast dynamics and bra support influence.

Figure 29:
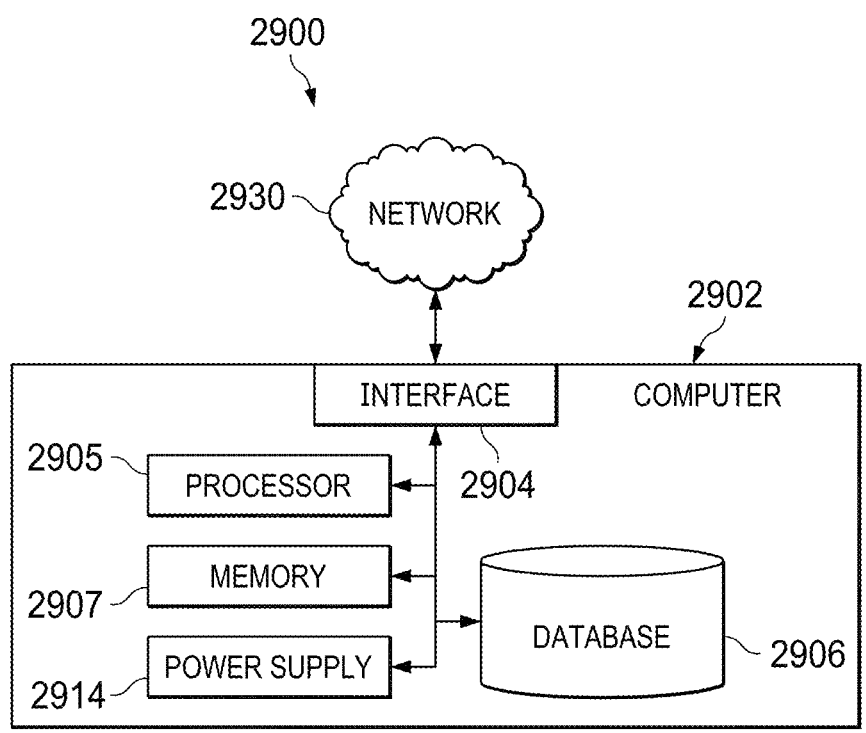
FIG. 29 is a block diagram of an example computer system that can be utilized herein.

FIG. 29 is a block diagram of an example computer system 2900 that can be utilized herein to provide computational functionalities associated with described algorithms, methods, functions, processes, flows, and procedures described in the present disclosure, according to some implementations of the present disclosure. The illustrated computer 2902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2902 can include input devices such as keypads, keyboards, and touch screens that can accept user information. Also, the computer 2902 can include output devices that can convey information associated with the operation of the computer 2902. The information can include digital data, visual data, audio information, or a combination of information. The information can be presented in a graphical user interface (UI) (or GUI).

The computer 2902 can serve in a role as a client, a network component, a server, a database, a persistency, or components of a computer system for performing the subject matter described in the present disclosure. The illustrated computer 2902 is communicably coupled with a network 2930. In some implementations, one or more components of the computer 2902 can be configured to operate within different environments, including cloud-computing-based environments, local environments, global environments, and combinations of environments.

At a high level, the computer 2902 is an electronic computing device operable to receive, transmit, process, store, and manage data and information associated with the described subject matter. According to some implementations, the computer 2902 can also include, or be communicably coupled with, an application server, an email server, a web server, a caching server, a streaming data server, or a combination of servers.

The computer 2902 can receive requests over network 2930 from a client application (for example, executing on another computer 2902). The computer 2902 can respond to the received requests by processing the received requests using software applications. Requests can also be sent to the computer 2902 from internal users (for example, from a command console), external (or third) parties, automated applications, entities, individuals, systems, and computers.

Each of the components of the computer 2902 can communicate using a system bus. In some implementations, any or all of the components of the computer 2902, including hardware or software components, can interface with each other or the interface 2904 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 2902 and other components (whether illustrated or not) that are communicably coupled to the computer 2902. The functionality of the computer 2902 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 2902, in alternative implementations, the API or the service layer can be stand-alone components in relation to other components of the computer 2902 and other components communicably coupled to the computer 2902. Moreover, any or all parts of the API or the service layer can be implemented as child or sub-modules of another software module, enterprise application, or hardware module without departing from the scope of the present disclosure.

The computer 2902 can include an interface 2904. Although illustrated as a single interface 2904 in FIG. 10, two or more interfaces 2904 can be used according to particular needs, desires, or particular implementations of the computer 2902 and the described functionality. The interface 2904 can be used by the computer 2902 for communicating with other systems that are connected to the network 2930 (whether illustrated or not) in a distributed environment. Generally, the interface 2904 can include, or be implemented using, logic encoded in software or hardware (or a combination of software and hardware) operable to communicate with the network 2930. More specifically, the interface 2904 can include software supporting one or more communication protocols associated with communications. As such, the network 2930 or the interface's hardware can be operable to communicate physical signals within and outside of the illustrated computer 2902.

The computer 2902 includes a processor 2905. Although illustrated as a single processor 2905 in FIG. 10, two or more processors 2905 can be used according to particular needs, desires, or particular implementations of the computer 2902 and the described functionality. Generally, the processor 2905 can execute instructions and can manipulate data to perform the operations of the computer 2902, including operations using algorithms, methods, functions, processes, flows, and procedures as described in the present disclosure.

The computer 2902 can also include a database 2906 that can hold data for the computer 2902 and other components connected to the network 2930 (whether illustrated or not). For example, database 2906 can be an in-memory, conventional, or a database storing data consistent with the present disclosure. In some implementations, database 2906 can be a combination of two or more different database types (for example, hybrid in-memory and conventional databases) according to particular needs, desires, or particular implementations of the computer 2902 and the described functionality. Although illustrated as a single database 2906 in FIG. 10, two or more databases (of the same, different, or combination of types) can be used according to particular needs, desires, or particular implementations of the computer 2902 and the described functionality. While database 2906 is illustrated as an internal component of the computer 2902, in alternative implementations, database 2906 can be external to the computer 2902.

The computer 2902 also includes a memory 2907 that can hold data for the computer 2902 or a combination of components connected to the network 2930 (whether illustrated or not). Memory 2907 can store any data consistent with the present disclosure. In some implementations, memory 2907 can be a combination of two or more different types of memory (for example, a combination of semiconductor and magnetic storage) according to particular needs, desires, or particular implementations of the computer 2902 and the described functionality. Although illustrated as a single memory 2907 in FIG. 10, two or more memories 2907 (of the same, different, or combination of types) can be used according to particular needs, desires, or particular implementations of the computer 2902 and the described functionality. While memory 2907 is illustrated as an internal component of the computer 2902, in alternative implementations, memory 2907 can be external to the computer 2902.

An application can be an algorithmic software engine providing functionality according to particular needs, desires, or particular implementations of the computer 2902 and the described functionality. For example, an application can serve as one or more components, modules, or applications. Multiple applications can be implemented on the computer 2902. Each application can be internal or external to the computer 2902.

The computer 2902 can also include a power supply 2914. The power supply 2914 can include a rechargeable or non-rechargeable battery that can be configured to be either user- or non-user-replaceable. In some implementations, the power supply 2914 can include power-conversion and management circuits, including recharging, standby, and power management functionalities. In some implementations, the power-supply 2914 can include a power plug to allow the computer 2902 to be plugged into a wall socket or a power source to, for example, power the computer 2902 or recharge a rechargeable battery.

There can be any number of computers 2902 associated with, or external to, a computer system including computer 2902, with each computer 2902 communicating over network 2930. Further, the terms "client," "user," and other appropriate terminology can be used interchangeably, as appropriate, without departing from the scope of the present disclosure. Moreover, the present disclosure contemplates that many users can use one computer 2902 and one user can use multiple computers 2902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations have been described. Nevertheless, it will be understood that various modifications may be made without departing from the spirit and scope of the disclosure.

What is claimed is:

1. A sensor apparatus comprising:
a mannequin configured to emulate a human body part, the human body part being a female human torso, the mannequin comprising:
a core configured to emulate flexibility of a substantially inflexible skeletal portion of the body part; and
a pliant covering comprising:
a pliant three-dimensional surface configured to emulate contours of an epidermis of the body part; and
at least one pliant three-dimensional interior portion configured to emulate resiliency of a pliant portion of the body part, the pliant three-dimensional interior portion being emulative of at least an interior portion of human female breast tissue, wherein the pliant covering emulates the contours of at least one human female breast; and
at least one pressure sensor arranged between the three-dimensional surface and the core and configured to sense pressure applied against the pliant three-dimensional surface.

2. The sensor apparatus of claim 1, wherein the pressure sensor comprises:
at least one flexible lumen at least partly filled with a fluid; and a fluid pressure sensor configured to provide a pressure signal that is representative of a fluid pressure of the fluid.

3. The sensor apparatus of claim 2, wherein a majority of the flexible lumen is arranged horizontally relative to an upright posture of the mannequin, in a position that is emulative of one of spinal nerves C8-T12.

4. The sensor apparatus of claim 2 wherein the fluid pressure sensor is located away from the pliant covering, and the flexible lumen extends from the fluid pressure sensor to the pliant covering through holes defined along a spinal region of the core.

5. The sensor apparatus of claim 1, wherein the pliant three-dimensional interior portion is configured to emulate movement or recovery of the pliant portion when the body part is subjected to movement or acceleration.

6. The sensor apparatus of claim 1, wherein the mannequin is configured be donned with a garment, and the pressure sensor is configured to sense pressure applied to the mannequin by the garment.

7. A method of sensing pressure applied by a covering on a body part, the method comprising:
providing a pressure sensor apparatus, wherein the pressure sensor apparatus comprises:
a core configured to emulate a substantially inflexible skeletal portion of the body part; and
a flexible covering comprising:
a flexible three-dimensional surface configured to emulate contours of an epidermis of the body part, the body part being a female human torso;
at least one flexible three-dimensional interior portion emulative of human female breast tissue, the interior portion configured to emulate movement or recovery of the female breast tissue when the flexible covering is subjected to movement or acceleration; and
at least one pressure sensor arranged between the three-dimensional surface and the core and configured to sense pressure applied against the flexible three-dimensional surface;
at least partly covering the pressure sensor apparatus with a garment configured to be worn over at least one human female breast;
applying, by the garment, pressure against the pressure sensor;
sensing the applied pressure; and
providing at least one measurement value based on sensed pressure.

8. The method of claim 7, further comprising:
moving or accelerating the pressure sensor apparatus and the garment;
distorting, by the moving or accelerating, at least one pliant portion of the at least one pressure sensor; and
applying, by the distorting, pressure of the pressure sensor apparatus applied against the garment; and
wherein providing at least one measurement value based on the sensed pressure comprises
providing a pressure measurement value of the sensed applied pressure.

9. The method of claim 8, wherein the distorting is a time-varying distortion of the pliant portion, the applied pressure is a time-varying applied pressure, the sensed pressure is a time-varying pressure, and the pressure measurement value is a time-varying pressure measurement value.

10. The method of claim 7, wherein providing a pressure sensor apparatus comprises:
receiving a three-dimensional model of a body part comprising a core portion model representative of the substantially inflexible skeletal portion of the body part, a surface model representative of three-dimensional contours of the epidermis of the body part, and at least one interior portion model representative of the flexible portion of the body part;
constructing a mannequin based on the three-dimensional model, the constructing comprising:
constructing the core based on the core portion model;
constructing the flexible covering comprising:
the flexible three-dimensional surface based on the surface model; and
the at least one flexible three-dimensional interior portion based on the interior portion model.

11. A sensor apparatus comprising:
a mannequin configured to emulate a human body part, the mannequin comprising:
a core configured to emulate flexibility of a substantially inflexible skeletal portion of the body part; and
a pliant covering comprising:
a pliant three-dimensional surface configured to emulate contours of an epidermis of the body part; and
at least one pliant three-dimensional interior portion configured to emulate resiliency of a pliant portion of the body part; and
at least one pressure sensor arranged between the three-dimensional surface and the core and configured to sense pressure applied against the pliant three-dimensional surface, the pressure sensor comprising:
at least one flexible lumen at least partially filled with a fluid; and
a fluid pressure sensor configured to provide a pressure signal that is representative of a fluid pressure of the fluid, wherein the fluid pressure sensor is located away from the pliant covering, and the flexible lumen extends from the fluid pressure sensor to the pliant covering through holes defined along a spinal region of the core.

12. The sensor apparatus of claim 11, wherein a majority of the flexible lumen is arranged horizontally relative to an upright posture of the mannequin, in a position that is emulative of one of spinal nerves C8-T12.

* * * * *